United States Patent
Jones et al.

(10) Patent No.: US 11,801,576 B2
(45) Date of Patent: Oct. 31, 2023

(54) AIRCRAFT ASSEMBLY FORMED OF MATING HALF BARREL SECTIONS AND THE METHOD OF ASSEMBLING THE SAME

(71) Applicant: The Boeing Company, Chicago, IL (US)

(72) Inventors: Darrell D. Jones, Woodinville, WA (US); Daniel R. Smith, Woodinville, WA (US); Jeremy Evan Justice, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,280

(22) Filed: Nov. 10, 2021

(65) Prior Publication Data

US 2022/0152758 A1 May 19, 2022

Related U.S. Application Data

(60) Provisional application No. 63/115,062, filed on Nov. 18, 2020.

(51) Int. Cl.
*B23P 21/00* (2006.01)
*B64F 5/10* (2017.01)

(52) U.S. Cl.
CPC .............. *B23P 21/004* (2013.01); *B64F 5/10* (2017.01); *B23P 2700/01* (2013.01)

(58) Field of Classification Search
CPC ...... B23P 21/004; B23P 2700/01; B64F 5/10; B64F 5/50; B64C 1/069; B64C 1/068
See application file for complete search history.

(56) References Cited

U.S. PATENT DOCUMENTS 8,985,512 B1 3/2015 Chan et al.
10,500,736 B2 12/2019 Hantzschel et al.
(Continued)

FOREIGN PATENT DOCUMENTS

EP 2604523 A2 6/2013
EP 3272454 A1 1/2018
(Continued)

OTHER PUBLICATIONS

Netherlands Patent Office Written Opinion and Search Report with English Translation, dated Jul. 19, 2021, regarding Application No. NL2027401, 13 pages.
(Continued)

*Primary Examiner* — Jun S Yoo
(74) *Attorney, Agent, or Firm* — Yee & Associates, P.C.

(57) ABSTRACT

Systems and methods are provided for assembling an airframe of an aircraft, including receiving a half barrel section of fuselage, advancing the half barrel section in a process direction across multiple stations to separately and simultaneously perform work on the half barrel sections, and subsequently joining the half barrel segments to form a section of the airframe. Each pair of half barrel sections, such as upper and lower half barrels, are progressed through assembly line processes to be delivered to a joining station for joining the half barrels together to form a circumferential section of the fuselage. Multiple joined circumferential sections are joined together to form an elongated extent of the fuselage. Indexing features are provided in the assembly process to monitor and control the progression of the half barrel sections in the work stations of the assembly line process.

20 Claims, 51 Drawing Sheets

(56) References Cited

U.S. PATENT DOCUMENTS

| | | | |
|---|---|---|---|
| 2003/0139952 A1* | 7/2003 | Lubash | G06Q 10/063 705/7.22 |
| 2006/0185143 A1 | 8/2006 | Frauen et al. | |
| 2013/0019446 A1* | 1/2013 | Venskus | B23Q 1/012 29/407.09 |
| 2016/0354883 A1* | 12/2016 | Vogt | B23P 19/04 |
| 2017/0355471 A1 | 12/2017 | Joern | |
| 2020/0198753 A1 | 6/2020 | Oberoi et al. | |

FOREIGN PATENT DOCUMENTS

| | | |
|---|---|---|
| EP | 3293105 A1 | 3/2018 |
| EP | 3628599 A1 | 4/2020 |
| WO | 2007057411 A1 | 5/2007 |

OTHER PUBLICATIONS

Netherlands Patent Office Written Opinion and Search Report with English Translation, dated Jul. 19, 2021, regarding Application No. NL2027402, 12 pages.

Extended European Search Report (EESR), dated Apr. 5, 2022, regarding U.S. Appl. No. 21/207,362, 9 pages.

Extended European Search Report (EESR), dated Apr. 11, 2022, regarding U.S. Appl. No. 21/207,366, 9 pages.

* cited by examiner

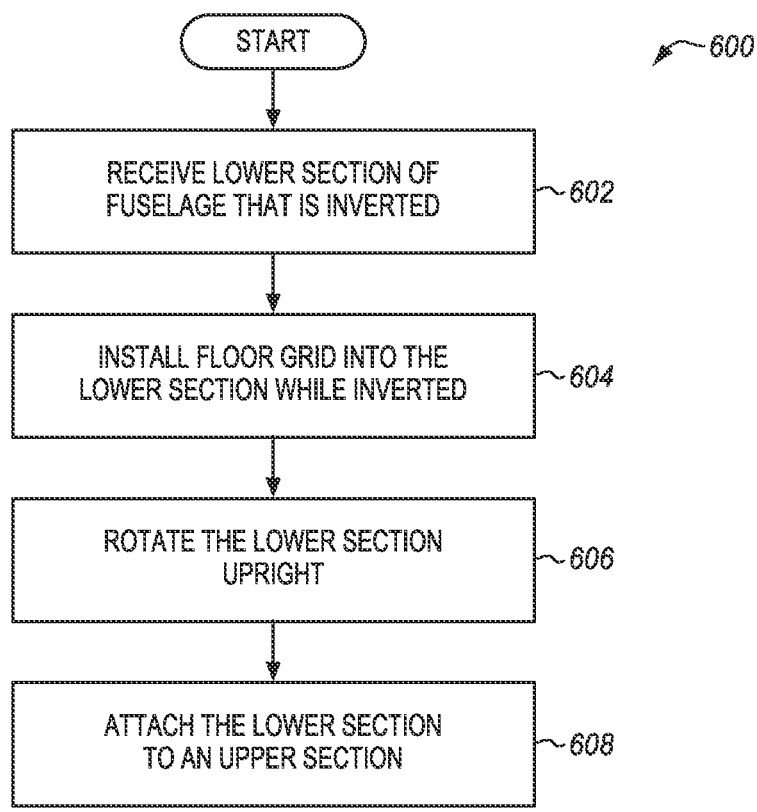

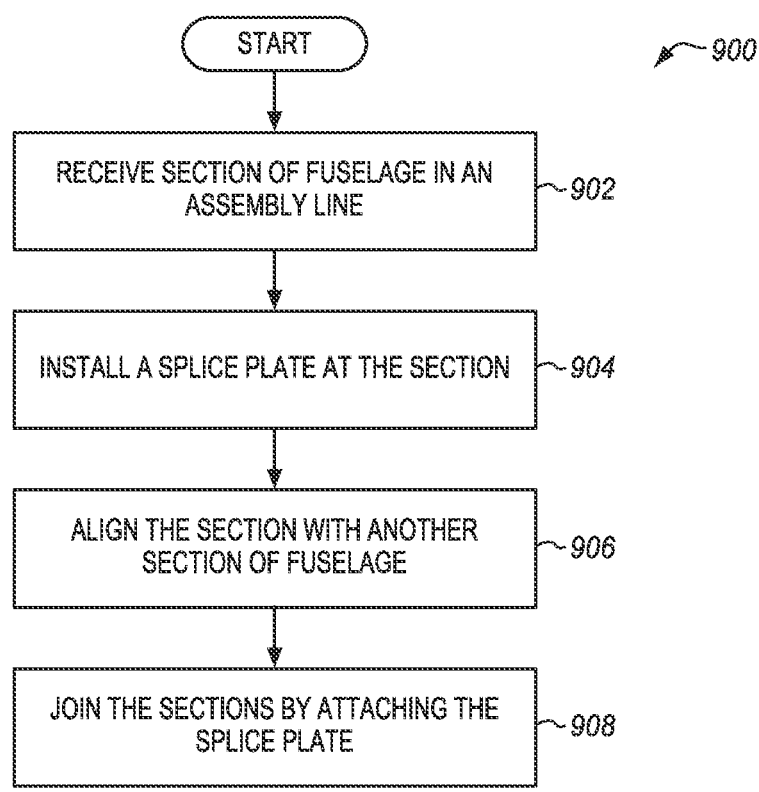

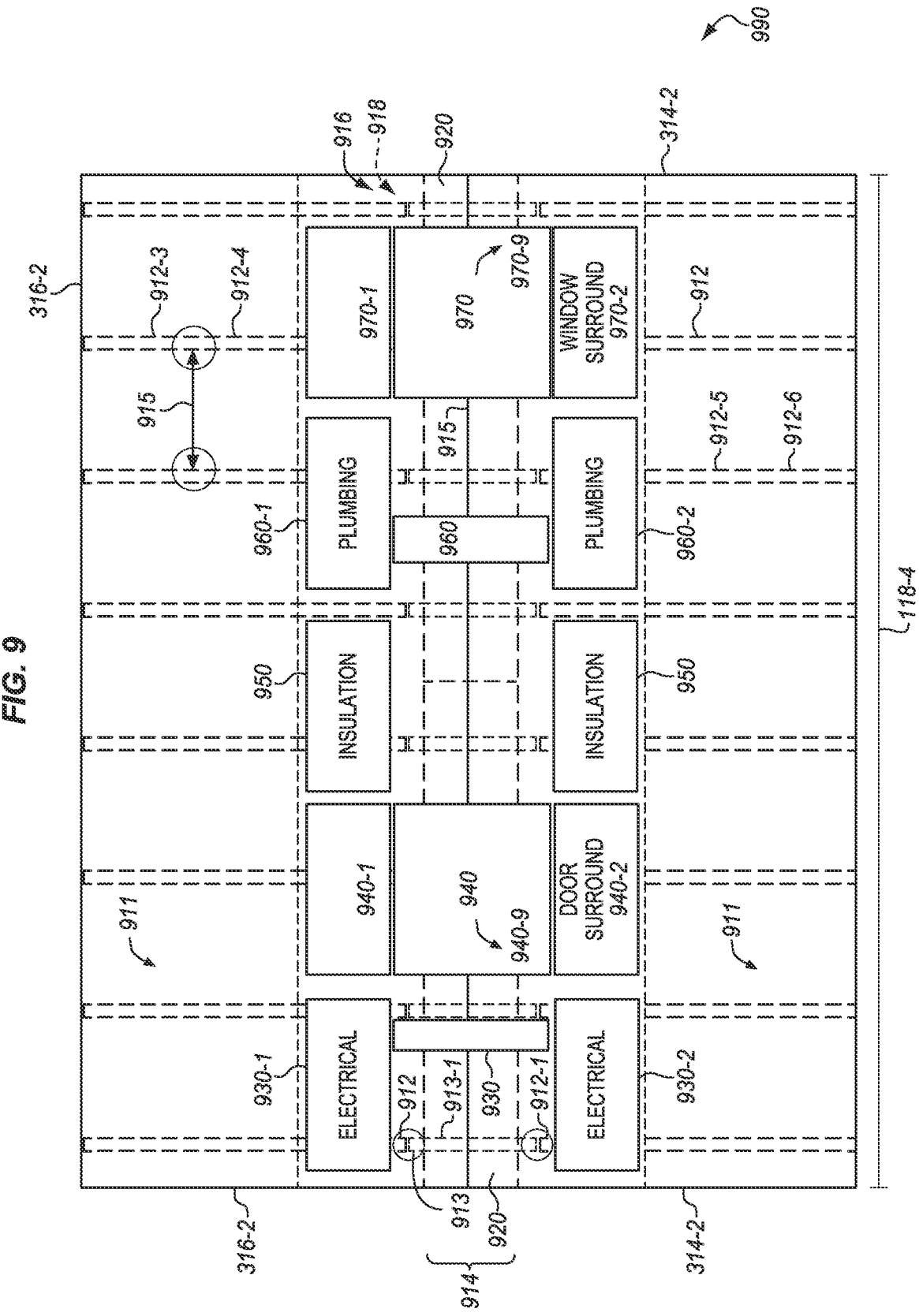

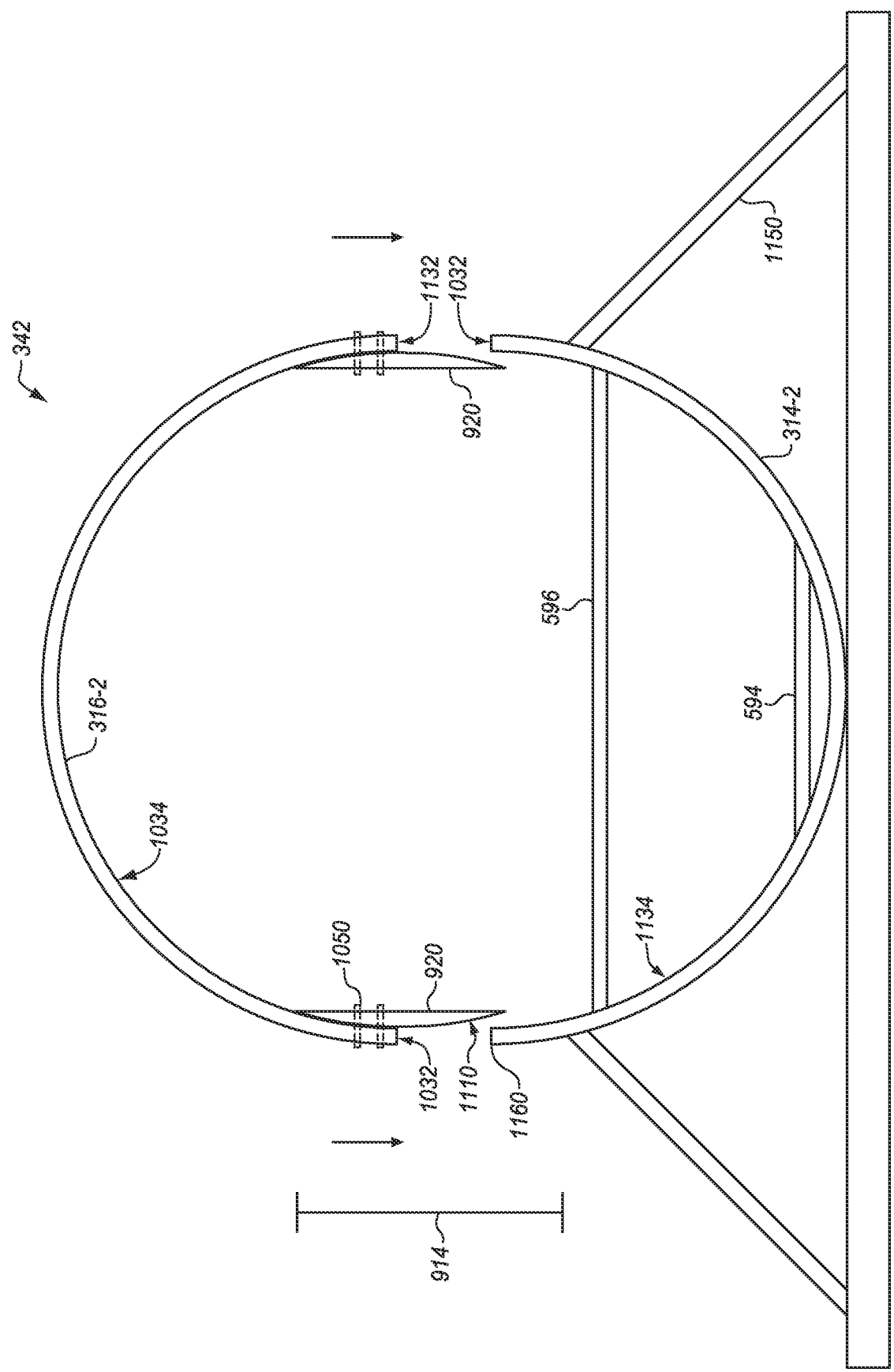

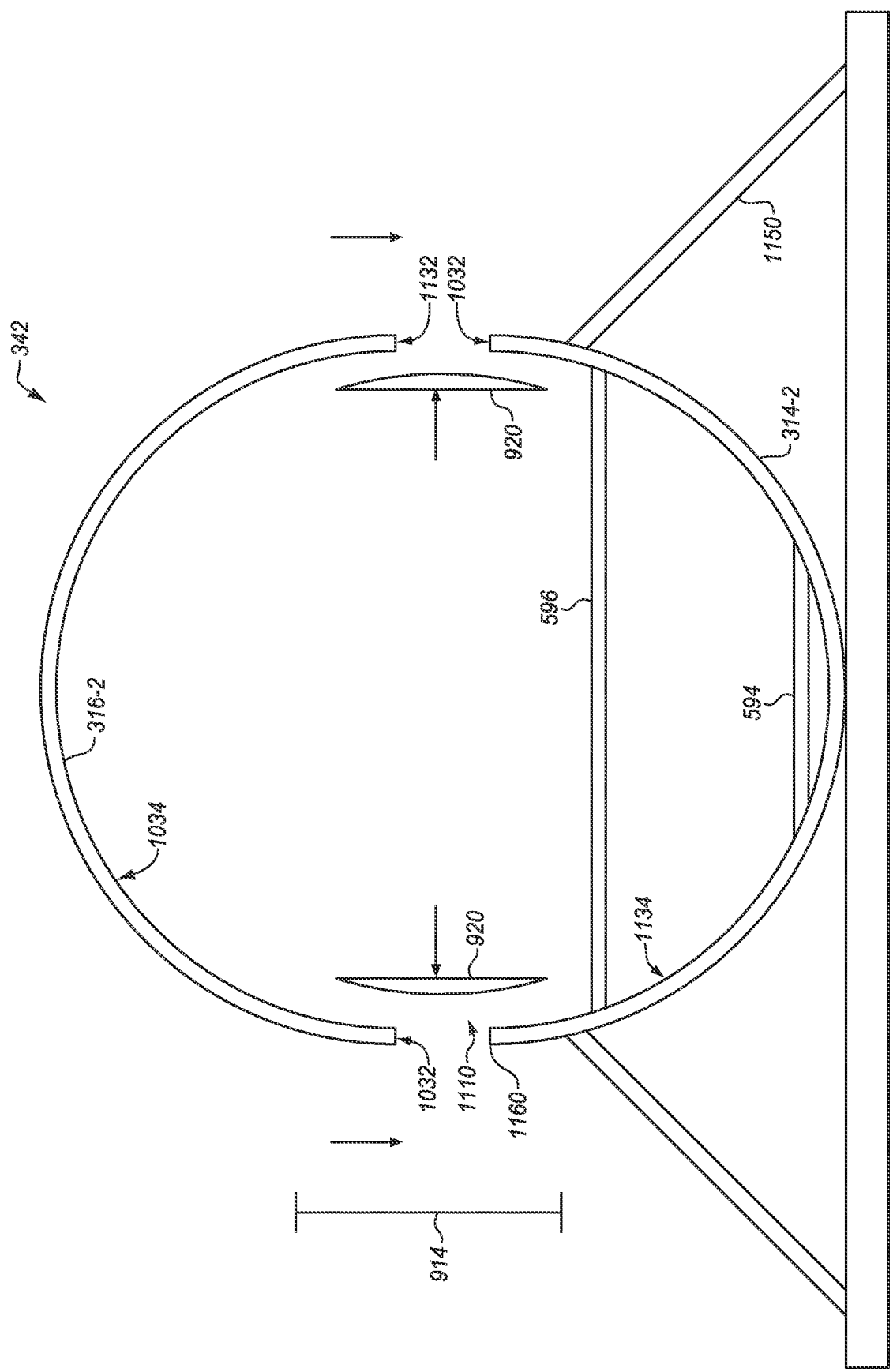

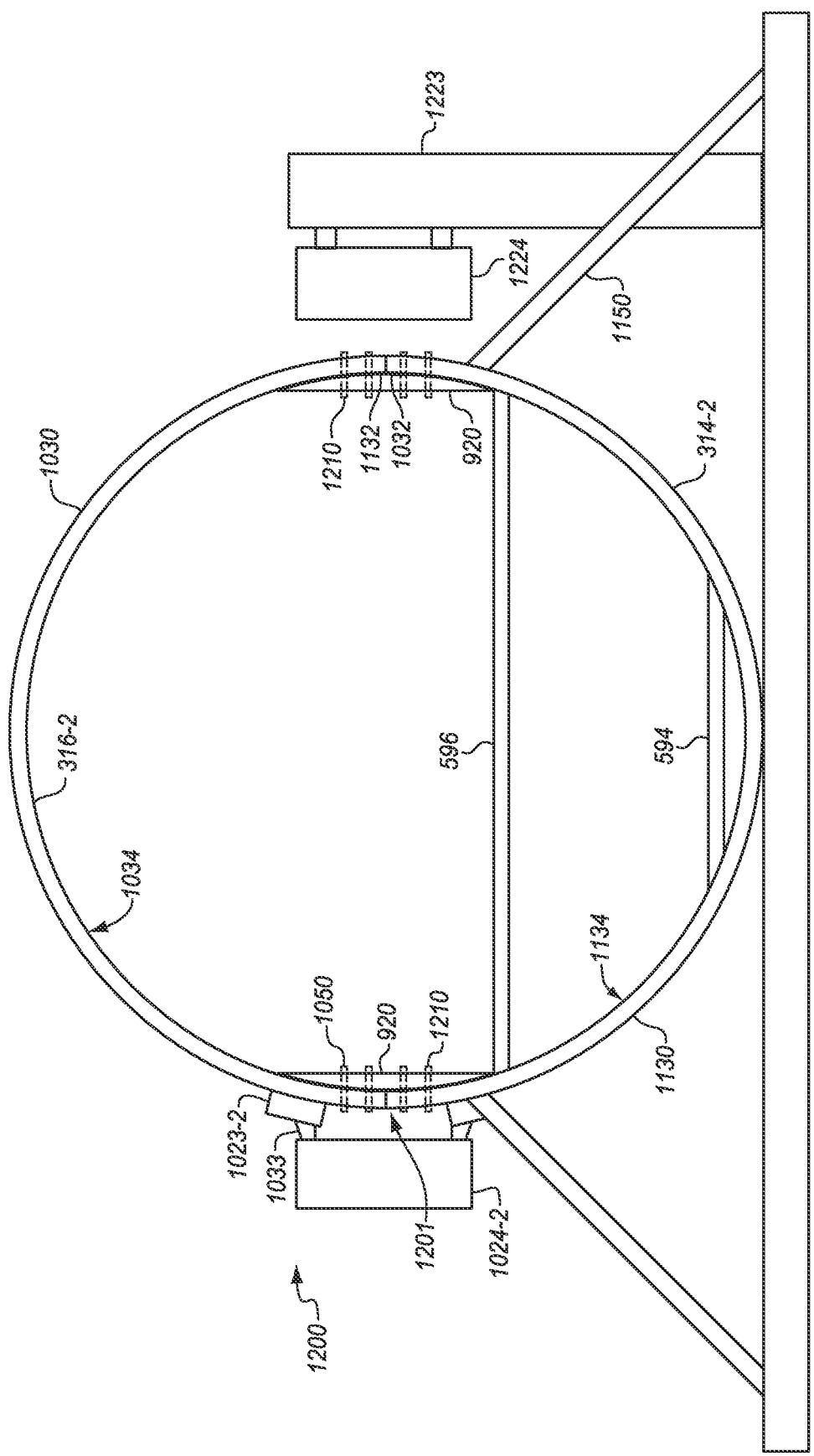

AIRCRAFT ASSEMBLY FORMED OF MATING HALF BARREL SECTIONS AND THE METHOD OF ASSEMBLING THE SAME

CROSS-REFERENCE TO RELATED APPLICATION

This application claims the benefit of U.S. Provisional Patent Application Ser. No. 63/115,062, filed Nov. 18, 2020, and entitled "Aircraft Assembly Formed of Mating Half Barrel Sections and the Method of Assembling the Same;" which is incorporated herein by reference in its entirety.

FIELD

The disclosure relates to the field of aircraft, and in particular, to fabrication of aircraft.

BACKGROUND

In the aerospace industry, operations relating to transport and assembly of airframe components are performed in fixed cells. In each cell, a structure is scanned and/or indexed to the cell, and then tools, equipment, and/or workers are brought to that portion of the structure needing to be worked upon in that cell. This process of scanning and/or indexing occurs every time a new structure is brought to the cell. Furthermore, when a structure is moved to a next cell, it is again scanned and/or indexed to the cell and the necessary tools, equipment, and/or workers are brought to that portion of the structure needing to be worked upon in that cell. Current assembly methods require tools, tooling and technicians to enter the half barrel sections through barrel ends or doorways. The tooling and tools have to be set up in place within the full barrel section. When work is completed, the tooling, tools and technicians have to be transported out through barrel ends or doorways.

Therefore, it would be desirable to have a method and apparatus that take into account at least some of the issues discussed above, to provide a fabrication process with enhanced accessibility for technicians, and a resulting structure with desirable design features.

SUMMARY

Embodiments described herein provide for continuous line assembly layouts and systems that enable work to be performed on moving airframe components which are pulsed or moved continuously in a process direction to cross the paths of stations which perform work on the airframe components. The work may include laying up a preform for hardening into a composite part, hardening the composite part in an autoclave, installing frames, cutting out holes for windows or doors, etc. These arrangements provide a technical benefit over prior systems because they reduce amounts of space required for fabrication and assembly at a factory floor, increase throughput, and reduce downtime.

One embodiment is a system that enables sections of the airframe to be fabricated in a continuous assembly line for fabricating upper and lower half barrels that are subsequently joined together such as with a butt splice with a splice plate. Work on the half barrel sections is facilitated by positioning the sections inverted onto a mandrel for improved access for tools and work being performed. The system includes at least portions of the assembly line indexing of the half barrel sections, and processor assisted monitoring and control of the progression of the sections along the assembly line, and coordination of the progression of the upper and lower half barrels to present the half barrel sections to a joining station for generating a particular segment of the airframe. Subsequent processes are used to join the segments into the fuselage using circumferential joining of the sections.

Another embodiment is airframe structure formed of segments of the fuselage which are created from mating half barrels joined together to form a circumferential section. In a preferred embodiment, upper and lower half barrels form each segment of the fuselage, wherein the upper and lower half barrels pass along an assembly line for installation of components and other manufacturing processes necessary for generating substantially complete half barrels, thus minimizing the manufacturing steps necessary within each circumferential section of the fuselage.

According to an aspect of the present disclosure, a method for assembling an airframe of an aircraft, the method comprising: receiving a half barrel section of fuselage; advancing the half barrel section in a process direction across multiple work stations at once; and performing work on the half barrel section via the multiple work stations simultaneously.

Advantageously, the method wherein: advancing the half barrel section is performed via an assembly line.

Preferably, the method further comprising advancing multiple half barrel sections in the process direction across the multiple work stations.

Preferably, the method wherein the multiple work stations perform work on the half barrel section during a same pause between micro pulses of the half barrel section in the process direction.

Preferably, the method further comprising micro pulsing the half barrel section through the multiple work stations according to a common takt time, wherein the common takt time is based on producing a number of desired half barrel sections per month.

Preferably, the method further comprising indexing the half barrel section to at least one work station during a pause between micro pulses.

Preferably, the method further comprising performing work on the half barrel section during a pause between micro pulses of the half barrel section in the process direction.

Preferably, the method further comprising performing work on the half barrel section during micro pulses of the half barrel section in the process direction between pauses.

Preferably, the method further comprising delivering components to one of the work stations as the half barrel section advances to the work station and joining the component to the half barrel section at the work station.

Preferably, the method wherein delivering the components is performed Just In Time (JIT) to the work station in an order of usage by the work station.

Preferably, the method further comprising joining the components to the half barrel section during a pause between micro pulses.

Preferably, the method wherein advancing the half barrel section comprises moving the half barrel section through the multiple work stations, which are separated from each other by a distance less than a length of the half barrel section.

Preferably, the method wherein the work stations separated by a distance equal to a multiple of a frame pitch for the half barrel section.

Preferably, the method wherein performing the work comprises operating the multiple work stations independently of each other.

Preferably, the method wherein a plurality of the multiple work stations remove material from the half barrel section.

Preferably, the method wherein a plurality of the multiple work stations add material to the half barrel section.

Preferably, the method wherein the work is selected from the group consisting of frame installation, window surround installation, door surround installation, door manufacturing excess trim and removal, window manufacturing excess trim and removal, trimming manufacturing excess from bearing edge, sealing, Non-Destructive Inspection (NDI) of the half barrel section, Non-Destructive Inspection (NDI) of an edge after separating manufacturing excess or window manufacturing excess or door manufacturing excess, and cleaning.

Preferably, the method further comprising joining the half barrel section to another half barrel section.

Preferably, the method further comprising operating feeder lines for the multiple work stations according to a takt time for the half barrel section.

Preferably, the method wherein each feeder line have a common takt time equal to or a fraction of a fuselage takt time.

According to an aspect of the present disclosure, an aircraft comprised of a fuselage having an elongated length between ends, wherein at least a portion of the length of the fuselage is formed of half barrel sections joined together at a plurality of butt splices.

Advantageously, the aircraft wherein at least one said half barrel sections of the fuselage is formed of an upper half barrel section and a lower half barrel section assembled with components and joined together into uniform cylindrical section and non-uniform cylindrical section, respectively.

Preferably, the aircraft wherein at least two said uniform cylindrical section and non-uniform cylindrical section of the fuselage are joined together along a circumferential joint.

Preferably, the aircraft wherein said joined upper half barrel section and lower half barrel section comprises a butt splice of the bearing edges with a splice plate secured to upper half barrel section and lower half barrel section by fasteners.

Preferably, the aircraft wherein said position of the fasteners comprises a row of fasteners located on each of the upper half barrel section and lower half barrel section.

Preferably, the aircraft wherein two rows of fasteners are positioned on each of the upper half barrel section and lower half barrel section.

Preferably, the aircraft wherein the product is assembled by a process wherein each half barrel section progresses through multiple work stations performing work on the half barrel section prior to joining to the mating half barrel section.

Preferably, the aircraft wherein each said mating half barrel section is assembled by a process of progressing through multiple work stations for performing assembly work on the to be mate half barrel sections at the same time prior to joining.

Preferably, the aircraft wherein each half barrel section comprises a half barrel body and at least one component secured to the half barrel section prior to joining to a corresponding half barrel section.

According to an aspect of the present disclosure, a system for assembling an airframe of an aircraft, the system comprising: an assembly line comprising: a track that receives half barrel section of fuselage, and that advances the half barrel section in a process direction through at least one work station along assembly line; and the work stations, which are arranged along the track in the process direction by a distance less than a length of the half barrel section, such that at least one of the work stations are enabled to perform work on a half barrel section at a time.

Advantageously, the system wherein half barrel section advances the in the process direction through a plurality of work stations and a multiple of work stations perform work upon half barrel section at a time.

Preferably, the system wherein the work stations perform work selected from the group consisting of frame installation, window installation, door installation, trimming, sealing, Non-Destructive Inspection (NDI) of the half barrel sections, Non-Destructive Inspection (NDI) of a trimmed edge, and cleaning.

Preferably, the system wherein the work stations perform work on one of the half barrel sections during a pause in the process direction between micro pulses of the half barrel section.

Preferably, the system wherein components are delivered to the work stations Just In Time (JIT) in an order of usage.

Preferably, the system further comprising feeder lines that have a takt time equal to a fraction of a fuselage takt time.

Preferably, the system wherein the distance is equal to a frame pitch in the process direction.

Preferably, the system wherein the work stations remove material from the half barrel section.

Preferably, the system wherein the half barrel sections comprise both upper half barrel sections and lower half barrel sections.

Preferably, the system wherein a plurality of the work stations remove material from the half barrel section.

Preferably, the system wherein a plurality of the work stations add material to the half barrel section.

Fabricating a portion of an aircraft using the system described aboveClick here to enter text.

According to an aspect of the present disclosure, a method of manufacturing an aircraft comprising: progressing a series of half barrel sections through a series of work stations at a common takt time; delivering a subcomponents of a first type just in time to a station along with a subcomponent of a second type produced in parallel with the subcomponent of the first type; and joining the subcomponent to the half barrel sections.

Advantageously, the method wherein the subcomponents are delivered according to a takt time, which is equal to or a fraction of a fuselage takt time.

Preferably, the method wherein the work stations perform work on the half barrel sections during a same pause between micro pulses of the half barrel sections in a process direction.

Preferably, the method wherein subcomponents are delivered to the work stations Just In Time (JIT) and in an order of usage.

Preferably, the method further comprising performing work on the half barrel sections via one or more work stations at the same time.

Preferably, the method wherein progressing comprises iteratively micro pulsing the half barrel sections by less than its length, then pausing while work is performed on the half barrel sections.

Preferably, the method further comprising progressing comprises iteratively micro pulsing the half barrel sections by at least its length, then pausing while work is performed on the half barrel sections.

Preferably, the method further comprising progressing comprises continuously moving the half barrel sections while work is performed on the half barrel sections.

Preferably, the method further comprising joining the subcomponent and the half barrel sections together at work station after a micro pulse.

Preferably, the method further comprising joining two half barrel sections to form a full barrel section.

Preferably, the method wherein a plurality of the work stations remove material from the subcomponent.

A portion of an aircraft assembled according to the method as described above.

According to an aspect of the present disclosure, a method for assembling an airframe of an aircraft, the method comprising: receiving a half barrel section of fuselage in an assembly line; coupling a splice plate to the half barrel section; aligning the half barrel section and coupled splice plate to another half barrel section; and joining the half barrel section together via the splice plate.

Advantageously, the method wherein joining two half barrel sections comprises butt splicing together each half barrel section.

Preferably, the method wherein the splice plate is installed onto an Inner Mold Line (IML) of the half barrel section.

Preferably, the method wherein the splice plate is installed onto an Outer Mold Line (OML) of the half barrel section.

Preferably, the method wherein at least one splice plate is installed, at least partially, onto an upper half barrel section and at least one splice plate is installed, at least partially, onto a lower half barrel section.

Preferably, the method wherein the splice plate is installed at an assembly line that the half barrel section travels through.

Preferably, the method wherein installing the splice plate is performed during installation of a crown module or floor grid into the half barrel section.

Preferably, the method wherein the splice plate is installed at both an upper half barrel section and a lower half barrel section at the same time.

Preferably, the method wherein installing the splice plate comprises installing multiple segments of splice plate along a length of the upper half barrel section and/or lower half barrel section.

Preferably, the method wherein installing the splice plate is performed during pauses between micro pulses of the upper half barrel section and/or lower half barrel section at the assembly line.

Preferably, the method wherein aligning the upper half barrel section with the lower half barrel section comprises rotating the lower half barrel section from a vertically inverted orientation to an orientation complementary to joining with upper half barrel section.

Preferably, the method further comprising placing the lower half barrel section in a cradle prior to aligning the upper half barrel section with the lower half barrel section.

Preferably, the method wherein attaching the splice plate comprises driving fasteners through the splice plate while the splice plate contacts an Inner Mold Line (IML) of the upper half barrel section and an IML of the lower half barrel section.

A portion of an aircraft assembled according to the method described above.

According to an aspect of the present disclosure, a non-transitory computer readable medium embodying programmed instructions which, when executed by a processor, are operable for performing a method for assembling an airframe of an aircraft, the method comprising: receiving a half barrel section of fuselage in an assembly line; installing a splice plate; aligning the half barrel section with another half barrel section of fuselage; and joining the half barrel sections by attaching the splice plate.

According to an aspect of the present disclosure, a system for assembling an airframe of an aircraft, the system comprising: an assembly line that transports a half barrel section of fuselage in a process direction; a join station 342 that installs a splice plate; a cradle (1150) that holds a half barrel section of fuselage; and a join work station that joins half barrel sections by attaching the splice plate.

Advantageously, the system wherein joining the half barrel sections comprises forming a butt splice between the half barrel sections.

Preferably, the system wherein the splice plate is installed onto an Inner Mold Line (IML) of the half barrel sections.

Preferably, the method wherein the splice plate is installed onto an Outer Mold Line (OML) of the half barrel sections.

Preferably, the system wherein the splice plate is installed partially onto an upper half barrel section and partially onto a lower half barrel section.

Preferably, the system wherein the join station is after the assembly line.

Preferably, the system wherein installing the splice plate is performed during installation of a crown module or floor grid into the half barrel section.

Preferably, the system wherein the splice plate is installed at both an upper half barrel section and the lower half barrel section at the same time.

Preferably, the system wherein the join station installs the splice plate at each side of an Inner Mold Line (IML) of the upper half barrel section and/or the lower half barrel section.

Preferably, the system wherein the join station installs multiple segments of splice plate along a length of the upper half barrel section.

Preferably, the system wherein the join station includes end effectors that align the splice plate and install fasteners through the splice plate.

Preferably, the system wherein the join work station attaches the splice plate by driving fasteners through the splice plate while the splice plate contacts an Inner Mold Line (IML) of the upper half barrel section and an IML of the lower half barrel section.

Fabricating a portion of an aircraft using the system as described above.

Another embodiment is a method for assembling an airframe of an aircraft, the method comprising: receiving a first set of lower half barrel sections and a second set of upper half barrel sections of fuselage; advancing the first set of lower half barrel sections and the second set of upper half barrel sections in a process direction across multiple work stations at once; and performing work on at least one of the first set of lower half barrel sections and at least one of the second set of upper half barrel sections via the multiple work stations simultaneously, wherein the at least one of the first set of lower half barrel sections and the at least one of the second set of upper half barrel sections are fabricated in alternating fashion, such that the at least one of the first set of lower half barrel sections and the at least one of the second set of upper half barrel sections are paired for joining into the same full barrel section of the fuselage.

Another embodiment is a system for assembling an airframe of an aircraft, the system comprising: an assembly line comprising: a plurality of work stations; and a track that receives a first set of lower half barrel sections and a second set of upper half barrel sections of fuselage, and that advances the first set of lower half barrel sections and the second set of upper half barrel sections in a process direction through at least one work station of the plurality of work stations arranged along the assembly line at once, wherein the plurality of work stations, which are arranged along the track in the process direction, are separated by a distance less than a length of the half barrel section, such that at least one of the plurality of work stations are enabled to perform work on at least one of the first set of lower half barrel sections and at least one of the second set of upper half barrel section at a time, wherein the at least one of the first set of lower half barrel sections and the at least one of the second set of upper half barrel sections are fabricated in alternating fashion, such that the at least one of the first set of lower half barrel sections and the at least one of the second set of upper half barrel sections are paired for joining into the same full barrel section of the airframe.

Another embodiment is a method of manufacturing an aircraft comprising: progressing a first series of lower half barrel sections and a second series of upper half barrel sections through a series of work stations at a common takt time; delivering a subcomponent of a first type just in time to a station along with a subcomponent of a second type produced in parallel with the subcomponent of the first type; and joining simultaneously the subcomponent of the first type to at least one of the first series of lower half barrel sections and the subcomponent of the second type to at least one of the second series of upper half barrel section, wherein the at least one of the first series of lower half barrel sections and the at least one of the second series of upper half barrel sections are fabricated in alternating fashion, such that the at least one of the first series of lower half barrel sections and the at least one of the second series of upper half barrel sections are paired for joining into the same full barrel section of the fuselage.

Another embodiment is a method for assembling an airframe of an aircraft, the method comprising: receiving a first half barrel section and a second half barrel section of fuselage in an assembly line; coupling a splice plate to the first half barrel section; placing the first half barrel section in a cradle; aligning the first half barrel section and coupled splice plate with the second half barrel section; and joining the first half barrel section and coupled splice plate to the second half barrel section by attaching the splice plate to the second half barrel section, wherein aligning the first half barrel section and coupled splice plate with the second half barrel section comprises longitudinally rotating, using the cradle, the first half barrel section and coupled splice plate from a vertically inverted orientation to an orientation complementary to joining the first half barrel section and coupled splice plate to the second half barrel section.

Another embodiment is a non-transitory computer readable medium embodying programmed instructions which, when executed by a processor, are operable for performing a method for assembling an airframe of an aircraft, the method comprising: receiving a first half barrel section and a second half barrel section of fuselage in an assembly line; coupling a splice plate to the first half barrel section; placing the first half barrel section in a cradle; aligning the first half barrel section and coupled splice plate with the second half barrel section of fuselage; and joining the first half barrel section and coupled splice plate to the second half barrel section by attaching the splice plate to the second half barrel section, wherein aligning the first half barrel section and coupled splice plate with the second half barrel section comprises longitudinally rotating, using the cradle, the first half barrel section and coupled splice plate from a vertically inverted orientation to an orientation complementary to joining the first half barrel section and coupled splice plate to the second half barrel section.

Another embodiment is a system for assembling an airframe of an aircraft, the system comprising: an assembly line that transports a first half barrel section and a second half barrel section of fuselage in a process direction; a join station that installs a splice plate comprising coupling the splice plate to the first half barrel section; a cradle that holds the first half barrel section of fuselage; and a join work station that aligns the first half barrel section and coupled splice plate with the second half barrel section and joins the first half barrel section and coupled splice plate to the second half barrel section by attaching the splice plate to the second half barrel section, wherein the cradle is configured to longitudinally rotate the first half barrel section and coupled splice plate from a vertically inverted orientation to an orientation complementary to join the first half barrel section and coupled splice plate to the second half barrel section while the join work station aligns the first half barrel section and coupled splice plate with the second half barrel section before the join work station joins the first half barrel and coupled splice plate to the second half barrel section.

Other illustrative embodiments, including variations and methods and computer-readable media relating to the foregoing embodiments, are described below. The foregoing features, functions, and advantages that have been discussed and are disclosed herein can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 7 is a flowchart depicting a method for utilizing the floor grid assembly line of FIG. 5 in an illustrative embodiment.

FIG. 8 is a flowchart depicting a method of installing splice plates for joining fuselage sections in an illustrative embodiment.

FIG. 9 is a block diagram depicting sections coupled via splice plates in an illustrative embodiment.

FIGS. 11A and 11B shows an end view of upper and lower half barrel sections to be joined together with a butt splice.

FIG. 12 is an end view of an upper and lower half barrel sections, taken along 12A-12A in FIG. 1A.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The subcomponents 398-10, such as, but not limited to, frames 398-2, 398-4 and window surrounds 398-3 and door surrounds 398-5, discussed herein may be fabricated from metal or may be fabricated as composite parts. Composite parts, such as Carbon Fiber Reinforced Polymer (CFRP) parts, are initially laid-up in multiple layers that together are referred to as preforms. Individual fibers within each layer of a preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
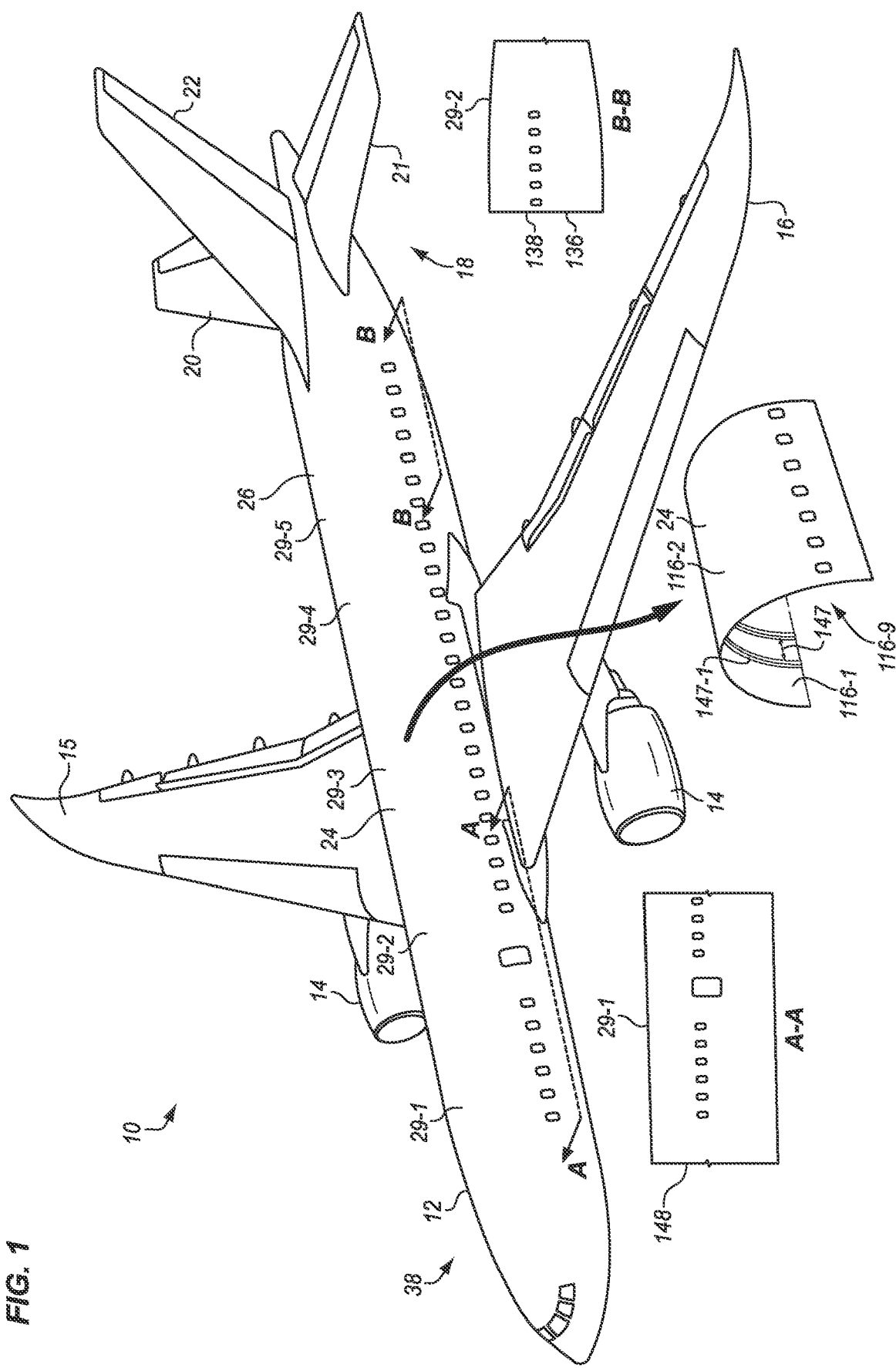
FIG. 1 depicts an assembled aircraft in an illustrative embodiment, including illustration of sections of the fuselage.

Turning now to FIG. 1, an illustration of an aircraft is depicted in which an illustrative embodiment may be implemented. Aircraft 10 is an example of an aircraft which can be formed of half barrel sections of FIG. 1A, respectively. Aircraft 10 is formed of half barrel sections 24 of fuselage 12. In this illustrative example, aircraft 10 has wing 15 and wing 16 attached to Fuselage 12. Aircraft 10 includes engine 14 attached to wing 15 and engine 14 attached to wing 16. Fuselage 12 has tail section 18 and a nose section 38. Horizontal stabilizer 20, horizontal stabilizer 21, and vertical stabilizer 22 are attached to tail section 18 of Fuselage 12. Fuselage 12 is fabricated from finalized half barrel sections 24 with an upper half barrel section 126 (FIG. 1A) joined to a lower half barrel section 128 to form a full barrel section 29-1, 29-2, 29-3, 29-4, 29-5. The full barrel section 146 corresponds to view A-A and full barrel section 136 corresponds to view B-B and are serially fastened into fuselage 12. Wing 15 and 16 are formed of wing panels 30 comprising upper wing panel 32 and a lower wing panel 34 joined together.

Figure 1A:
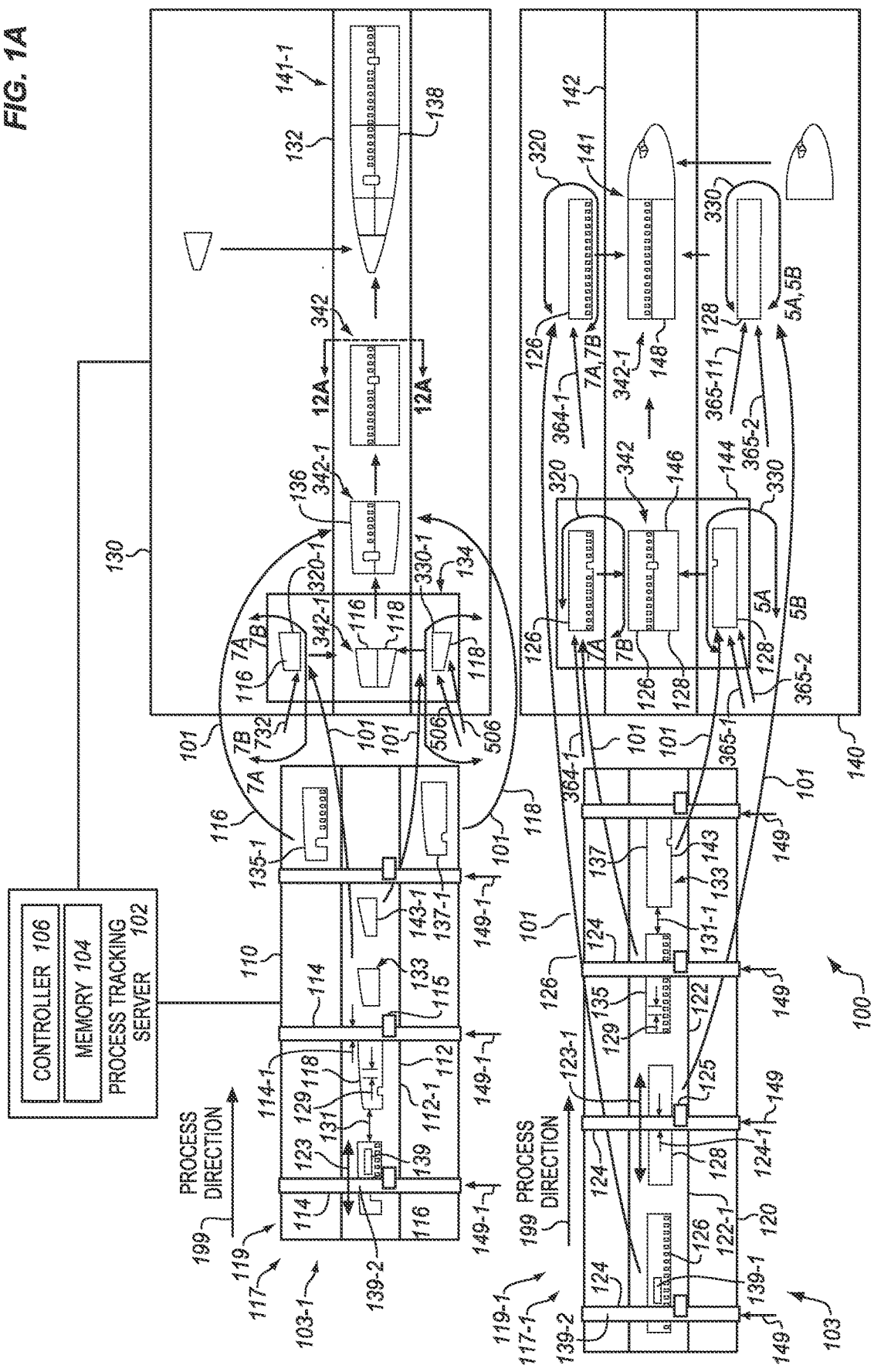
FIG. 1A depicts an assembly environment for a factory in an illustrative embodiment.

FIG. 1A depicts an assembly environment 100 in an illustrative embodiment. Assembly environment 100 comprises an arrangement of machinery and tools that facilitates efficient and repeatable fabrication of aircraft. Assembly environment 100 has been enhanced to enable wing panels or sections of fuselage, to be fabricated and assembled on continuous, micro pulsed and/or pulsed assembly lines. This enables the portion of the structure needing work to be brought to workers, tools, and equipment, instead of requiring workers, equipment, and tools be brought to or into the structure. Assembly environment 100 provides a substantial benefit by reducing the amount of non-value added time to an airframe being assembled, and also by reducing the amount of space occupied at the factory floor by increasing work density.

Figure 3:
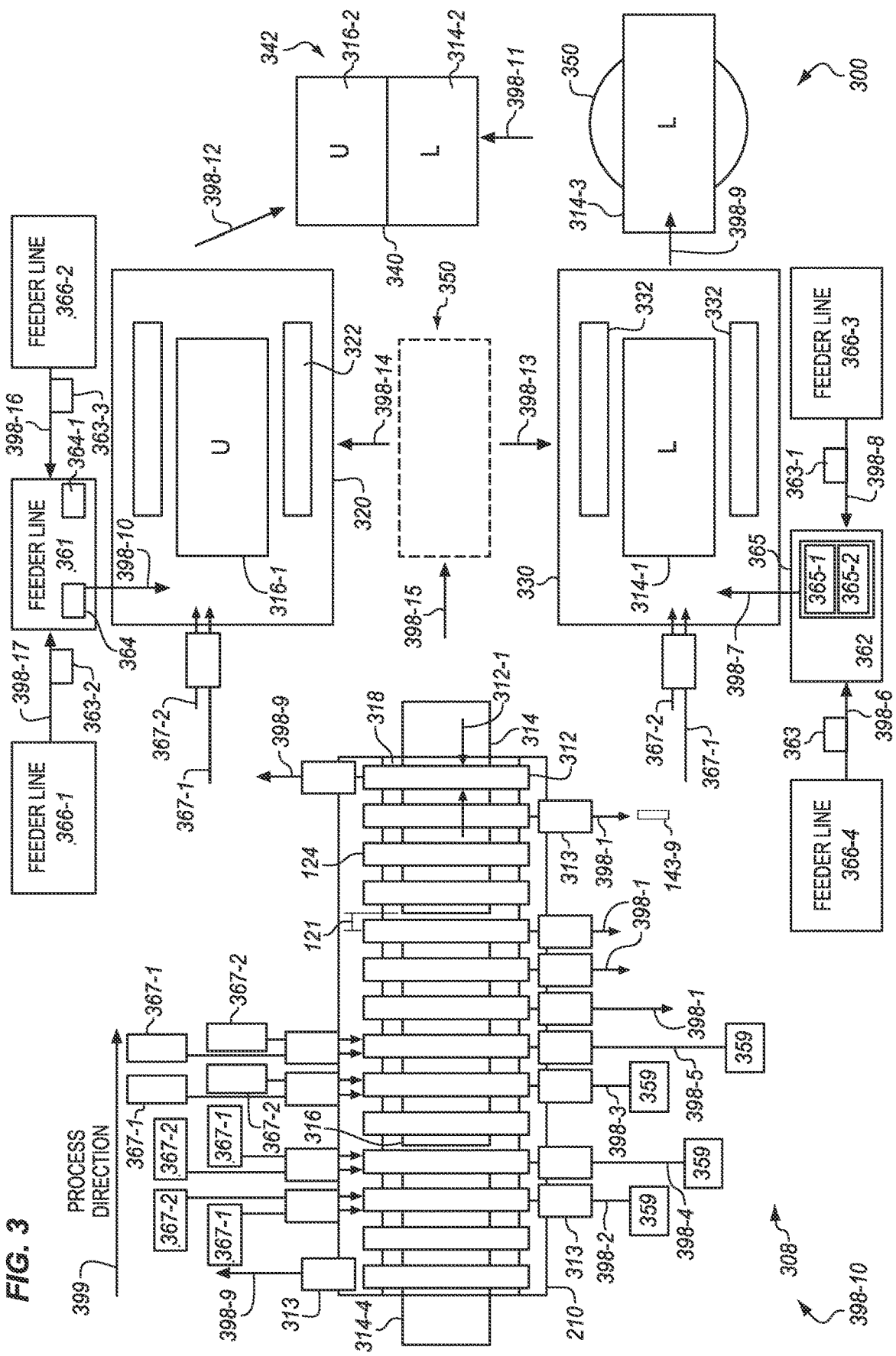
FIG. 3 illustrates a hybrid fabrication system that utilizes parallel and serial assembly lines for processing upper sections and lower sections of fuselage in an illustrative embodiment.

In this embodiment, assembly environment 100 includes assembly line 110 for fabricating sections of fuselage that exhibit non-uniform cross sections across their length, and further includes assembly line 120 for fabricating sections of fuselage that exhibit largely uniform cross sections across their length. Both of the assembly line 110 and the assembly line 120 process upper half barrel section 116 and 126 and a complementary lower half barrel section 118 and 128, respectively. The assembly line 110 process the lower half barrel section 118 for delivery to assembly stage 330-1 (i.e. floor grid attach station 530) for joining to a passenger floor grid 365-1 and cargo floor grid 365-2. The assembly line 110 process the upper half barrel section 116 and deliver it to assembly stage 320 for joining to a crown module 364-1. The assembly line 120 process the lower half barrel section 128 and deliver it to an assembly stage 330 (FIG. 3) (i.e. floor grid attach station 530-1) for joining to a passenger floor grid 365-1 and cargo floor grid 365-2. The assembly line 120 process the upper half barrel section 126 and delivers it to assembly stage 320 (FIG. 3) (i.e. crown module attach station 730-1) for joining to a crown module 364 (FIG. 3). In further embodiments, additional assembly lines fabricate wings for assembly together with the fuselage to form a complete airframe. The assembly lines 110, 120 are either operated in a pulsed fashion where the upper half barrel sections 116, 126 and lower half barrel sections 118, 128 advance in a process direction 199 a distance equal to a pulse length 123, 123-1 or a micro pulse 129. A micro pulse 129 is less than pulse length 123, 123-1 and in an embodiment is equal to a frame pitch 915 between frames 912 (FIG. 9) of the upper half barrel sections 116, 126 and lower half barrel sections 118, 128 or a fraction or multiple thereof. Frame pitch 915 in an embodiment is about eighteen to about 24 inches. After the micro pulse 129, the upper half barrel sections 116, 126 and lower half barrel sections 118, 128 pause, then micro pulse again 129 in a process direction 199. Another embodiment has the upper half barrel sections 116, 126 and lower half barrel sections 118, 128 continuously advance in the process direction 199 without pause. Thus, the assembly lines 110, 120 discussed herein enable composite parts to proceed with a desired takt across multiple different work stations 114 in pulsed 123, 123-1, micro pulsed 129 or continuous fashion. Half barrel sections 117 include upper half barrel sections 116, 126 and lower half barrel sections 118, 128. Arcuate sections 119, 119-1 include quarter barrel sections and one third barrel sections.

The assembly lines 110, 120 discussed herein may further be operated to fabricate multiple sets of half barrel sections 117, 117-1 or arcuate sections 119, 119-1, where spacing between each half barrel sections 117 or arcuate sections 119, 119-1 is a distance of a length of the half barrel sections 117, 117-1 or arcuate sections 119, 119-1, and at minimum a fraction or multiple of frame pitch 915. Half barrel sections 117, 117-1 correspond to half barrel section 24 after processing through assembly line 110 or assembly line 120, respectively.

The assembly line 110 may be designed with work stations 114 that are capable of accommodating more exotic shapes such as tapered half barrel sections 117 or arcuate sections 119 near the nose section 38 or tail section 18. Work stations 114 exhibit a broader range of motion in order to accommodate the tapered nature of the half barrel sections 117 or arcuate sections 119. The assembly line 110 further includes a track 112-1, along which upper half barrel sections 116 and lower half barrel sections 118 proceed in a process direction 199. The track 112-1 brings the half barrel section 117 in a process direction 199 to tools and equipment (not shown) disposed at work stations 114, which are serially arranged in a process direction 199. The track 112-1 may comprise a series of discrete stanchions having rollers, a rail or set of rails (not shown), etc., and airframe at the track 112-1 may be pulsed incrementally in the process direction 199 across the work stations 114. Work stations 114 are serially aligned, and the half barrel sections 117 or arcuate sections 119 proceed through the work stations 114 serially. While only a few work stations 114 are shown, work stations 114 perform operations such as, but not limited to, demolding, installing window surrounds, installing door surrounds, trimming manufacturing excess, installing frames, cutting out window manufacturing excess or otherwise removing material, NDI inspection, edge sealing, cutting out door manufacturing excess, installing windows and installing doors each in a dedicated work station 114. In one embodiment, the work stations 114 perform work on a section of fuselage simultaneously. In a further embodiment, the work stations 114 are arranged at a work density, at least in part, based on a takt time for half barrel section 117 or arcuate section 119 being fabricated.

During these processes, tooling such as layup mandrels may be placed onto or removed from the track 112-1 as needed. In one embodiment, the track 112-1 includes a drive system 112, such as a chain drive, that moves the sections, although in further embodiments the sections are independently driven along the track 112-1.

In one embodiment, the upper half barrel sections 116 and the lower half barrel sections 118 are pulsed synchronously at the same time by the same amount of distance in the process direction 199. The work stations 114 then perform work upon upper half barrel section 116 or arcuate section 119 in pauses between the pulses and/or during pauses at a common takt time. Thus, during the fabrication process, multiple work stations 114 work upon the upper half barrel sections 116 and/or the lower half barrel sections 118 during the same pause between micro pulses 129 and/or during micro pulse 129.

In one embodiment of assembly line 110 or 120, one or more work stations 114, 124 also perform their work independently or synchronously upon the same half barrel section 117, 117-1 or arcuate section 119, 119-1 during a pulse. This work may include Non-Destructive Inspection (NDI), trimming of a manufacturing excess, or application of a sealant or other processes. In further embodiments, the upper half barrel sections 116 and the lower half barrel sections 118 proceed continuously along the track 112-1, and the work stations 114 perform work on the sections as the sections continue to move.

In some embodiments of assembly line 110 or 120, the work stations 114, 124 are spaced with predetermined gaps 131, 131-1, such as equal to a micro pulse 129 distance such as a fraction or multiple of frame pitch 915 or any distance less than or equal to a length of half barrel section 117, 117-1 or arcuate section 119, 119-1. Gaps 131, 131-1 help to account for production delays, such as re-work or out of position work of half barrel section 117, 117-1 or arcuate section 119, 119-1 or work station 114, 124 maintenance and/or technician break time. Re-work or out of position work is performed when a portion of half barrel section 117, 117-1 or arcuate section 119, 119-1 needing re-work or out of position work is between work stations 114, 124 or within work stations that do not need to perform work such as a window surround installation station opposite a lower half barrel section 118. This enables unaccounted-for delays to be absorbed into the production process. The rework or out of position work discussed above can be performed within gaps 131, 131-1 between the work stations 114, 124. Furthermore, in one embodiment, half barrel section 117, 117-1 or arcuate section 119, 119-1 continues to progress through the work stations 114, 124 while the rework or out-of-position work is being performed. Thus, the assembly environment 100 does not stop advancing in process direction 199 to work upon half barrel section 117, 117-1 or arcuate section 119, 119-1 to accommodate rework or out-of-position work.

During the movement or in between micro pulses 129 of or pulse length 123, 123-1, half barrel section 117, 117-1 or arcuate section 119, 119-1 encounter the indexing components 115 at the work stations 114, 124, which physically interact with or nondestructively inspect indexing features 133 at the upper half barrel sections 116, 126 and lower half barrel sections 118, 128 and enable alignment to the work stations 114, 124 before work is performed. The indexing components 115, such as physical features or Radio Frequency Identifier (RFID) chips, are engaged by an indexing engaging device associated with the work station 114, 124. Each indexing component 115 conveys to the work station 114, 124 a 3D characterization of the Inner Mold Line (IML) loft 116-1 and/or Outer Mold Line (OML) loft 116-2 (FIG. 1) of the upper half barrel sections 116, 126 and lower half barrel sections 118, 128 within a purview 114-1, 124-1 of the work station 114, 124 and instructions to the work station 114, 124 about the work to be performed by the work station 114, 124 upon the upper half barrel sections 116, 126 and lower half barrel sections 118, 128. This process can be performed multiple times, and at the same time, per pulse for respective multiple work stations 114, 124. The work stations 114, 124 may then perform the work during the pause between micro pulses 129 or during the micro pulses 129 themselves.

The indexing components 115 comprise hard stops, pins, holes, or grooves that are complementary to the indexing features 133 for physical securement thereto. An embodiment has many indexing features arrayed upon the upper half barrel sections 116, 126 and lower half barrel sections 118, 128. In further embodiments, the indexing components 115 comprise laser, ultrasonic, or visual inspection systems that track indexing features 133. Indexing features 133 also include RFID chips and RFID readers are another embodiment of indexing component 115, 125, that read RFID chips. These non-contact techniques may be utilized, for example, within assembly lines 110, 120 that continuously move upper half barrel sections 116, 126 and lower half barrel sections 118, 128. In further embodiments, indexing components 115 of hard stops, pins, holes, or grooves that are complementary to the indexing features 133 is utilized for continuous movement systems. In such embodiments, engagement of indexing features 133 to indexing components 115 occur during the advancement of the upper half barrel sections 116, 126 and lower half barrel sections 118, 128 within purview 114-1, 124-1 of the next work station 114, 124. The work station 114, 124 can track the half upper half barrel sections 116, 126 and lower half barrel sections 118, 128 as it advances in the process direction 199. Another embodiment has all or part of the work station 114, 124 attaching to the upper half barrel sections 116, 126 and lower half barrel sections 118, 128 and riding along as a riding along work station 139, 139-1 with it as it progresses in micro pulse 129, pulse or continuously. The riding along work station 139, 139-1 performs its work upon the upper half barrel sections 116, 126 and lower half barrel sections 118, 128 and then separates and returns to the attachment point 139-2 for future use. The riding along work station 139, 139-1 is a flex track or some similar device. An example of the riding along work station 139, 139-1 is the flex track device 1024 that follow a track 1023 removably installed onto the upper half barrel section 116, 126 and/or lower half barrel section 118, 128.

The upper half barrel sections 116, 126 and lower half barrel sections 118, 128 are laid up upon a layup mandrel orientated with the crown 135, 135-1 and the keel 137, 137-1 up, respectively. The orientation of the upper half barrel sections 116, 126 and lower half barrel sections 118, 128 is maintained from demold through floor grid installation and up to 136, 146 where just prior the lower half barrel sections 118, 128 is inverted into a keel 137, 137-1 down orientation in inversion station 560 (FIG. 5) just prior to join station 342, 342-1. This enables different work stations 114, 124 to serially process the upper half barrel sections 116, 126 and lower half barrel sections 118, 128 in a pulsed manner through the same work stations 114, 124 during fabrication.

In one embodiment, the orientation upper half barrel sections 116, 126 and lower half barrel sections 118, 128 on assembly line 110, 120, respectively, is set by a layup mandrel upon which the sections were laid up. The layup mandrel progresses from layup through cure with a preform laid-up onto it. After hardening, the upper half barrel sections 116, 126 and lower half barrel sections 118, 128 is then removed from the layup mandrel without changing the upper half barrel sections 116, 126 and lower half barrel sections 118, 128 orientation.

In further embodiments where more than one assembly line 110 is utilized, assembly line 120 facilitates fabrication of additional sections, such as those exhibiting non-cylindrical or cylindrical cross-sectional shapes. In an embodiment, multiple aircraft models are processed in serial on assembly lines 110, 120. An upper half barrel sections 116, 126 and lower half barrel sections 118, 128 for one model serially proceed down the assembly line 110, 120 followed by the upper half barrel sections 116, 126 and lower half barrel sections 118, 128 of a different model. For example, a lower half barrel sections 118, 128 progresses down an assembly line 110, 120 followed by a complementary upper half barrel sections 116, 126. Likewise, these lower half barrel sections 118, 128 and upper half barrel sections 116, 126 are followed by another aircraft model's lower half barrel sections 118, 128 and upper half barrel sections 116, 126, followed by the lower half barrel sections 118, 128 and upper half barrel sections 116, 126 of the another model and so forth between one model and another model, Additionally, more than one assembly line 110, 120 each are also envisioned is some embodiments to make sure that upper half barrel sections 116, 126 and lower half barrel sections 118, 128 are produced at a desire rate.

In some embodiments, work stations 114, 124 discussed herein have the capability of performing work on different portions of different upper half barrel sections 116, 126 and lower half barrel sections 118, 128 diameters to accommodate the different diameters from model to model. Each indexing operation between indexing components 115, 125 and indexing features 133 informs a processor in communication with the work station 114, 124 what lower half barrel sections 118, 128 and upper half barrel sections 116, 126 of either model is within its purview 114-1, 124-1 and what work needs to be performed, or if no work needs to be performed. For example, window manufacturing excess cut out stations may refrain from creating window cut outs when a lower half barrel section 118, 128 is within their purview 114-1, 124-1 when a window cut out is not needed.

Arrows 101 indicate where upper half barrel section 116, lower half barrel section 118 are moved to after they have proceeded through an assembly line 110. For example, arrows 101 depict lower half barrel section 118 and upper half barrel section 116 being moved to an assembly stage 320 and assembly stage 330, respectively, and then to join station 342-1, for joining, and movement to different assembly lines, etc. Arrows 101 indicate where lower half barrel sections 118, 128 and upper half barrel sections 116, 126 are moved to after they have proceeded through an assembly line 120. For example, arrows 101 depict lower half barrel section 128 and upper half barrel section 126 being moved to a join station 342, 342-1 for joining, and movement to different assembly lines, etc.

The assembly line 120 includes track 122-1, along which upper half barrel section 126 and lower half barrel section 128 proceed in the process direction 199 in a similar fashion to that described above for the assembly line 110. The assembly line 120 further includes stations 124 having indexing components 125. The work stations 124, indexing components 125, and track 122-1 may be implemented in a similar fashion to similarly recited components of the assembly line 110. However, the stations 124 may differ in that they may be more tightly conformed to each of the upper half barrel section 126 and lower half barrel section 128 being worked upon. There is less cross sectional variation between the upper half barrel section 126 and the lower half barrel section 128 than upper half barrel section 116 and the lower half barrel section 118. Upper half barrel section 126 and the lower half barrel section 128 of assembly line 120 are more uniform in shape and size than of the upper half barrel section 116 and the lower half barrel section 118 of the assembly line 110.

FIG. 1A further depicts airframe assembly regions 130 and 140, which assemble upper half barrel sections 116, 126 and lower half barrel sections 118, 128 into full barrel sections 136 and 146 at work stations 134 and 144, respectively. Join station 342 is part of work station 134, 144. The full-barrel sections 136, 146 proceed along tracks 132 and 142, to a work cell 141, 141-1 where they are assembled in lengthwise fashion to form full barrel sections 138 and 148 of an airframe. Full barrel section 148 is cylindrical in shape while full barrel section 138 is not. In further embodiments, the operations of the assembly lines 110, 120 discussed herein are merged into a single assembly line.

A process tracking server 102 tracks and/or manages the operations of assembly lines 110, 120 discussed herein, for example, by directing the operations of one or more work stations 114, 124 in the assembly environment 100. In this embodiment, the process tracking server 102 communicates with the memory 104 to retrieve information relating to one or more Numerical Control (NC) programs for operating the assembly lines 110, 120. A controller 106 of the process tracking server 102 may further process feedback from the work stations 114, 124 and/or assembly lines 110, 120, and provide instructions to the work stations 114, 124 or may report information to an operator based on such feedback. In one embodiment, RFID chips or other indexing components 125 enable the act of indexing to directly provide instructions to a work station 114, 124 for the portion of the upper half barrel section 116, 126 and lower half barrel section 118, 128 within the purview 114-1, 124-1 of the work station 114, 124. In such an embodiment, the instructions can be passed between controller 106 and the particular work station 114, 124. Controller 106 may be implemented, for example, as custom circuitry, as a hardware processor executing programmed instructions, or some combination thereof. Memory 104 stores instructions for operating controller 106, and may comprise a suitable receptacle for storing digital data.

According to FIG. 1A, each work station 114 at an assembly line 110 may be fed/supplied materials and/or subcomponents 398-10 by a corresponding feeder line 149-1 (e.g., based on a takt time for a section of fuselage, and as illustrated in following FIG. 1B), and these materials and/or components are affixed to the upper half barrel section 116 and lower half barrel section 118 being worked upon by the work stations 114. Feeder lines 149-1 provide additive materials such as subcomponents 398-10 to the work stations 114. Each feeder line 149-1 is designed to generate materials at a takt time in order to provide the additive material such as subcomponent 398-10 to work station 114, just in time (JIT) for assembly onto a larger structure (e.g., a section of fuselage), which is also pulsed at a takt time. That is, the feeder lines 149-1 deliver the subcomponents 398-10 JIT to the work stations 114, in an order of usage by the work stations 114. In one embodiment, the feeder lines 149-1 that have a takt time equal to a fraction of a fuselage takt time.

The takt times of the feeder lines 149-1, and/or the assembly lines 110 need not be the same. For instance, an upper half barrel section 116 and lower half barrel section 118 may be micro-pulsed through several work stations 114 at the same time. The upper half barrel section 116 and lower half barrel section 118 is indexed to the work stations 114 and each dedicated feeder line 149-1 performs NDI, window surround 970-1, 970-2 installation, door surround 940-1, 940-2 installation, window manufacturing excess 970-9 trim/removal, door manufacturing excess 940-9 trim/removal, installing windows and installing doors etc. Feeder lines 149-1 also include output from the work stations 114, including NDI inspection data and any excess trimmed off of upper half barrel section 116 and lower half barrel section 118. Each half barrel section comprises at least one internal subcomponent 398-10, such as the frame 912 (FIG. 9), window surround 970-1, 970-2 installation, door surround 940-1, 940-2, secured to the half barrel section prior to joining to a corresponding half barrel section.

In a further example, the feeder line 149 provide frames 912 JIT to a work station 114 that installs frames 912 onto upper half barrel section 116 and lower half barrel section 118. Frame 912 is referenced in FIG. 9 through a cut through view 917. Likewise, feeder lines 149-1 provide window surrounds 970-2 to window surround install work stations JIT and door surrounds 940-2 to door surround install work stations JIT. For each feeder line 149-1, production times are designed based on the takt of an associated work station 114. The feeder lines 149-1 each serially pulsed or micro pulsed 129 subcomponents 398-10 during fabrication, and completed subcomponents 398-10 arrive at each work station 114 at a common takt time. This takt time design proceeds through each of the feeder lines 149-1 from the smallest part to the largest final assembly. If a takt time cannot be achieved, it is possible to adjust the work statement of particular work station 114 to reduce or increase the amount of work occurring at the particular work station 114. In a further embodiment, it is possible to add or remove a work station 114 from the process based upon a work statement and a desired takt time for the entire line of half barrel sections. Takt time is considered to be a number of minutes per month, divided by a number of desired units (e.g., of aircraft, stringers, frames, etc.) per month. The sum of micro-pulse takt times equals a pulse of takt time. That is, after a number of micro-pulses equal to a full pulse, an entire unit has advanced by its length through an assembly line 110. According to FIG. 1A, each work station 124 at an assembly line 120 may be fed/supplied materials and/or subcomponents 398-10 by a corresponding feeder line 149 (e.g., based on a takt time for half barrel section 117-1, and as illustrated in following FIG. 1B), and these materials and/or subcomponents 398-10 are affixed to the upper half barrel section 126 and lower half barrel section 128 being worked upon by the work stations 124. Feeder lines 149 provide additive materials and/or subcomponents 398-10 to the work stations 124. Each feeder line 149 is designed to generate materials at a takt time in order to provide the additive material and/or subcomponent 398-10 to a work station 124 just in time (JIT) for assembly onto a larger structure, such as half barrel section, which is also pulsed at a takt time. The feeder line 149, 149-1 takt time may be the same or different from the takt time of assembly line 110, 120. That is, the feeder lines 149 deliver the subcomponents 398-10 JIT to the work stations 124 in an order of usage by the work stations 124. In one embodiment, the feeder lines 149 that have a takt time equal to or at a fraction of a fuselage takt time. Takt is equal to the micro pulse 129 time plus the pause time between micro pulses 129. The many lines each utilize a unique or shared takt, and provide Just In Time (JIT) delivery to the next line. In one embodiment, the feeder lines have a takt different from the takt of the line that they feed. Each feeder line can have a unique takt or can have similar takts to other feeder lines the lines that they feed. Each line has a common takt unique to that particular takt. In one embodiment, a takt time is based upon a number of aircraft fabricated per month. In one embodiment, a takt time is based upon a number of aircraft fabricated per month and the number of assemblies needed per aircraft. In a further embodiment, a takt time is defined for an array of work stations performing a work assignment.

The takt times of the feeder lines 149, and/or the assembly lines 120 need not be the same. For instance, an upper half barrel section 126 and lower half barrel section 128 may be micro-pulsed through several work stations 124 at the same time. The upper half barrel section 126 and lower half barrel section 128 is indexed to the work stations 124 and each dedicated feeder line 149 performs NDI, window surround installation, door surround installation, window manufacturing excess trim/removal, door manufacturing excess trim/removal, installing windows and installing doors etc. Feeder lines 149 also include output from the work stations 124, including NDI inspection data and any excess trimmed off of upper half barrel section 126 and lower half barrel section 128.

In a further example, the feeder line 149 provide frames 912 JIT to a work station 124 that installs frames 912 onto upper half barrel section 126 and lower half barrel section 128. Likewise, feeder lines 149 provide window surrounds to window surround install work stations 124 JIT and door surrounds to door surround install work stations 124 JIT. For each feeder line 149, production times are designed based on the takt of an associated work station 124. The feeder lines 149 each serially pulse components during fabrication, and completed components arrive at each work station 124 at a common takt time. This takt time design proceeds through each of the feeder lines 149 from the smallest part to the largest assembly. If a takt time cannot be achieved be the assembly line 110, 120 or feeder line 149, 149-1, it is possible to adjust the work statement of particular work station 124 to reduce or increase the amount of work occurring at the particular work station 124. In a further embodiment, it is possible to add or remove a work station 124 from the process based upon a work statement and a desired takt time for the assembly line 110, 120. Takt time is considered to be a number of minutes per month, divided by a number of desired units (e.g., of aircraft, stringers, frames 912, etc.) produced per month. The sum of micro-pulse takt times equals a full pulse takt time. That is, after a number of micro pulses 129 equal advancing by its length through assembly line 120.

Another embodiment for upper half barrel section 116 and lower half barrel section 118 are joined to crown module 364-1 and cargo floor grid 365-2 and passenger floor grid 365-1 in assembly stages 320-1 and 330-1 (FIG. 3), respectively. Assembly stages 320-1 and 330-1 are part of the upper half barrel section 116 and lower half barrel section 118 assembly process much like assembly stages 320 and 330 are part of the upper half barrel section 126 and lower half barrel section 128 assembly process. Likewise join station 342-1 is part of the assembly process for the upper half barrel section 116 and lower half barrel section 118 corresponds to join station 342 which is part of the assembly process for the upper half barrel section 126 and lower half barrel section 128.

Illustrative details of the operation of assembly environment 100 will be discussed with regard to FIG. 2. Assume, for this embodiment, that the assembly lines discussed herein are being utilized to serially fabricate half barrel section of fuselage for assembly into an airframe.

Figure 2:
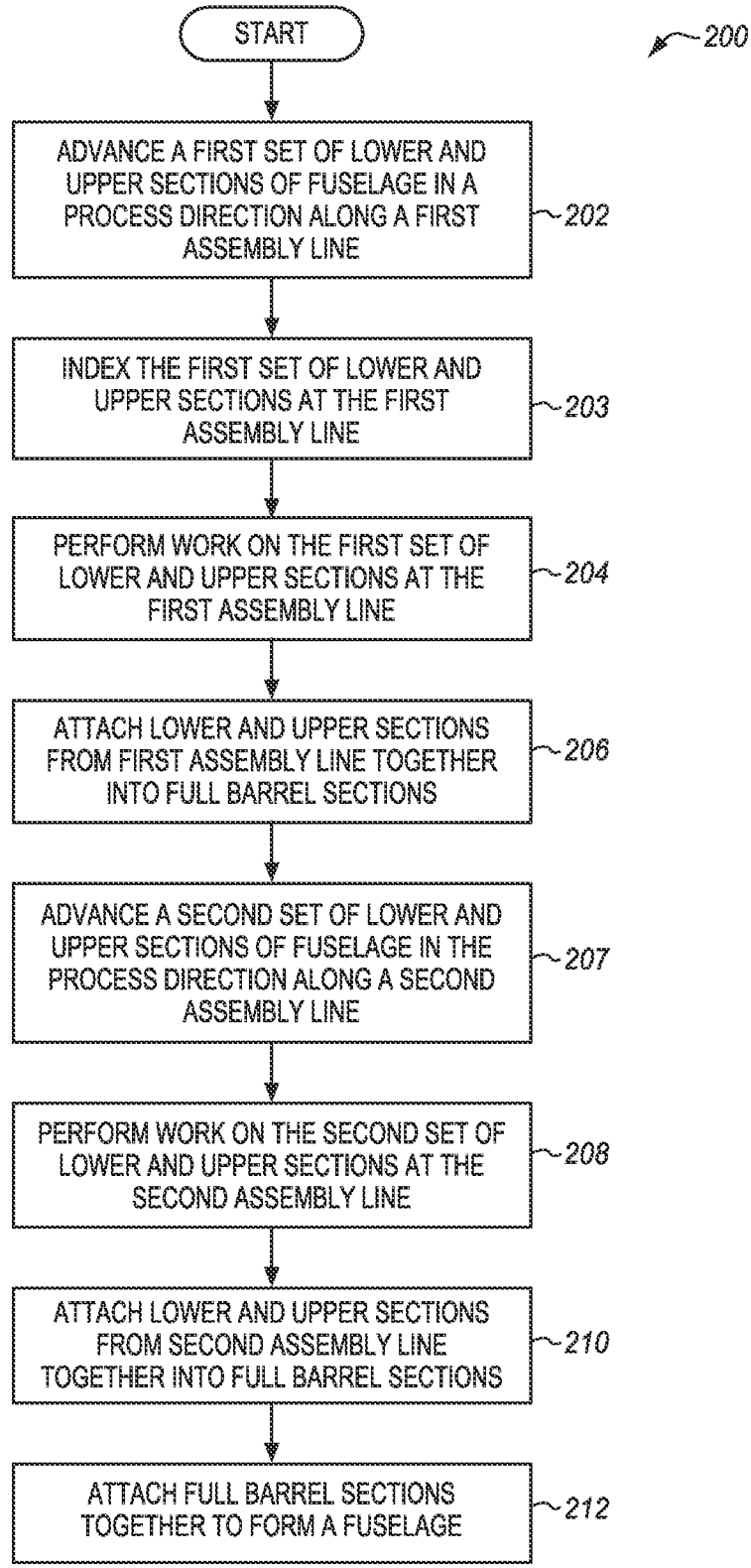
FIG. 2 is a flowchart depicting a method for assembling an airframe for an aircraft using the assembly environment of FIG. 1A in an illustrative embodiment.

FIG. 2 is a flowchart depicting a method 200 for assembling an airframe for an aircraft using the assembly environment of FIG. 1A in an illustrative embodiment. The steps of method 200 are described with reference to assembly environment 100 of FIG. 1A, but those skilled in the art will appreciate that method 200 may be performed in other systems. The steps of the flowcharts described herein are not all inclusive and may include other steps not shown. The steps described herein may also be performed in an alternative order.

In step 202, a first set 103-1 of lower half barrel sections 118 and upper half barrel sections 116 of fuselage are advanced in the process direction 199 along the assembly line 110. Track 112-1 has a drive system 112 to advance lower half barrel section 118 and upper half barrel section 116 along the track 112-1. This may be performed in a synchronous micro pulsed fashion, where the lower half barrel section 118 and upper half barrel section 116 are serially advanced by micro pulse 129 and then paused or as part of a continuously moving process. The lower half barrel section 118 and upper half barrel section 116 are fabricated in alternating fashion, such that lower half barrel section 118 and upper half barrel section 116 are paired for joining into the same full barrel section 138 necessitates adjacent serial placement on the assembly line 110. Furthermore, the lower half barrel section 118 and upper half barrel section 116 are arranged from fore to aft, or from aft to fore, such that neighboring pairs of sections correspond with neighboring lengthwise portions for joining cylindrically into the fuselage 12.

Step 203 includes indexing the first set of lower half barrel section 118 and upper half barrel section 116 at the assembly line 110. As discussed above, indexing conveys a 3D characterization of a portion of the lower half barrel section 118 and upper half barrel section 116 that is within the purview 114-1, 124-1 of each work station 114, and may be performed via physical coupling to the manufacturing excess located indexing feature, scanning manufacturing excess located bar code, reading an RFID chip located on the manufacturing excess, or other means. Indexing also conveys the model of the lower half barrel section 118 and upper half barrel section 116 to each work station 114.

In step 204, work stations 114 perform work on the first set of lower half barrel sections 118 and upper half barrel sections 116 at the assembly line 110. This may comprise indexing the lower half barrel sections 118 and upper half barrel sections 116 to the work stations 114, and performing work such as layup, hardening, demolding, frame installation, window manufacturing excess cut-out, door manufacturing excess cut-out operations, etc. In an embodiment where the lower half barrel section 118 and upper half barrel section 116 are advanced by micro pulse 129, the work may be performed during pauses between micro pulses 129 and/or during micro pulse 129. In embodiments where the lower half barrel section 118 and upper half barrel section 116 are continuously moved, the work may be performed while the lower half barrel section 118 and upper half barrel section 116 are moving in process direction 199.

Steps 206-210 describe a variety of additional steps that are taken to form the full barrel sections 29-1, 29-2, 29-3, 29-4, 29-5 in addition to those recited above. In step 206, a second set 105 of upper half barrel sections 126 and lower half barrel sections 128 of fuselage are advanced in the process direction 199 along the assembly line 120. Track 122-1 has a drive system to advance lower half barrel section 128 and upper half barrel section 126 along the track 122-1. This may be performed in a synchronous pulsed fashion, where the lower half barrel section 128 and upper half barrel section 126 are serially advanced by micro pulse 129 and then paused or as part of a continuously moving process. The lower half barrel section 128 and upper half barrel section 126 are fabricated in alternating fashion, such that lower half barrel section 128 and upper half barrel section 126 for the full barrel section 29-1, 29-2, 29-3, 29-4, 29-5 of the fuselage are adjacent on the assembly line 120. Furthermore, the lower half barrel section 128 and upper half barrel section 126 are arranged from fore to aft, or from aft to fore, such that neighboring pairs of lower half barrel section 128 and upper half barrel section 126 correspond with neighboring lengthwise portions for joining into a non-cylindrical full barrel section 136. This enables full barrel sections 29-1, 29-2, 29-3, 29-4, 29-5 to be circumferentially joined into the fuselage 12. Lower half barrel section 118 and upper half barrel section 116 are joined together into full barrel sections 136 at the end of each of the assembly lines 110. For example, this may comprise assembling lower half barrel sections 118 and upper half barrel sections 116 together to form a first set of full barrel sections 136 by longitudinally joining (door surround splice 940 or window surround splice 970 of FIG. 9) upper half barrel sections 116 to lower half barrel sections 118.

In an embodiment, one or more of the cylindrical full barrel sections may be formed of upper and lower half barrel sections, or alternatively right and left half barrel sections, which form the fuselage to provide an outer surface with visible ornamentally as shown in FIGS. 19 through 33 or as shown in FIGS. 34 through 48. Forming sections of the fuselage 12 of full barrel sections (29-1 through 29-5) according to method and system of the present disclosure provides a manner of achieving the design features shown in FIGS. 19 through 48. Specifically, the outer surface along the side of section of the fuselage 12 (as shown in FIGS. 19 through 33) includes a surface appearance of an elongated line 25 with an appearance of a plurality of features 27 located on each side of the line. In another embodiment, the outer surface along the top of a section of the fuselage 12 (as shown in FIGS. 34 through 38) includes a surface appearance of an elongated line 35 with a plurality of generally circular features on each side of the line. In a preferred embodiment, the line 25, 35 may be defined by a seam of joining of the half barrel portions 126, 128 of a section of the fuselage 12, which may include sealant and subsequent paint or other covering material in a manner to not fully cover or conceal the features, thus preserving a selected visible ornamental surface feature. Similarly, the appearance of the plurality of features 27, 37 may be derived from some fastener/rivet heads on each side of the line 25 which are not fully covered or concealed, thus preserving a visible ornamental surface feature as shown in FIGS. 19 through 48. Thus, while the design features of FIGS. 19 through 33, and FIGS. 34 through 48, are visible ornamental design features which may be achieved by any number of alternative assembly processes or methods and regardless of the structural components being joined to form a fuselage, one manner of achieving such ornamentality is possible using the methods and components described herein—provided a visible ornamental combination of features which is not fully obscured with covering material.

More specifically, in an embodiment in which an ornamental outer appearance is provided, half barrel sections 24, such as an upper 126 and lower 128 half barrel, may be joined in a manner with minimal covering to provide an outer surface appearance as depicted in FIG. 21, 24, 27, 29, or 31, depending upon the design choice. Alternatively, sections that are formed of right and left half barrels joined into generally cylindrical full barrel, depending on design choice, may have an outer surface appearance as depicted in FIG. 36, 39, 42, 44, or 46. The design choice for the outer surface ornamentality may be uniform for all of the sections of the fuselage, or may differ in regions of the fuselage, such as differentiating between uniform cylindrical section 148 and non-uniform cylindrical section 138 of the fuselage 12. For example, in an embodiment of the present ornamental design, an elongated line 25 may be provided along a major extent of the fuselage 12, with a continuous pattern of generally round features on each side of the line, or with different variation of design features as shown in figures FIGS. 19 through 33 (with variations shown in Figures 21, 24, 27, 29 and 31). Similarly, in an embodiment of the present ornamental design, an elongated line 35 may be provided along a major extent of the fuselage 12, with a continuous pattern of generally round features on each side of the line, which may be a selections from the design ornamentality as shown in FIGS. 34 through 48 (with variations shown in FIGS. 36, 39, 42, 44 and 46). As can be appreciated, the lines forming the surface appearance need not be pronounced or have appreciable depth, and instead may be faint depressions that provide a visible appearance particularly with refraction of light across the surface of the fuselage 12. For example, while treatment of applying sealant after joining the half barrel sections may be used to reduce or effectively eliminate the appearance of a line at a joining location, an aesthetic appearance of the outer surface such as is shown and described herein may be achieved with modest application of sealant.

In step 207, a first set 103 of lower half barrel sections 128 and lower half barrel sections 126 of fuselage are advanced in the process direction 199 along the assembly line 120. Track 122-1 has a drive system 122 to advance lower half barrel section 128 and upper half barrel section 126 along the track 122-1. This may be performed in a synchronous micro pulsed fashion, where the lower half barrel section 128 and upper half barrel section 126 are serially advanced by micro pulse 129 and then paused or as part of a continuously moving process. The lower half barrel section 128 and upper half barrel section 126 are fabricated in alternating fashion, such that lower half barrel section 128 and upper half barrel section 126 are paired for joining into the same full barrel section 148 necessitates adjacent serial placement on the assembly line 120. Furthermore, the lower half barrel section 128 and upper half barrel section 126 are arranged from fore to aft, or from aft to fore, such that neighboring pairs of sections correspond with neighboring lengthwise portions for joining cylindrically into the fuselage 12. In step 208, work stations 124 perform work on the second set of lower half barrel sections 128 and upper half barrel sections 126 at the assembly line 120. Work stations 124 perform work on the first set 103 of lower half barrel sections 118 and upper half barrel sections 116 at the assembly line 120. This may comprise indexing the lower half barrel sections 118 and upper half barrel sections 116 to the work stations 124, and performing work such as layup, hardening, demolding, frame installation, window cut-out operations, etc. In an embodiment where the lower half barrel sections 118 and upper half barrel sections 116 are advanced by micro pulse 129, the work may be performed during pauses between micro pulses 129 and/or during the micro pulse 129. In embodiments where the lower half barrel sections 118 and upper half barrel sections 116 are continuously moved, the work may be performed while the lower half barrel section 118 and upper half barrel section 116 are moving in process direction 199.

In step 210, lower half barrel section 128 and upper half barrel section 126, are joined together into full barrel sections 146 at the end of assembly lines 120. For example, this may comprise assembling lower half barrel sections 128 and upper half barrel sections 126 together to form a second set of full barrel sections 146 by longitudinally joining (door surround splice 940 for door surrounds 940-1, 940-2 or window surround splice 970 for window surrounds 970-1, 970-2 of FIG. 9) lower half barrel sections 128 to upper half barrel sections 126. Window manufacturing excess 970-9 and door manufacturing excess 940-9 is trimmed off prior to or in the preferred alternative after window surround 970-1, 970-2 and door surround 940-1, 940-2 installation. The full barrel sections 136 and 146 of the airframe may then be assembled from fore-to-aft (or from aft-to-fore) with circumferential joining. That is, in step 212, the barrel sections 136 and 146 are attached together (e.g., via circumferential/hoopwise joins to other full barrel section in order to form a full fuselage).

Method 200 provides a technical benefit over prior systems and techniques, because it enables airframes to be fabricated in a manner that is efficient in terms of both time and space. Method 200 greater access to the lower half barrel sections 128 and upper half barrel sections 126 as well as lower half barrel sections 118 to upper half barrel sections 116 during assembly than prior full barrel assembly methods. This method permits bringing the lower half barrel sections 128 and upper half barrel sections 126 as well as lower half barrel sections 118 to upper half barrel sections 116 to the work station, tooling and technicians through roughly unfetter access to the interior 116-9 (FIG. 1). The prior assembly methods require tools, tooling and technicians to enter the half barrel sections through barrel ends or doorways. The tooling and tools have to be set up in place within the full barrel section. When work is completed, the tooling, tools and technicians have to be transported out through barrel ends or doorways. Micro pulsing 129 lower half barrel sections 128 and upper half barrel sections 126 as well as lower half barrel sections 118 to upper half barrel sections 116 through work stations 124 and 114, respectively, brings the structure to the technicians, tools and tooling, thus saving all of the non-value added time of tool, tooling and technician transport, including the setup, break down and transport out time. Furthermore, delays in fabrication become easy to visually identify, based on the position of a section relative to other sections on the line. Newly fabricated full barrel sections 136 and 146 of fuselage may be immediately assembled together into in-progress airframes, and continuous line assembly techniques allow for full barrel sections 136/146 to be rapidly constructed from upper half barrel sections 116 and lower half barrel sections 118, and upper sections 126 and lower sections 128 (or other sections of fuselage). Still further, the continuous line assembly techniques discussed herein enable processes which are largely similar between upper half barrel sections 116 and lower half barrel sections 118 to be rapidly performed on both upper half barrel sections 116 and lower half barrel sections 118 in series on the assembly line 110. In addition, use of the disclosed method provides a way to achieve an outer surface appearance of sections of the fuselage 12, or along its entire length, with ornamental features as shown in FIGS. 19 through 48.

With a discussion provided above of an assembly environment 100 for a factory, further details provided herein focus upon various aspects thereof. FIG. 3 illustrates a hybrid fabrication system 300 that utilizes parallel and serial assembly lines for processing upper half barrel sections 116, 126 and lower half barrel sections 118, 128 in an illustrative embodiment. Specifically, FIG. 3 illustrates a region where an assembly line 310 that includes work stations 312 which perform work on both lower half barrel sections 314 and upper half barrel sections 316. Assembly line 310 corresponds to assembly lines 110, 120. Lower half barrel sections 314 and upper half barrel sections 316 corresponds to lower half barrel sections 118, 128 and upper half barrel sections 116, 126, respectively. Post work on the assembly line 310 is split into assembly stages 330 and 320 for lower half barrel sections 314 and upper half barrel sections 316, respectively. Assembly stages 330 and 320 are static full pulse locations for performing work such as installing a cargo floor grid 365-2, 507, 507-1 and passenger floor grid 365-1, 506, 506-1 or crown module 364, 732, 732-1, respectively. In another embodiment, assembly stages 330 and 320 are additional assembly lines including work stations 312 arranged in a similar fashion to work stations 312 of assembly line 310 to perform work such as cargo floor grid 507, 507-1 and passenger floor grid 506, 506-1 or crown module 732, 732-1 installation, respectively. Assembly stages 330 and 320 corresponds to floor grid attach station 530, 530-1, crown module attach station 730, 730-1. These assembly stages 320 and 330 include work stations 322 and 332, which perform specialized operations specifically dedicated to lower half barrel sections 314 and upper half barrel sections 316. While at assembly line 310, the lower half barrel sections 314 and upper half barrel sections 316 are advanced along a track 318, such as a series of discretized stanchions and/or rollers. The lower half barrel sections 314 and upper half barrel sections 316 may be driven via Autonomous Guided Vehicles (AGVs) along the track 318, or the rollers (not shown) of the track 318 may themselves be driven via motors (not shown). Furthermore, work stations 312 dedicated to window manufacturing excess 970-9, door manufacturing excess 940-9 and/or bearing edge 143, 143-1 separating manufacturing excess 143-9 via trim and/or removal include work station ingress/egress ports 313 (e.g., chutes where representation of trimmed material removal is along chutes 398-1). The chutes 398-1 each represent a start to an output feeder line that removes material/scrap/debris from the assembly line 310. Chutes 398-1 are capable of tracking manufacturing excess with attached bar codes or RFID tags out of the work station 312 within using optical scanners and/or RFID scanners. The material/scrap/debris may be generated by subtractive manufacturing at one or more of the work stations 312 dedicated to window manufacturing excess removal and one or more work stations 312 dedicated to door manufacturing excess removal and one or more work stations dedicated to bearing edge 143 manufacturing excess removal. In further embodiments, multiple work station ingress/egress ports 313 allow passage of feeder line 359 supplied frames 398-2, 398-4 and window surrounds 398-3 and door surrounds 398-5 to work stations 312 along with tooling, tools and technicians along with removed material/scrap/debris from the work station 312 through chute 398-1. Material, tools, tooling or technicians entering or exiting the work station 312 via work station ingress/egress ports 313 which allows entry or exit through a different ingress 165-2 and egress 165-3 of work station 152-1, 152-*n*, 312 than that used for the upper half barrel section 316 or lower half barrel section 314. Therefore, the path traveled by the lower half barrel sections 314 and upper half barrel sections 316 is different from that of the removed material, feeder line 359 fed frames 398-2, 398-4, tools, tooling or technicians. Work station ingress/egress ports 313 track passage of feeder line 359 supplied frames 398-2, 398-4, window surround 398-3 and door surround 398-5 with attached bar codes or RFID tags to work stations 312 along with tooling, tools and technicians with attached bar codes or RFID tags using optical scanners and/or RFID scanners coupled to work station ingress/egress ports 313.

In FIG. 3, the lower half barrel section 314 is processed before its corresponding upper half barrel section 316 in a process direction 399. Further directional transitions are indicated by path 398-6 through 398-17. Lower half barrel sections 314 exit the assembly line 310 (which utilizes the micro pulse 129 before the upper half barrel sections 316 that they will be joined o form the full barrel sections 340. In continuous assembly lines, the lower half barrel sections 314 and upper half barrel sections 316 continuously move at a desired rate without pausing. This order of operations in this embodiment is the lower half barrel sections 314 receive more labor-intensive and time-consuming work installing the two floor levels for the cargo floor 365-2 and the passenger floor 365-1 than the upper half barrel sections 316 with the single crown module installation at a next assembly stage beyond the common pulsed line. Specifically, the lower half barrel sections 314 receive installation of passenger floor grid 365-1, comprising seat tracks and floor panels and cargo floor grid 365-2, comprising cargo tracks and floor panels. For example, while the upper half barrel sections 316 may receive work such as installation of windows, crown modules 364, stow bins, lighting, ceiling panels. The floor grids 365 are assembled prior to arriving at a station 312 and are installed whole or less than whole into the lower half barrel section 314 before the lower half barrel section 314 is rotated about a longitudinal center line 567 (FIG. 5) prior to joining to the upper half barrel section 316. The rotation and the installation of the cargo floor and the passenger floor require roughly twice as much time in assembly stage 330 for lower half barrel section 314 than upper half barrel section 316 in assembly stage 320. Therefore, lower half barrel section 314 always proceeds upper half barrel section 316 through the assembly line 310. A crown module 364 is assembled prior to receipt of the upper section 316, and installed as a whole or less than whole into the upper section 316.

Additional feeder lines 366-1 through 366-4 can provide components 363 along paths 398-6, 398-8, 398-16, and 398-17 to the feeder lines 361-362 that fabricate the crown module 364 and the floor grid 365. The components 363, 363-1, 363-2, 363-3 may comprise ceiling panels or cargo bins for a crown module 364, or floor beams and floor panels for a floor grid 365. All of these feeder lines 366 may have additional feeder lines (not shown) providing JIT fasteners, sealant, or other sub-components. Each feeder line 366-1, 366-2, 366-3, 366-4 operates according to its own takt time, which is different from or the same as the takt time of the lower half barrel section 314 and upper half barrel section 316 through the assembly line 310 work stations 312.

To accommodate for this difference in time taken for specialized operations performed upon lower half barrel section 314 as opposed to upper half barrel sections 316, the lower half barrel sections 314 exit the assembly line 310 prior to the upper half barrel sections 316. This gives the lower half barrel sections 314 additional time (i.e., about twice as long) at the assembly stage 330 during which the corresponding upper half barrel sections 316 continue to travel through the assembly line 310. At assembly stage 330, a lower half barrel section 314 may be held in place to receive work during a full pulse. For example, a lower half barrel section 314 is processed in twice as much time as the upper half barrel section 316 from exit from assembly line 310 to arrival at join station 342. Join station 342 is a full pulse work cell. Again, the lower half barrel section 314 has floor grid 365 installed and then inverting a keel 563-2 from a keel up orientation 563-3 to a keel down orientation 563-1 and arranging the lower section 563 in position for receiving a join at join station 342. Specifically, this arrangement enables the lower sections 314 to exit switching station 350 and the upper sections 316 to exit the assembly stage 320 at roughly the same time, in order to be ready for joining at the join station 342. In one embodiment, the lower half barrel sections 314 exit before the upper sections 316, in order to provide time for movement in path 398-9 and rotation of the lower sections 314 prior to joining when components are moved on paths 398-11 and 398-12. Lower half barrel sections 314 proceed on path 398-13, and upper half barrel sections 316 proceed on path 398-14. This ensures that no substantial delay accrues while waiting to assemble a full barrel section 340. FIG. 3 further depicts multiple ones of feeder lines 359 and 361-362 that feed material such as frames 398-2, 398-4, window surround 398-3 and door surround 398-5 and crown module 364 and floor grid 365, respectively. Feeder line 361 includes an assembled crown module 364 for installation into an upper half barrel section 316, and feeder line 362 conveys floor grid 365 including passenger floor grid 365-1 and cargo floor grid 365-2, assembled and ready for installation in-whole or less than whole into the lower half barrel section 314. Door surrounds 398-5, window surrounds 398-3, frames 398-2, 398-4 and other subcomponents 398-10 are fed via the feeder lines 359 into work stations 312 while fasteners and sealant are fed via additional feeder lines 367-1, 367-2, respectively, for just-in-time (JIT) insertion into work stations 312. The feeder lines 362 and 361 may be implemented in parallel with each other to feed fasteners and/or sealant to work station 312, 322 and work station 332, respectively, JIT for the requirements of those stations.

In a further embodiment, gaps 121 are placed into assembly lines 110, 120, 310 that utilize the micro pulse 129 where components are moved by less than their length and then paused for short increments of time. Some of the gaps 121 results in gaps in work to be performed by the work station 312 when gap 121 is within purview 312-1. Additionally, the lower half barrel section 314 or upper half barrel section 316 within the purview 312-1 of work station 312 may not need work performed based upon whether the lower half barrel section 314 or upper half barrel section 316 within the purview 312-1 needs the particular work performed by the work station 312. For instance, window surround or window manufacturing excess cutout stations do little to no work on a lower half barrel section 314 which has no windows upper half barrel section 316 has many windows installed. However, a lower half barrel section 314 has a concentration of work requiring a cargo door installation station, including installing surrounds and cutting out a manufacturing excess for door cut outs, while the upper fuselage section does not have a cargo door installation. Further, physical gaps 121 between the upper half barrel sections 316 and lower half barrel sections 314 progressing serially down an assembly line 310 also provide work station 312 assembly work relief when the gap 121 reach each station 312. The gaps 121 discussed herein enable planned work station 312 maintenance and/or technician break time to be performed. It is possible that technicians performing maintenance are not the same as the technicians working on the upper half barrel sections 316 and lower half barrel sections 314 while in purview 312-1 of work station 312.

Figure 4:
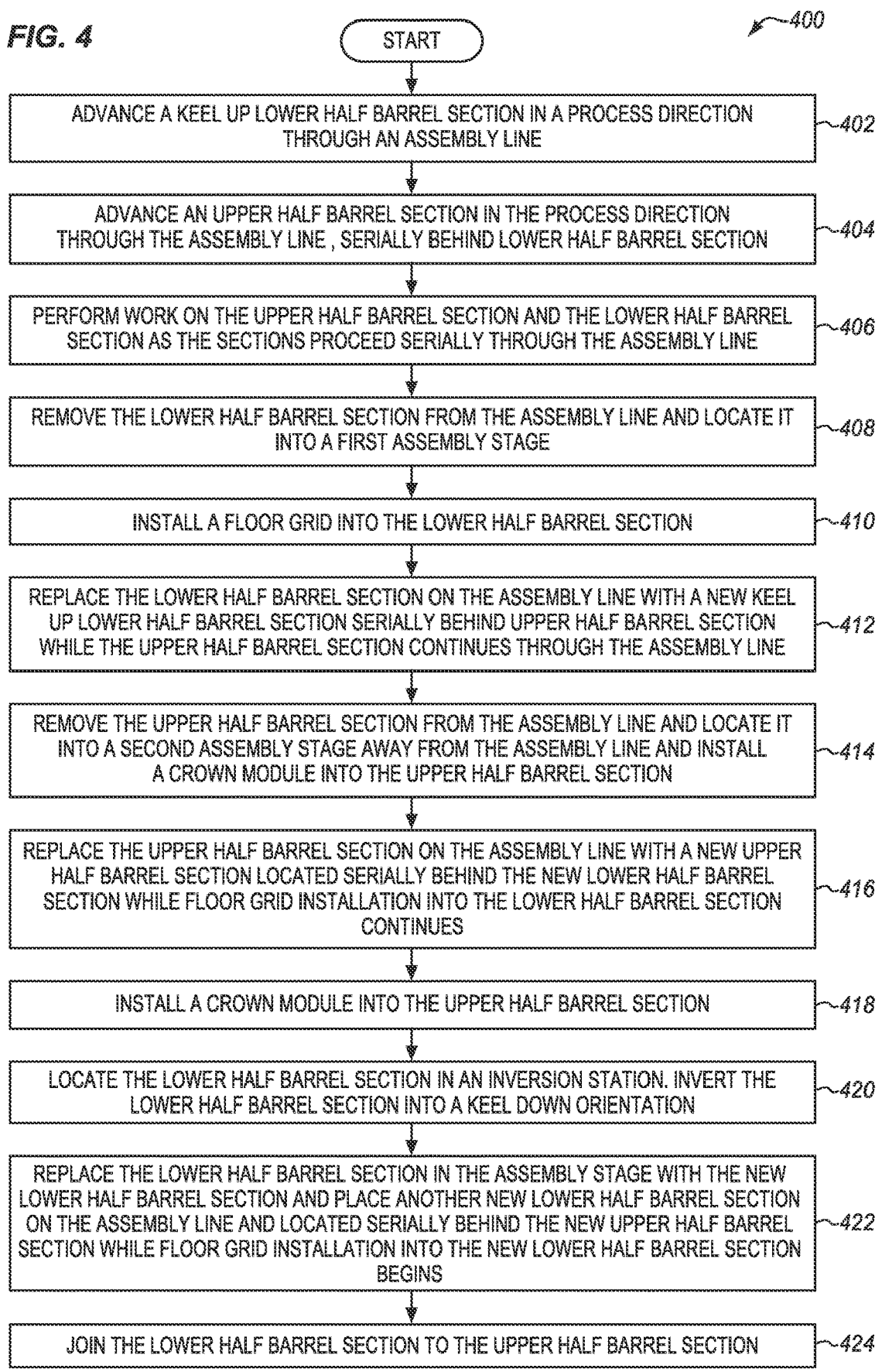
FIG. 4 is a flowchart depicting a method for utilizing the hybrid fabrication system of FIG. 3 in an illustrative embodiment.

FIG. 4 is a flowchart depicting a method 400 for utilizing the hybrid fabrication system 300 of FIG. 3 in an illustrative embodiment. Step 402 includes advancing a keel up lower section 314 of aircraft fuselage in a process direction 399 through an assembly line 310, such that the lower section 314 and upper section 316 advance in series. The lower section 314 is in a keel up position as it advances through work stations 312 and thus has a similar cross-sectional shape and orientation to the succeeding upper section 316. This enables the upper section 316 and the lower section 314 to utilize more common assembly and tooling across the stations 312. In the event that a station 312 does not perform work for both upper sections 316 and lower sections 314 (for instance, window surround install or window manufacturing excess cut out for the lower half barrel section), maintenance or other stand down functions can be performed in lulls when the stations 312 are not in operation on the half fuselage. Furthermore, when a station 312 is not in use, workers assigned to the station 312 are placed on break and/or maintenance is performed on the station 312.

Step 402 may comprise driving the lower half barrel section 314 via a motorized track, or via motorized wheels atop of stanchions/pogos placed upon the shop floor 308, or via an independent means (e.g., a cart or Autonomous Guided Vehicle (AGV)) attached to the lower half barrel section 314. Furthermore, this step may be performed by advancing the lower half barrel section 314, by pulse or micro pulse 129 such as a frame pitch 147 or a multiple or fraction thereof. Indexing and work is then performed by stations 312 during pauses between the pulse or micro pulse 129 or during both the pause and the pulse or micro pulse 129. In one embodiment, the lower half barrel section 314 is continuously moved, and indexing and work is performed by stations 312 during the continuous motion.

In step 404, an upper half barrel section 316 is advanced in the process direction 399 through the assembly line 310, serially behind and at the same time with the lower half barrel section 314, such that the lower half barrel section 314 and the upper half barrel section 316 advance in series through work stations 312. This may be performed in a similar manner to step 402 above, and may be performed synchronously with step 402. For example, driving a track 112-1, 122-1 at the assembly line 310 may cause both the lower half barrel section 314 and the upper half barrel section 316 to move in unison. Thus, in one embodiment, the assembly line 310, assembly stage 320, and assembly stage 330 include a track 112-1, 122-1 that periodically full pulses or micro pulses 129 the lower half barrel section 314 and/or the upper half barrel section 316 in the process direction 399. The sections may be arranged in alternating upper section 316 and lower sections 314 such that pairs of these sections later form the full barrel sections 340 when longitudinally joined, in a sequence to form a fuselage 12 for an aircraft. The lower half barrel section 314 and the upper half barrel section 316 are arranged such that lower half barrel section 314 and the upper half barrel section 316 for a first aircraft or a first model of aircraft are immediately followed by sections for another aircraft or another model of aircraft.

In step 406, work stations 312 perform work on the upper half barrel section 316 and the lower half barrel section 314 as the sections proceed through the assembly line 310. The work stations 312 at the assembly line 310 may perform work such as layup, installing frames, trimming manufacturing excess, installing window surrounds, installing door surrounds, cutting out windows, and cutting out doors, etc. The upper half barrel section 316 and lower half barrel section 314 are joined into full barrel section 136, 146, 340, and may be intended for joining in a subsequent step discussed below.

In one embodiment, during this process, the lower half barrel section 314 and the upper half barrel section 316 are periodically advanced by a full pulse or a micro pulse 129 (e.g., synchronously) by a track 112-1, 122-1 or other component in the process direction 199, 399 through the assembly line 110, 120, 310, and work on the upper half barrel section 316 and the lower half barrel section 314 is performed during pauses between full pulses or micro pulses 129 and/or during the full pulse or micro pulse 129 as well. In a further embodiment, the lower half barrel section 314 and the upper half barrel section 316 are continuously moved in the process direction 199, 399 through the assembly line 110, 120, 310, and work on the upper half barrel section 316 and the lower half barrel section 314 is performed while the lower half barrel section 314 and the upper half barrel section 316 are continuously moved.

In step 408, the lower half barrel section 314 is removed from the assembly line 310. This may comprise diverting the lower half barrel section 314 via a switching station 350 where the lower half barrel section 314-1 is advanced by a full pulse along path 398-13 to the assembly stage 330. The progression of lower half barrel section 314 along path 398-13 is a lateral translation, through other than a lateral translation is contemplated.

Step 410 includes installing a floor grid 365 into the lower half barrel section 314 while the upper section 316 continues to full pulse or micro pulse 129 through the assembly line 310. Installing the floor grid 365 may be performed by stations 332 while the lower section 314 remains inverted (i.e., oriented keel-up). Attaching the floor grid 365 with two floor levels including the cargo floor 365-2 and the passenger floor 365-1 to the lower half barrel section 314. In one embodiment, the floor grid 365 is pre-assembled into the cargo floor 365-2 and the passenger floor 365-1 which is placed in the lower section 314, while in further embodiments, the floor grid 365, particularly the cargo floor 365-2 and the passenger floor 365-1, is assembled piece-by-piece within the lower half barrel section 314 from its constituent components.

The floor grid installation 365 process begins at the lower half barrel section 314 while the upper half barrel section 316 is progressing through the assembly line 310 work stations 312. Specifically, the floor grid 365, and more particularly the cargo floor 365-2 and the passenger floor 365-1 are being assembled in whole or less than whole before the lower half barrel section 314-1 arrives at assembly stage 330 of FIG. 3. The cargo floor 365-2 and the passenger floor 365-1 are assembled in a feeder line 366-3, 366-4 advancing at a full pulse or micro pulse 129 prior to being placed into feeder line 362 via paths 398-6, 398-8 for placement into work station 332 via path 398-7. An embodiment has work station 332 as a component of assembly stage 330 which is a fixed cell.

In step 412, replace the lower half barrel section 314 that has now advanced to assembly stage 330, and is referenced as lower half barrel section 314-1, with a new keel up half barrel section 314 in assembly line 310. The lower half barrel section 314 following the upper half barrel section 316 are periodically advanced by a full pulse or a micro pulse 129 via a track 112-1, 122-1 in the process direction 199, 399 through the assembly line 110, 120, 310, and work on lower half barrel section 314 following the upper half barrel section 316 is performed during pauses between full pulses or micro pulses 129 and/or during the full pulse or micro pulse 129 as well.

Matriculate the upper section 316 through the assembly line 310 and work stations 312 and then advance it to the assembly stage 320 where it is referenced as upper half barrel section 316-1, in step 414. In assembly stage 320, operations specific to the upper half barrel section 316 such as crown module installation, etc. are performed.

In step 416, replace the upper half barrel section 316 that has now advanced to assembly stage 320, and is referenced as lower half barrel section 316-1, with a new keel up half barrel section 316 in assembly line 310. The upper half barrel section 316 following the lower half barrel section 314 are periodically advanced by a full pulse or a micro pulse 129 via a track 112-1, 122-1 in the process direction 199, 399 through the assembly line 110, 120, 310, and work on upper half barrel section 316 following the lower half barrel section 314 is performed during pauses between full pulses or micro pulses 129 and/or during the full pulse or micro pulse 129 as well.

In step 418, the crown module 364 are assembled into in whole or less than whole before the upper half barrel section 316-1 arrives at assembly stage 330 of FIG. 3. The crown module 364 are assembled in a feeder line 366-1, 366-2 advancing at a full pulse or micro pulse 129 prior to being placed into feeder line 361 via paths 398-16, 398-17 for placement into work station 322 via path. An embodiment has work station 322 as a component of assembly stage 320 which is a fixed cell. The floor grid 365 installation for the lower half barrel section 314-1 continues at assembly stage 330 until installed.

In step 420, locate the lower half barrel section 314-1 for rotation/inversion into a keel down position is performed at switching station 350 via path 398-9. When the lower half barrel section 314-1 is within switching station 350, it is referenced as lower half barrel section 314-3. The lower half barrel section 314-3 is then inverted into a keel down position.

In step 422, replace the lower half barrel section 314-1 in the assembly stage 330 with the new lower half barrel section 314 from the assembly line and located serially behind the upper half barrel section 316 while floor grid 365 installation into the new lower half barrel section 314-1 begins. Locate a lower half barrel section 314-4 in the assembly line 310 behind upper half barrel section 316.

In step 424, transition the lower half barrel section 314-3 from switching station 350 via path 398-11 to join station 342. Join station 342 is a full pulse work cell. When in join station 342, lower half barrel section 314-3 is referenced as 314-2. Transition the upper half barrel section 316-1 from assembly stage 320 via path 398-12 to join station 342. When in join station 342, upper half barrel section 316-1 is referenced as 316-2. The lower half barrel section 314-2 is joined to the upper half barrel section 316-2 within join station 342 to form a full barrel section 136, 146, 340. In the alternate embodiment in which two side half barrels are used to form a full barrel section, the half barrels of each side are formed together in a similar fashion, with butt splice joining seams located on the top and bottom of each half barrel section of the fuselage 12. Joining is performed by installing fasteners through a longitudinal skin joint (door surround splice 940 for door surrounds 940-1, 940-2 or window surround splice 970 for window surrounds 970-1, 970-2 of FIG. 9) between the upper section 316 and the lower section 314. Window manufacturing excess 970-9 and door manufacturing excess 940-9 is trimmed off prior to or in the preferred alternative after window surround 970-1, 970-2 and door surround 940-1, 940-2 installation. In one embodiment, this is implemented as a butt splice 1201 (FIG. 12) with a splice plate 920 (FIG. 10). However, other types of splices are possible including lap splices and butt splices with a splice plate 920 on the outer and inner surfaces. The fasteners, preferably in the form of flush head rivet, or countersunk collared or other types of pin fasteners, are spaced in a generally equally spaced locations along the length of the segment being joined, either as a series of fasteners along each side of the butt splice (or mating butt joint) or as a plurality of rows of fasteners along each side of the butt splice. In alternative embodiments of the arrangement of fasteners, differing resulting patterns are possible, with a joining seam and appearance of fastener heads evident on the outer surface of the joined full barrel. In yet another embodiment, the splice plate is installed in multiple segments 1042 arranged longitudinally along a length of the upper half barrel section 116, 126 and/or lower half barrel section 118, 128. FIGS. 19 through 33 depict the alternate outer surface ornamentation that may be derived by such arrangements along the sides of the fuselage. FIGS. 34 through 48 depict the alternate outer surface ornamentation that may be derived by such arrangements along the top (crown) and bottom (keel) of the fuselage. Further, the combination of these arrangements may be achieved, such as having quarter barrel segments formed into half barrel segments, which is subsequently joined together as full barrel sections as described herein, thus having an outer surface appearance as a combination of the surfaces shown in FIGS. 19 through 33 with what is shown in FIGS. 34 through 48.

Method 400 provides a technical benefit over prior techniques because it enables rapid fabrication of a full barrel section 340 of fuselage from arcuate sections of fuselage, particularly for sections such as lower half barrel section 314-2 and upper half barrel section 316-2, while still enabling the sections of fuselage to share one or more work stations 312 that perform work in a micro pulse 129, full pulse or continuous-line environment. Furthermore, this assembly technique enables easier access to an interior 116-9 of the lower half barrel section 314 and upper half barrel section 316 being fabricated, because by splitting the full barrel section into longitudinal halves allows the structure needing work to be delivered to the purview 312-1 of the work station 312 with its tooling, tools and technicians given roughly unfettered access. Along with indexing, this technique substantially reduces non-value added set up time compared to other methods that bring the tools, tooling and technicians to work location and set up a work station 312 within the full barrel section 136, 146. Setting up the work station within the full barrel section 136, 146 and then moving it within full barrel section 136, 146 to all of the work sites and then breaking it down again for removal is non-value added time during the build process. This arrangement enables as much assembly work as possible to be performed while the fuselage section is in halves, and reduces the amount of assembly work used after joining into a full-barrel. This easier access enables easier insertion of tooling for a station, easier inspection, easier worker egress, and easier part egress. This increases the efficiency of such stations. Furthermore, the sequencing lower half barrel section 314 and upper half barrel section 316 ensures that specialized work performed does not delay the fabrication of full barrel sections 136, 146.

Figure 5:
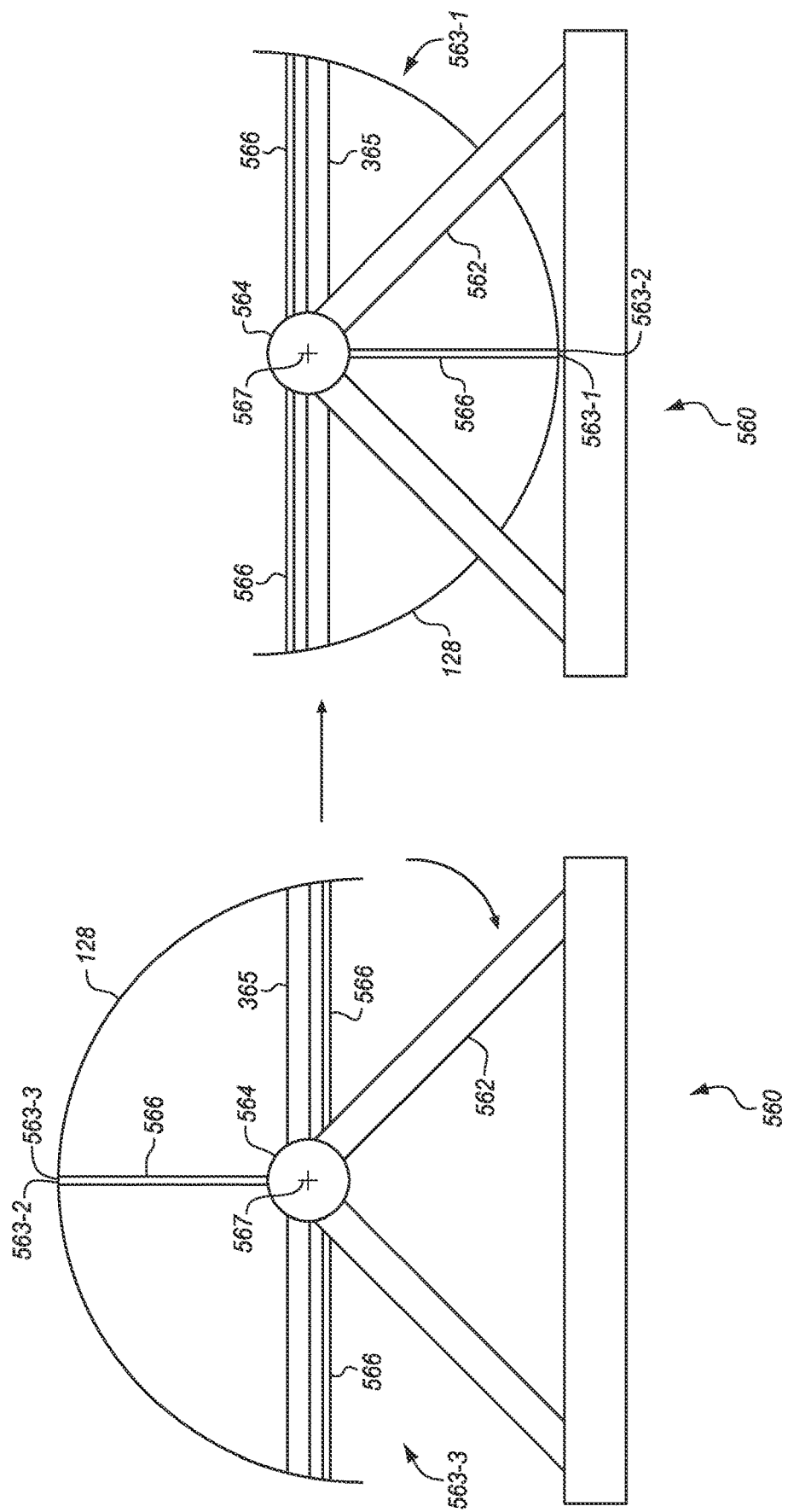
FIG. 5 depicts inversion of a lower section of fuselage in an illustrative embodiment.

FIG. 5 depicts inversion of a lower half barrel section 314-1 in an illustrative embodiment, and corresponds with view arrows 5 of FIG. 3. In FIG. 5, a vertical inversion station 560 includes a frame 562, to which a rotary element 564 is attached. The lower half barrel section 314-3 is rotated about a longitudinal center line 567 (FIG. 5) prior to joining to the upper half barrel section 316-2. Struts 566 protrude from the rotary element 564 and are attached to lower half barrel section 563, in which one or more floor grids 565, such as installed cargo floor 594 and installed cabin floor 596, have been installed. In FIG. 5, cargo floor 594 and cabin floor 596 are omitted for clarity. The rotary element 564 then rotates, inverting a keel 563-2 of the lower half barrel section 563 from a keel up orientation 563-3 to a keel down orientation 563-1 and arranging the lower half barrel section 563 in position for joining to upper half barrel section 316-2 in join station 342.

Figure 29:
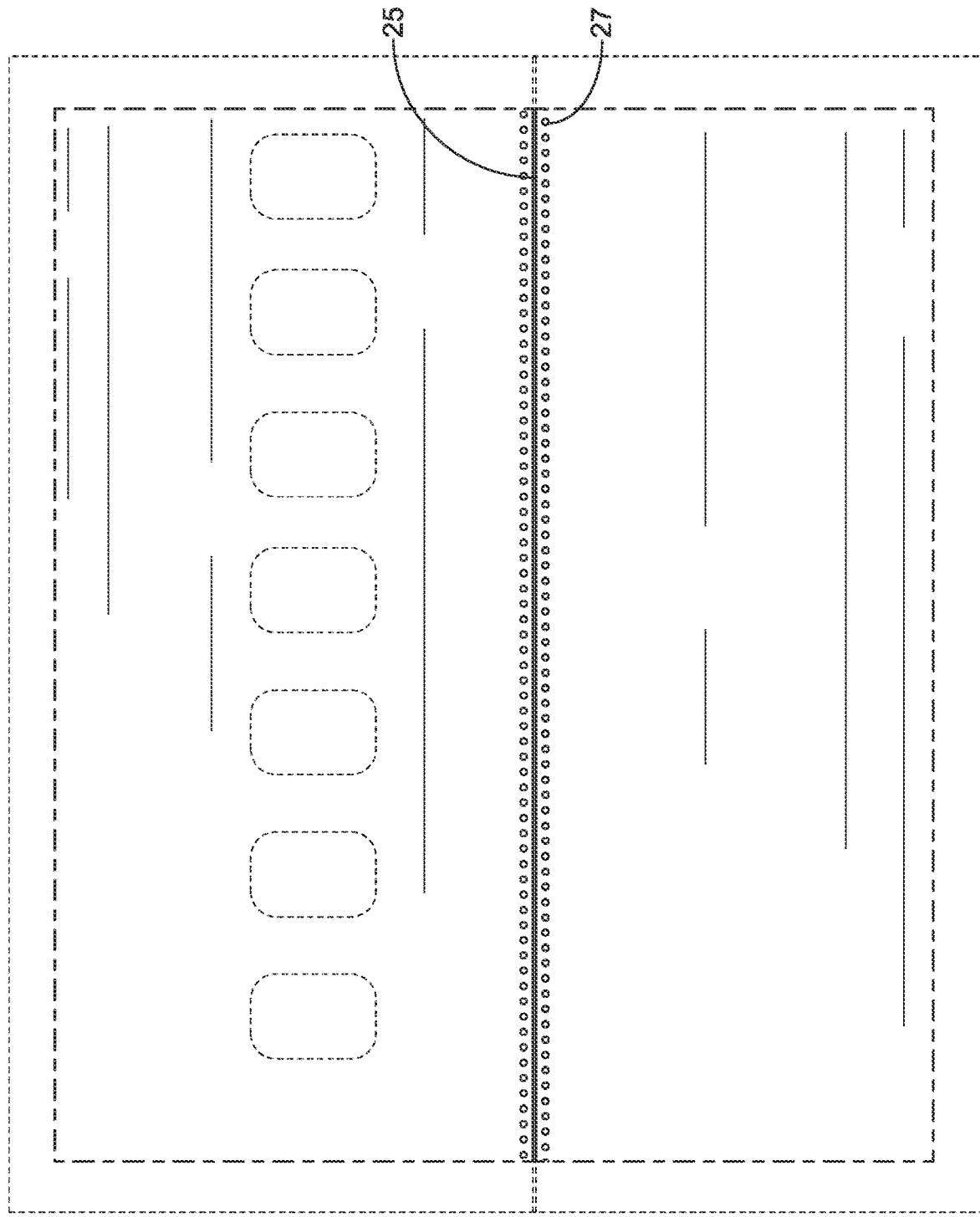
FIG. 29 depicts and alternative embodiment of the segment shown in FIG. 21, with dot-dash broken lines for the border of the segment and dashed lines depicting environment of the segment such as an indication of the position of windows.
Figure 30:
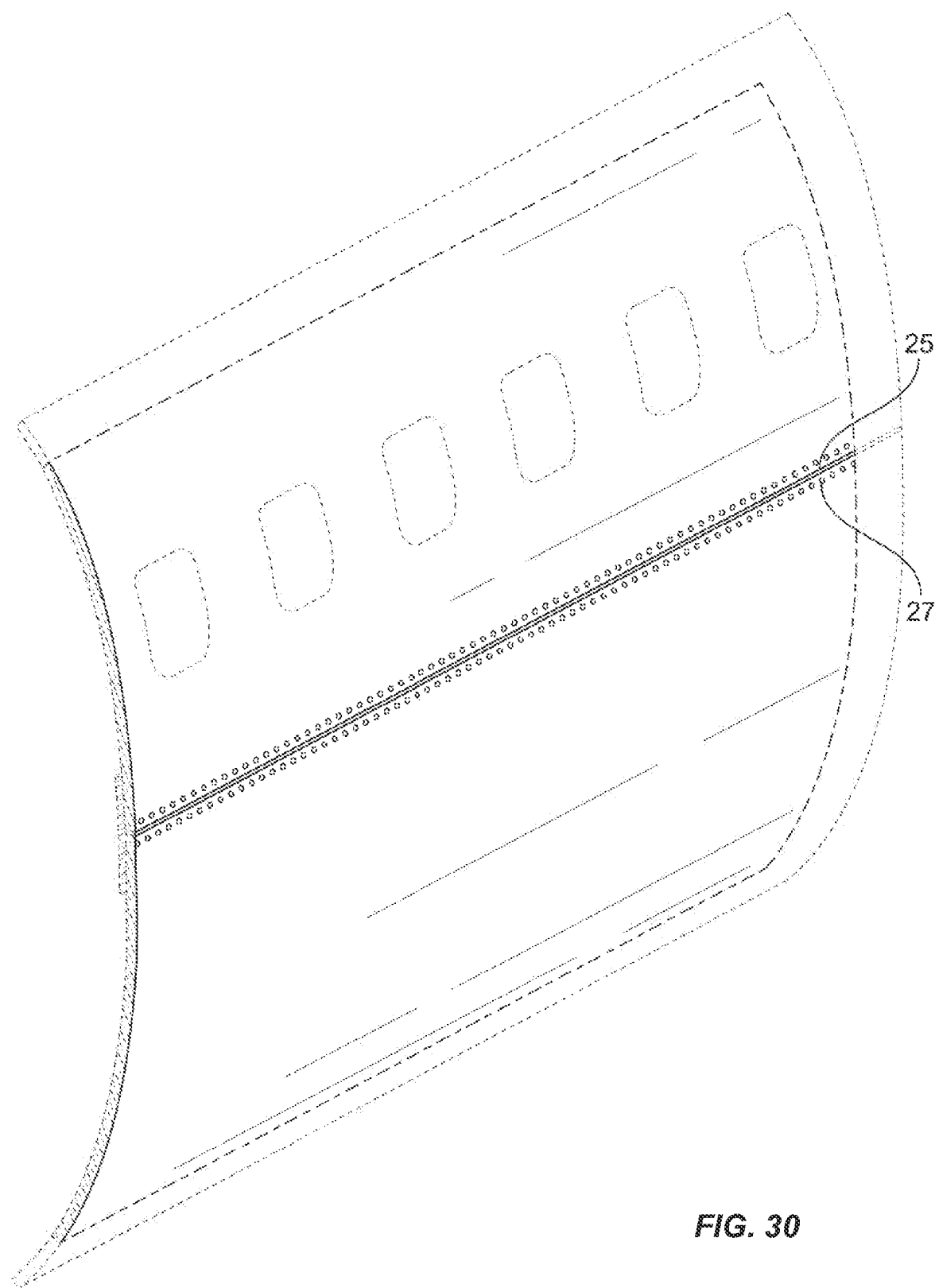
FIG. 30 depicts an elevated side view of the segment shown in FIG. 29, showing the outer surface design in solid lines, with broken lines representing a cross-sectional view of an embodiment having such a surface design.
Figure 31:
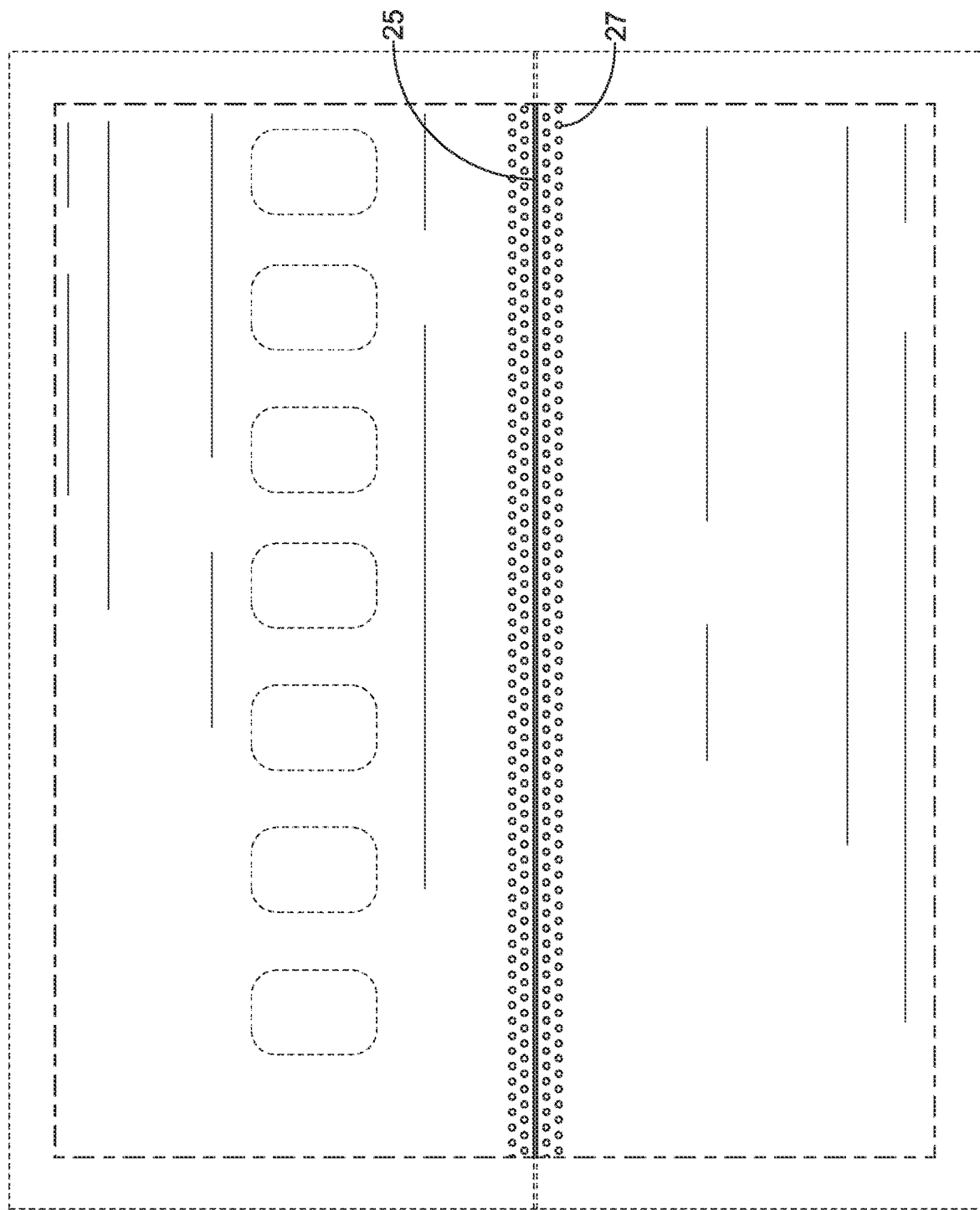
FIG. 31 depicts an alternative embodiment of the design shown in FIG. 21, with dot-dash broken lines for the border of the segment and dashed lines depicting environment of the segment such as an indication of the position of windows.
Figure 32:
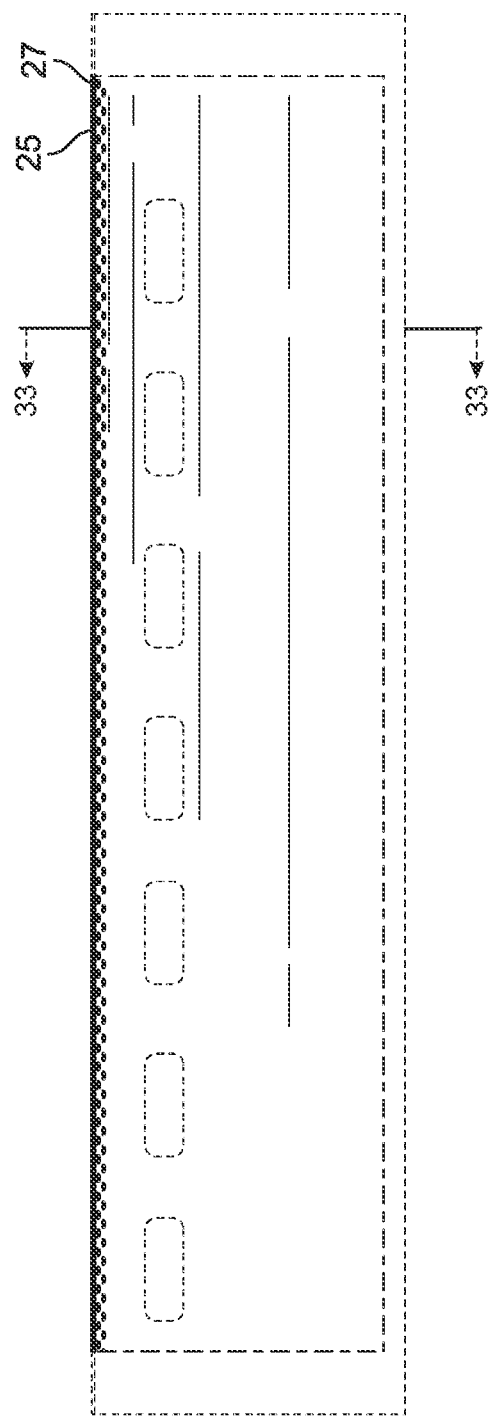
FIG. 32 depicts a side view of the segment in FIG. 31, viewed from the top of the aircraft of FIG. 20.
Figure 33:
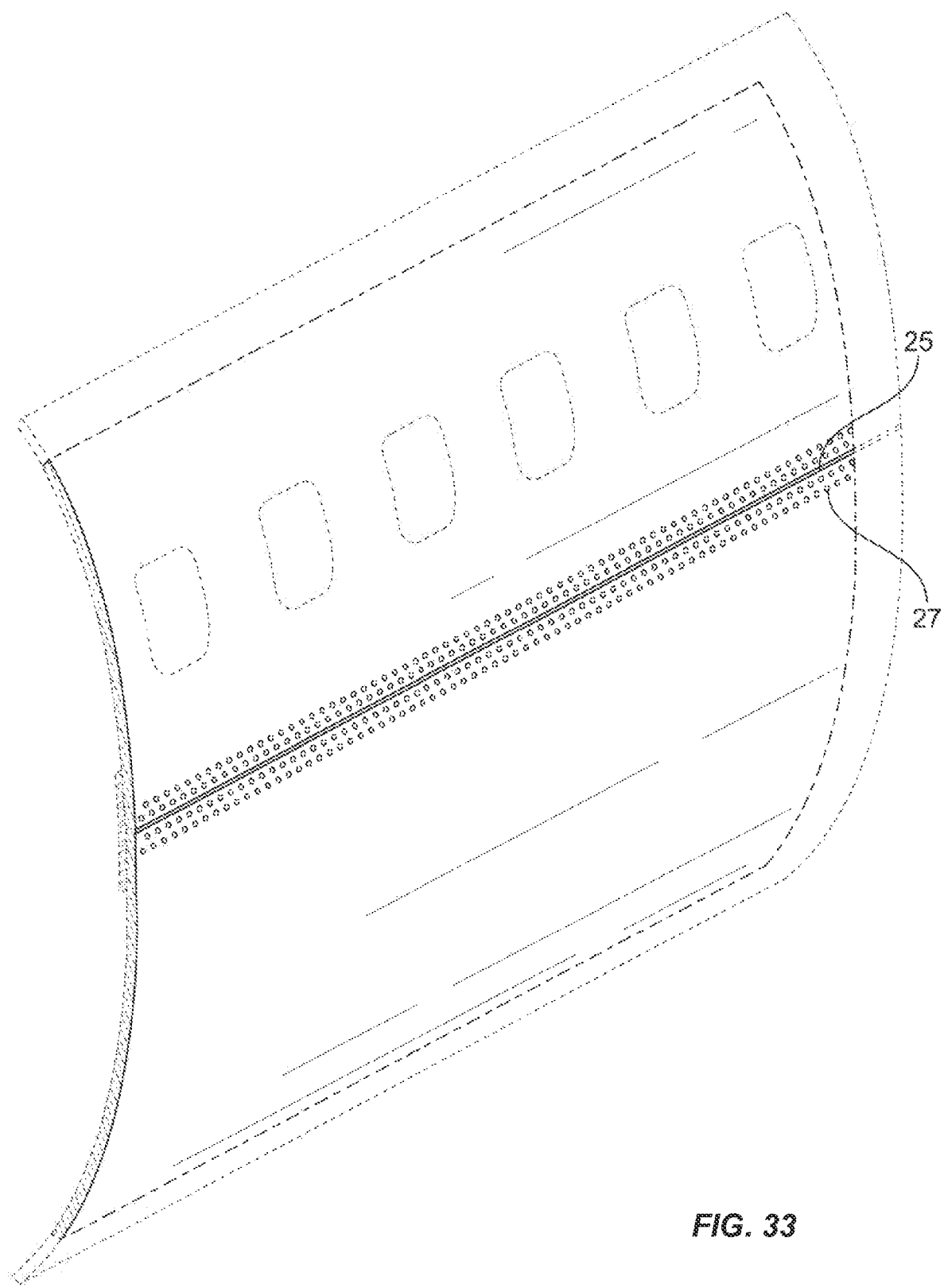
FIG. 33 depicts an elevated side view of the segment shown in FIG. 31, showing the outer surface design in solid lines, with broken lines representing a cross-sectional view of an embodiment having such a surface design.
Figure 34:
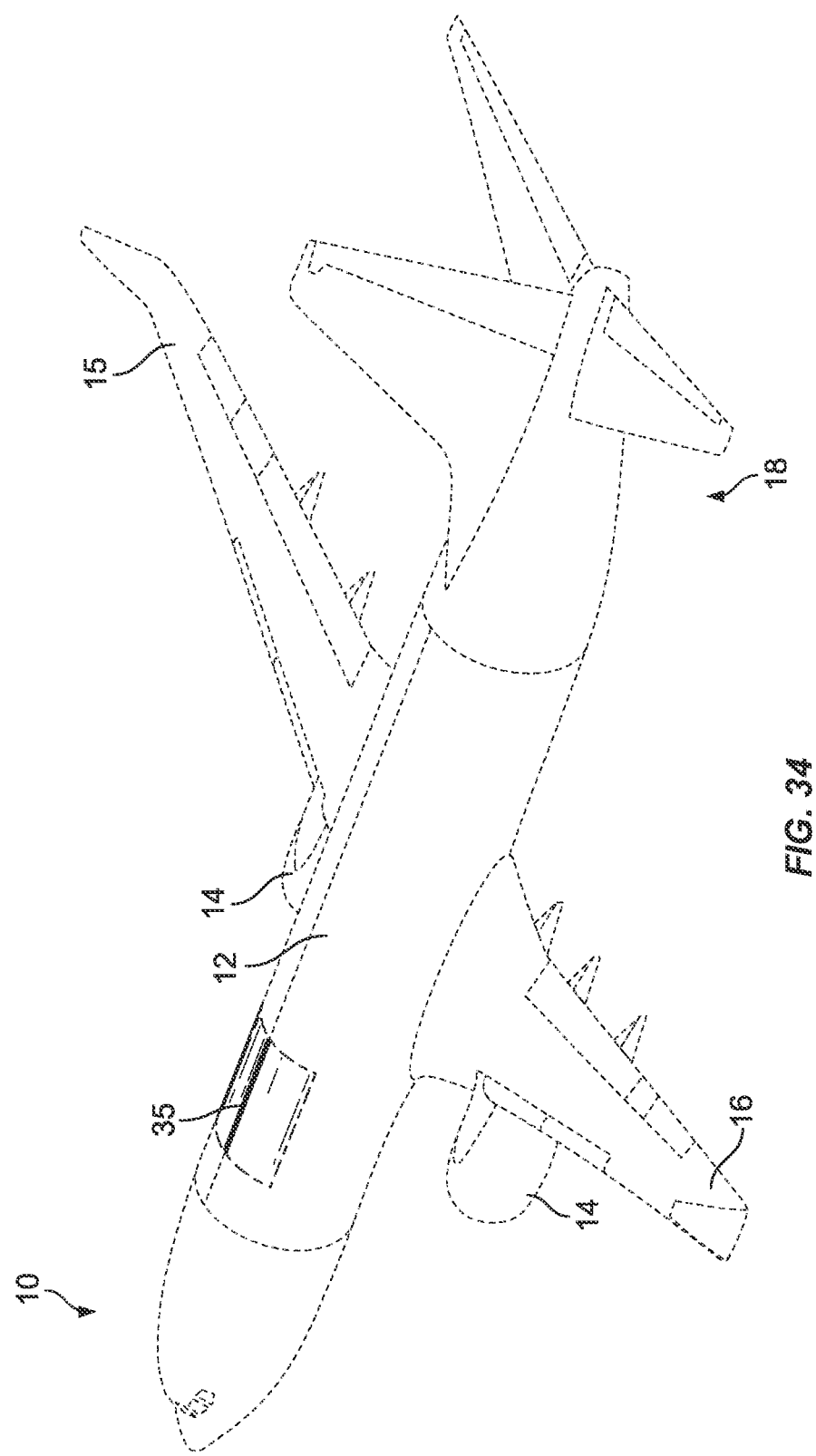
FIG. 34 depicts an assembled aircraft in an illustrative embodiment having an aesthetic design along a segment of the outer top surface of the aircraft, with broken lines depicting the environment and border of the segment.
Figure 35:
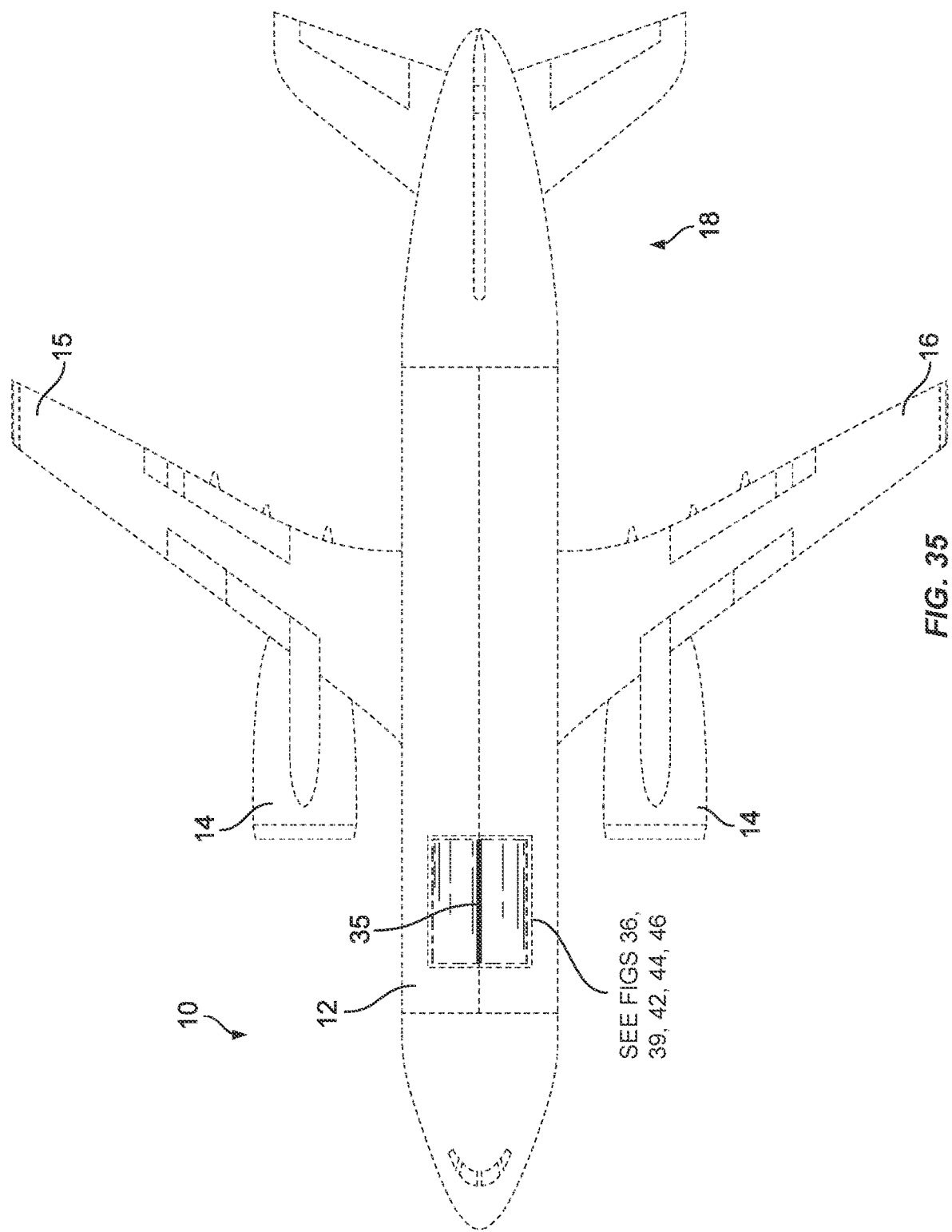
FIG. 35 depicts a top view of the embodiment shown in FIG. 34.
Figure 36:
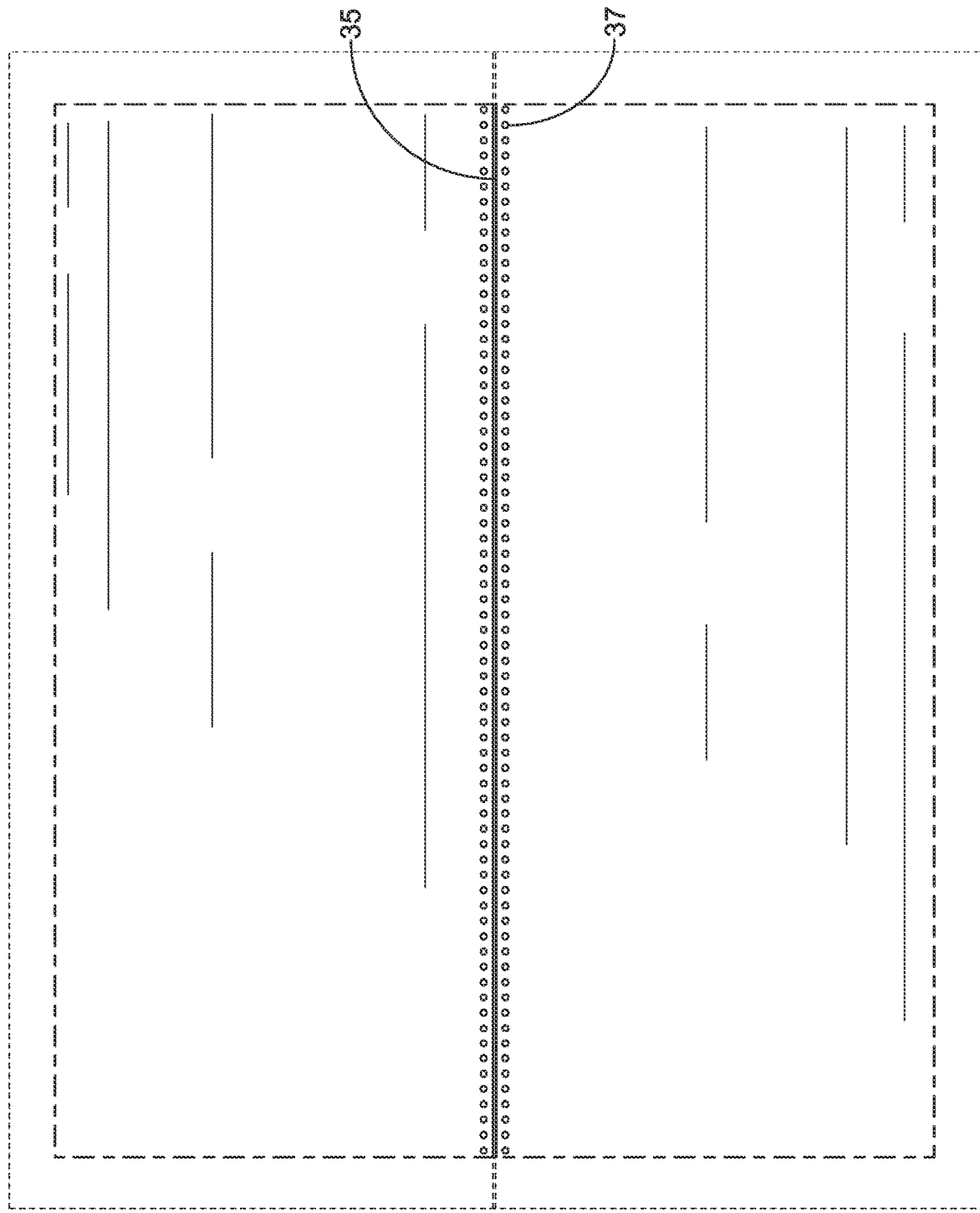
FIG. 36 depicts a magnified view of the segment of the aircraft shown in FIG. 35 (with specific reference in in FIG. 35), having dot-dash broken lines depicting the border of the segment.
Figure 37:
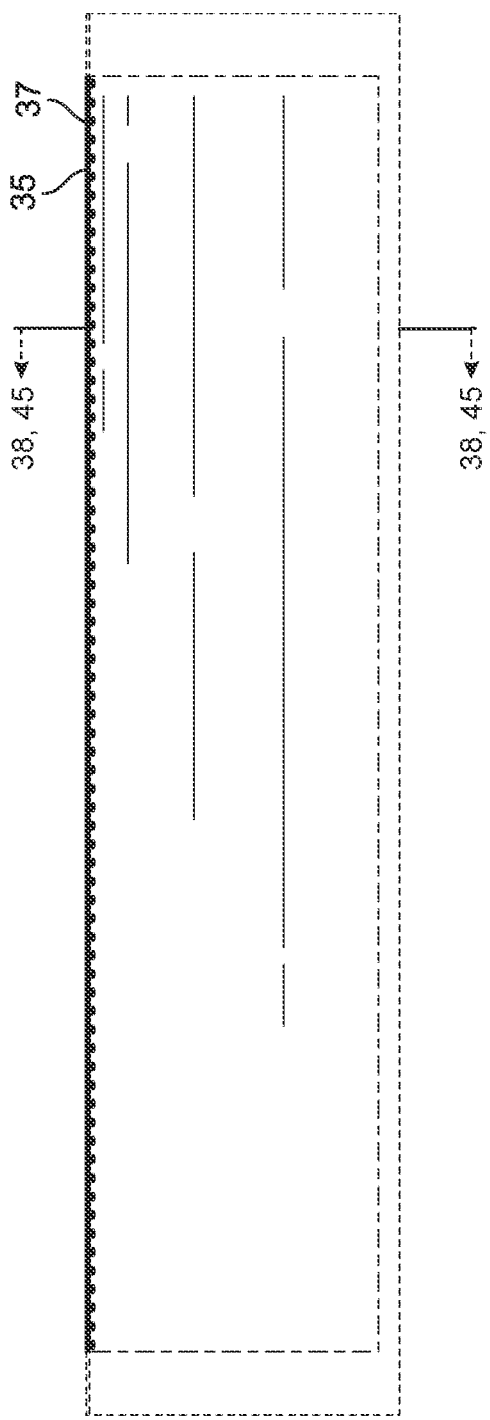
FIG. 37 depicts a side view of the segment in FIGS. 36 and 44, viewed from the side of the aircraft of FIGS. 34 and 35.
Figure 38:
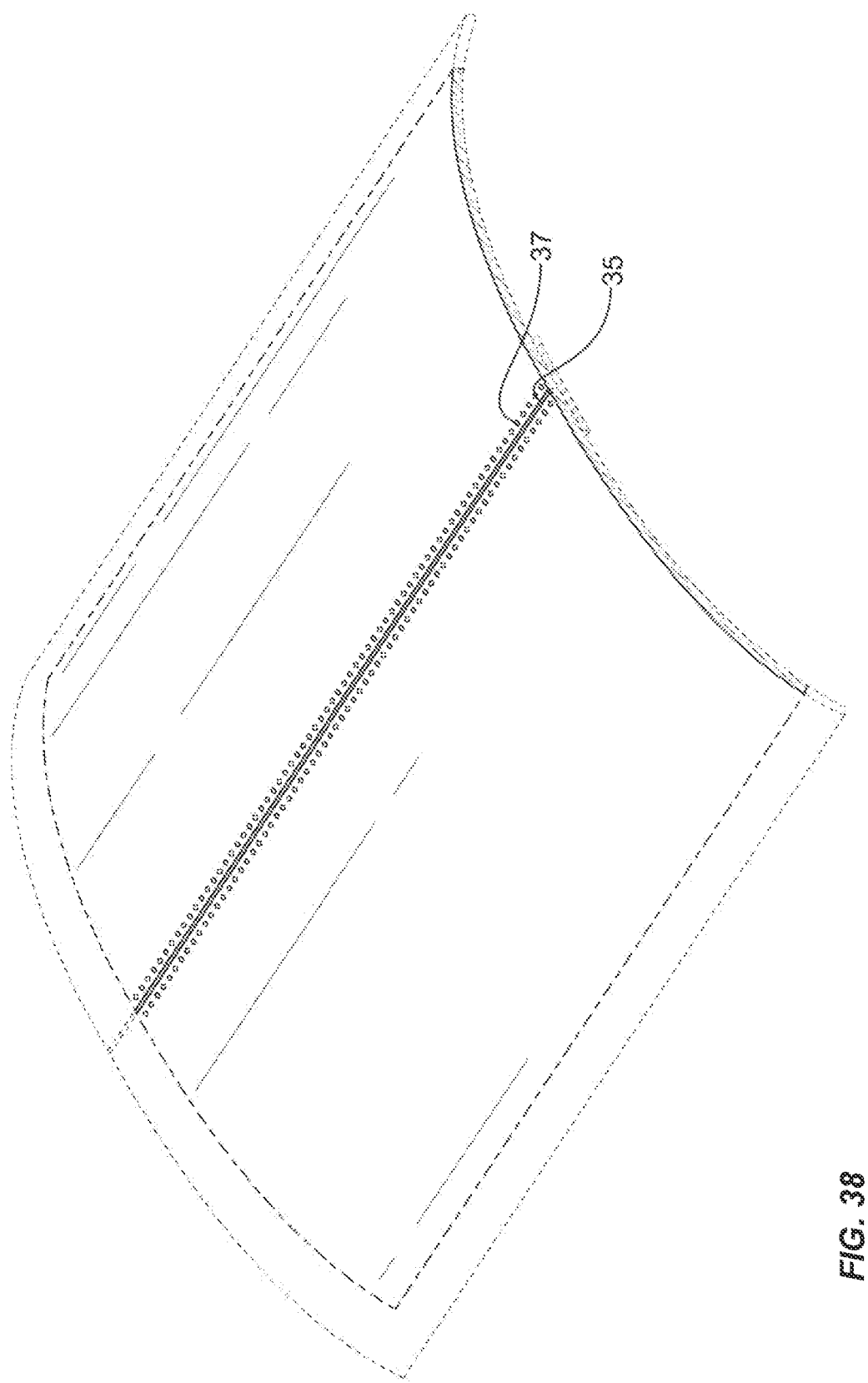
FIG. 38 depicts an elevated perspective view of the segment shown in FIG. 36, showing the outer surface design in solid lines, with broken lines representing a cross-sectional view of an embodiment having such a surface design.
Figure 39:
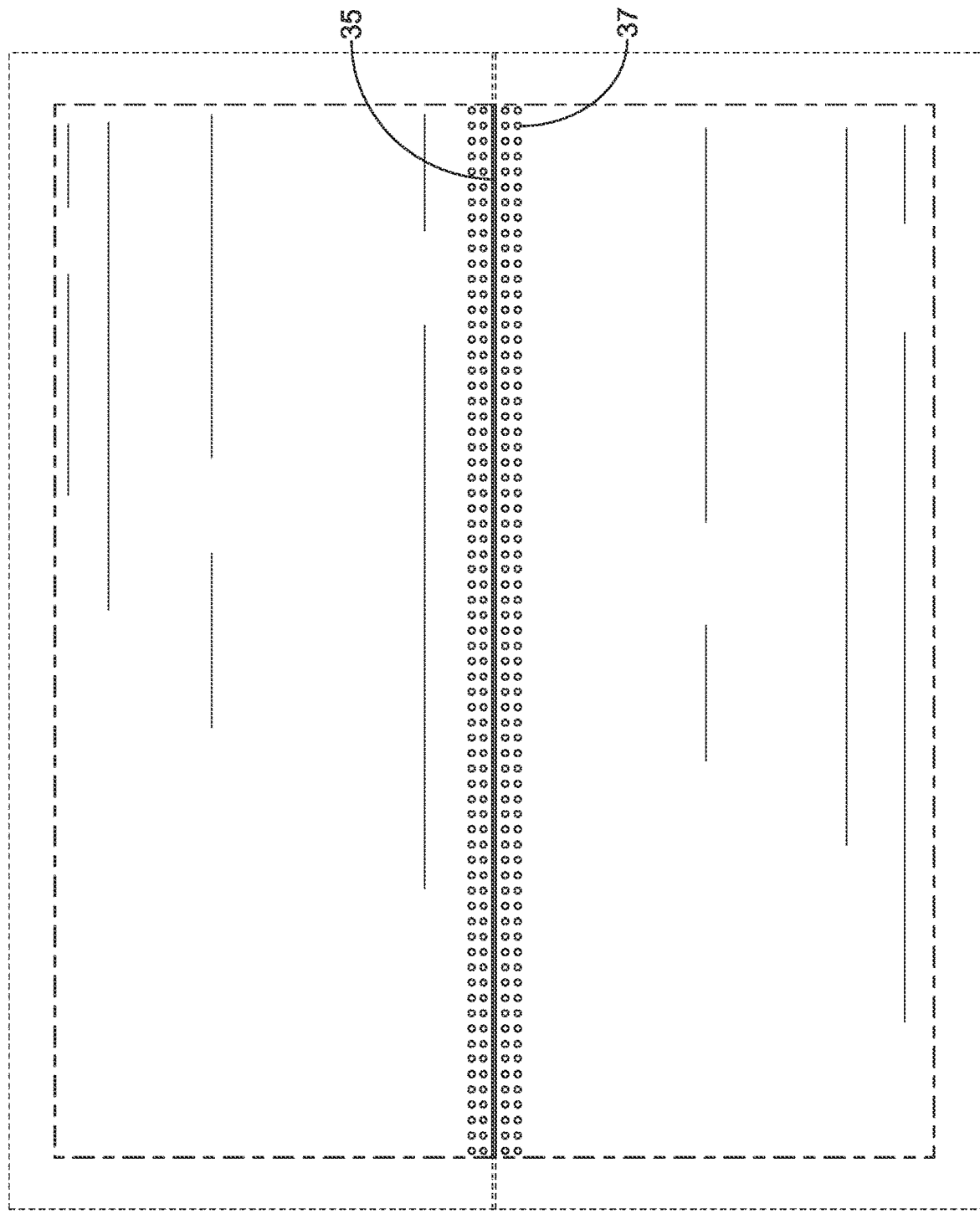
FIG. 39 depicts an alternative embodiment of the design shown in FIG. 36, with dot-dash broken lines for the border of the segment.
Figure 40:
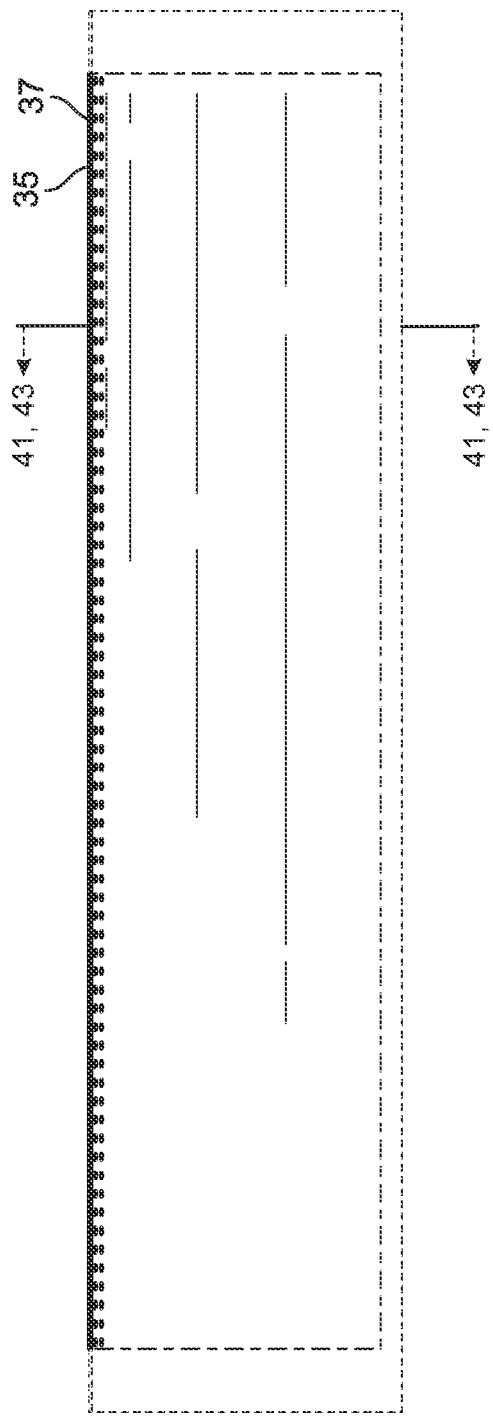
FIG. 40 depicts a side view of the segment in FIGS. 39 and 42, viewed from the side of the aircraft of FIGS. 34 and 35.
Figure 41:
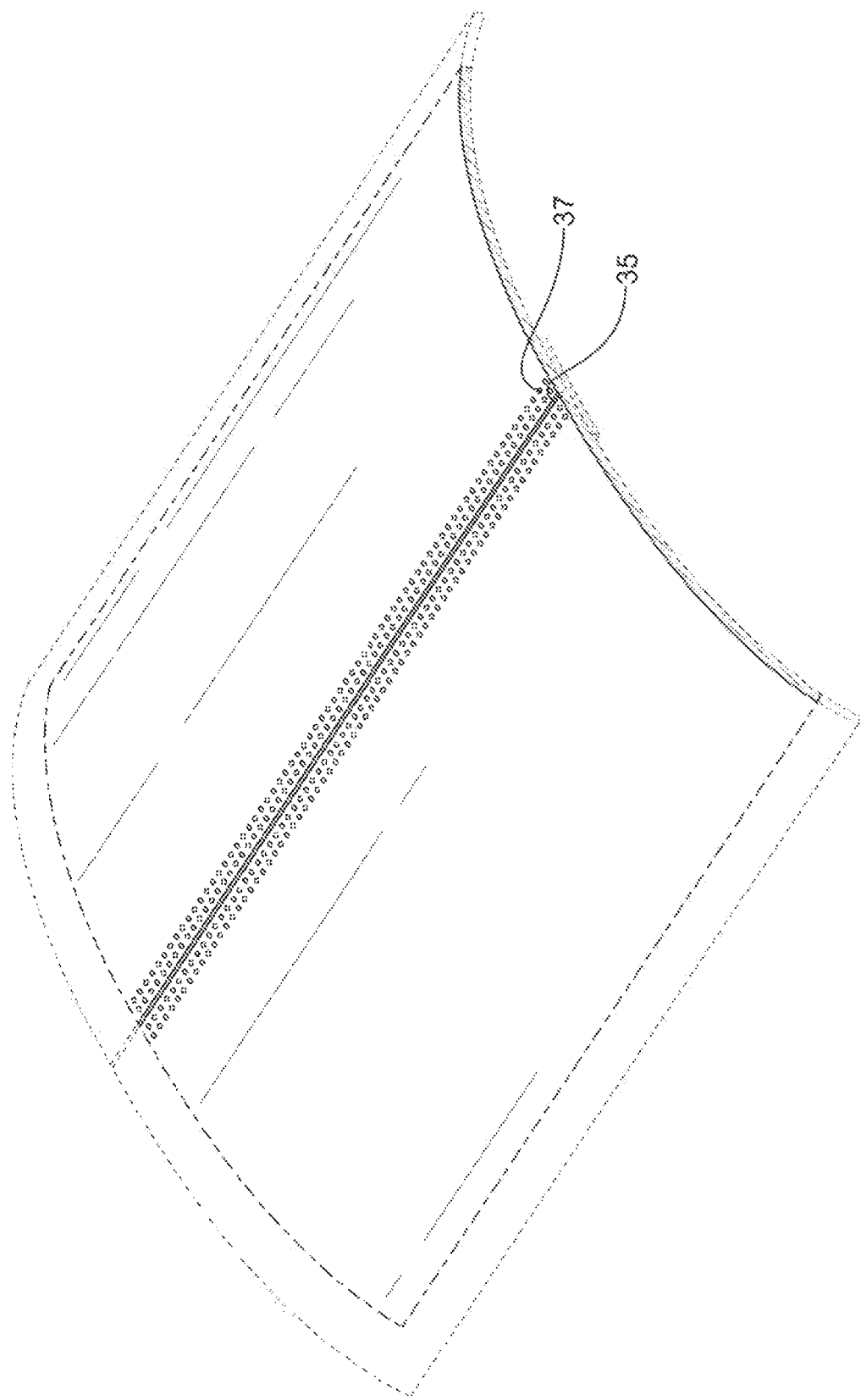
FIG. 41 depicts an elevated perspective view of the segment shown in FIGS. 39, showing the outer surface design in solid lines, with broken lines representing a cross-sectional view of an embodiment having such a surface design.
Figure 42:
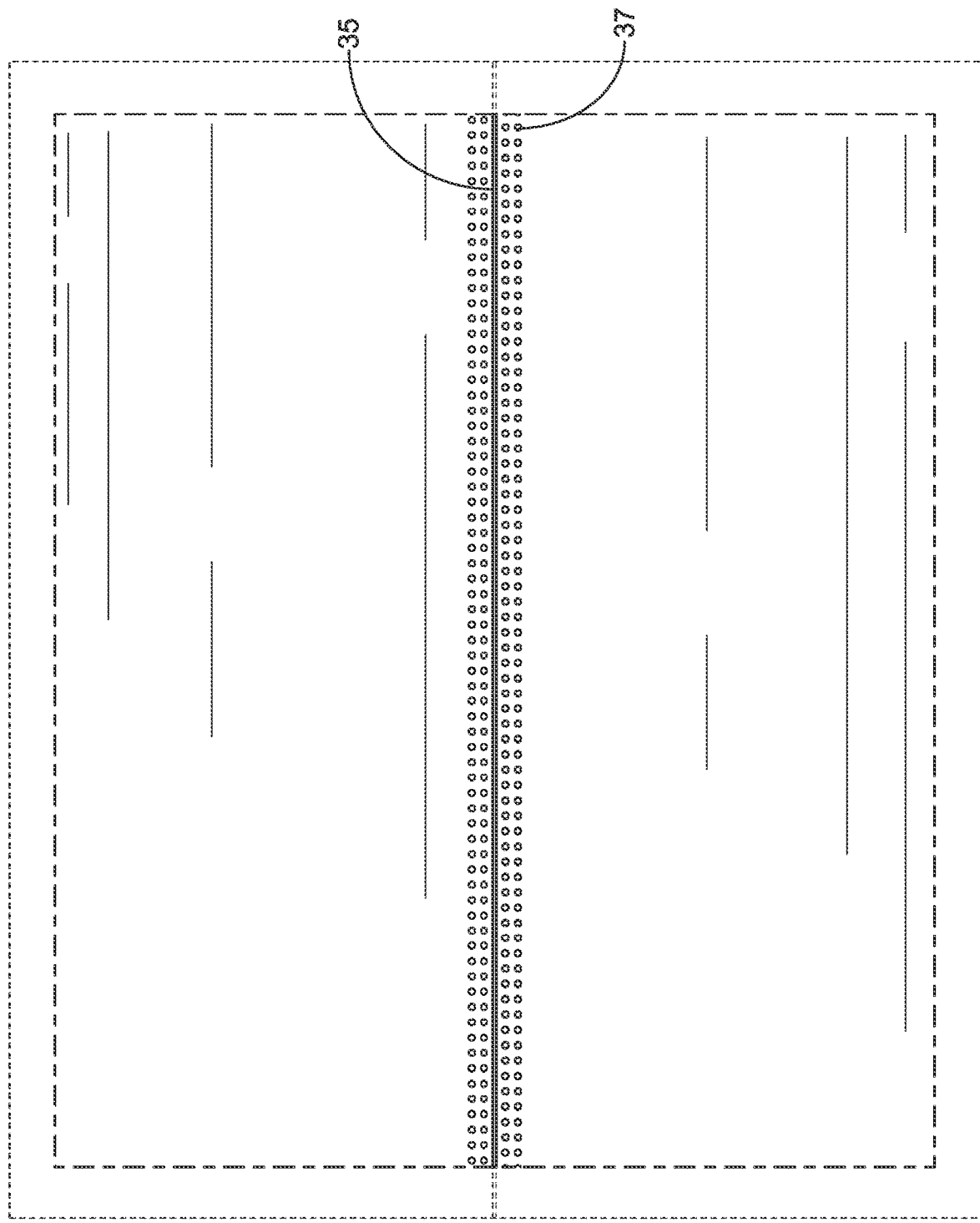
FIG. 42 depicts an alternative embodiment of the design shown in FIG. 36, with dot-dash broken lines for the border of the segment.
Figure 43:
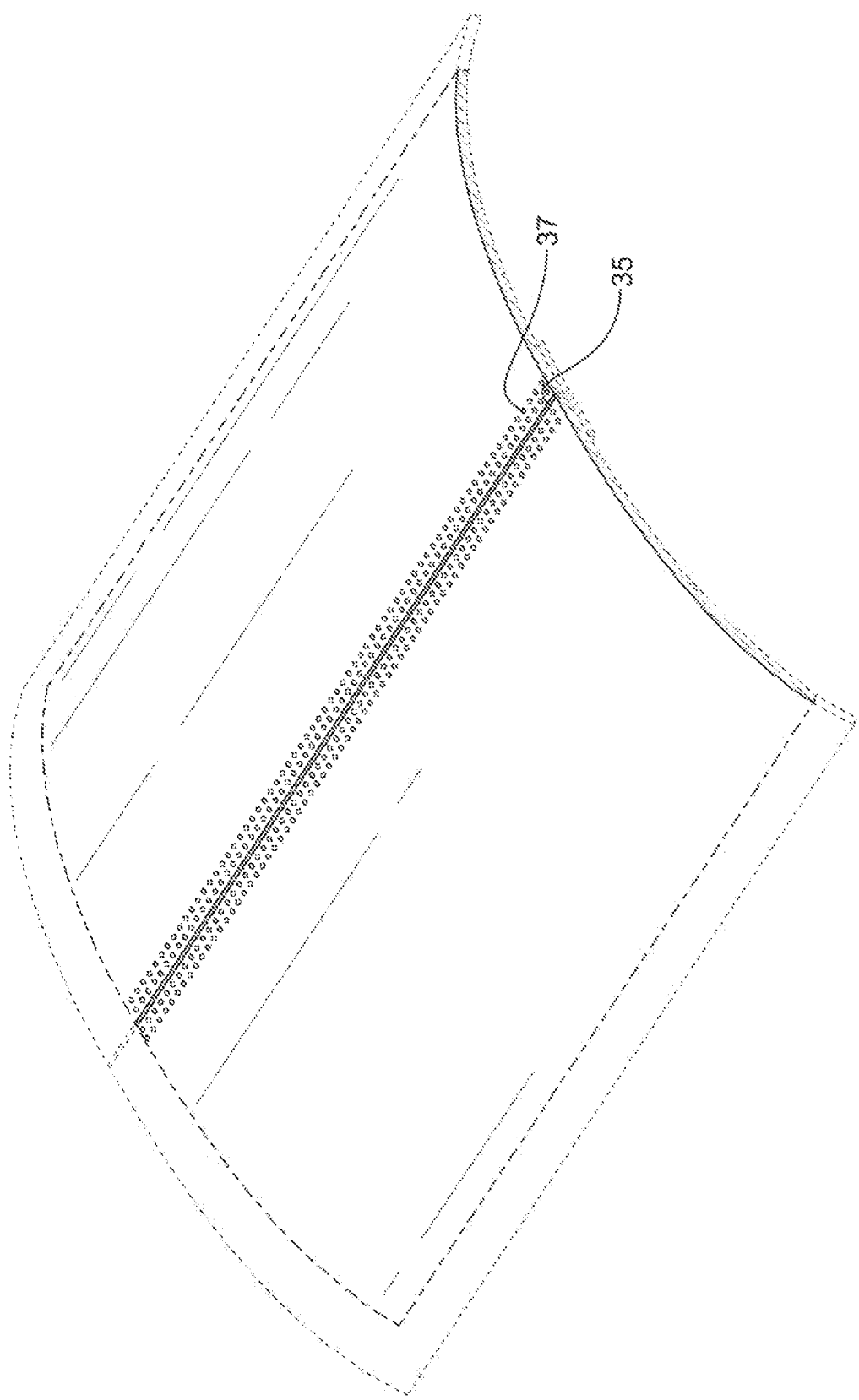
FIG. 43 depicts an elevated perspective view of the segment shown in FIG. 42, showing the outer surface design in solid lines, with broken lines representing a cross-sectional view of an embodiment having such a surface design.
Figure 44:
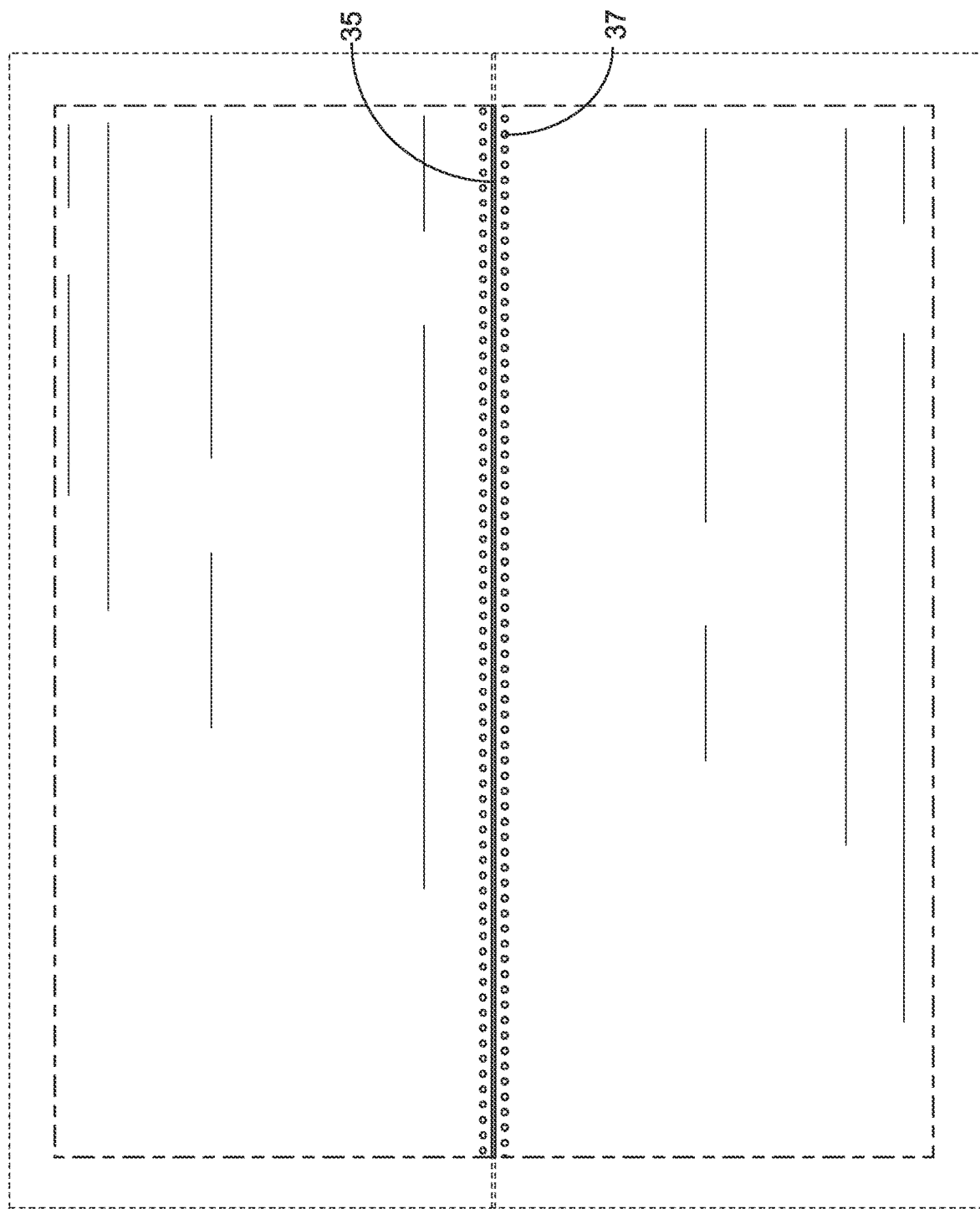
FIG. 44 depicts and alternative embodiment of the segment shown in FIG. 36, with dot-dash broken lines for the border of the segment.
Figure 45:
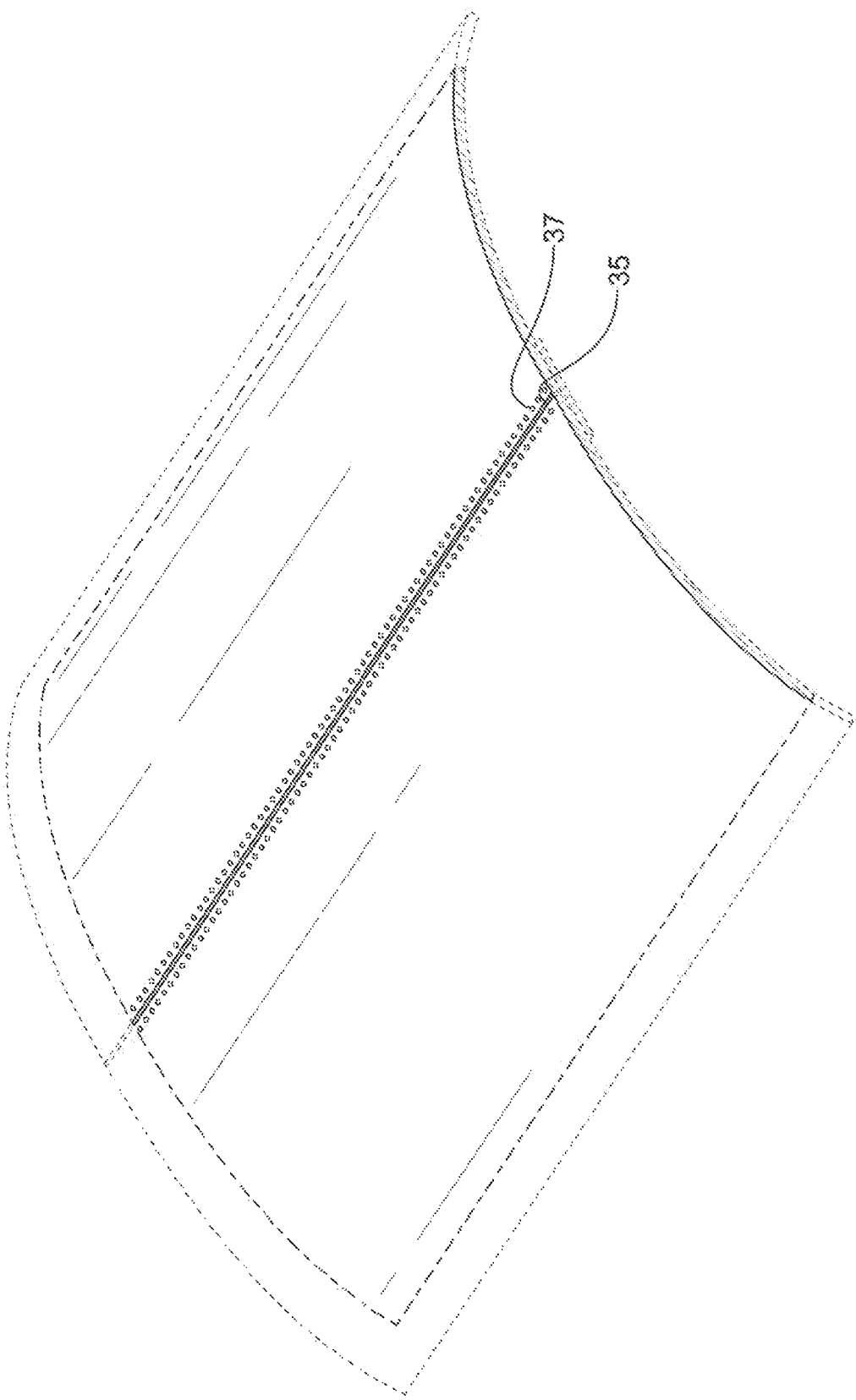
FIG. 45 depicts an elevated perspective view of the segment shown in FIG. 44, showing the outer surface design in solid lines, with broken lines representing a cross-sectional view of an embodiment having such a surface design.
Figure 46:
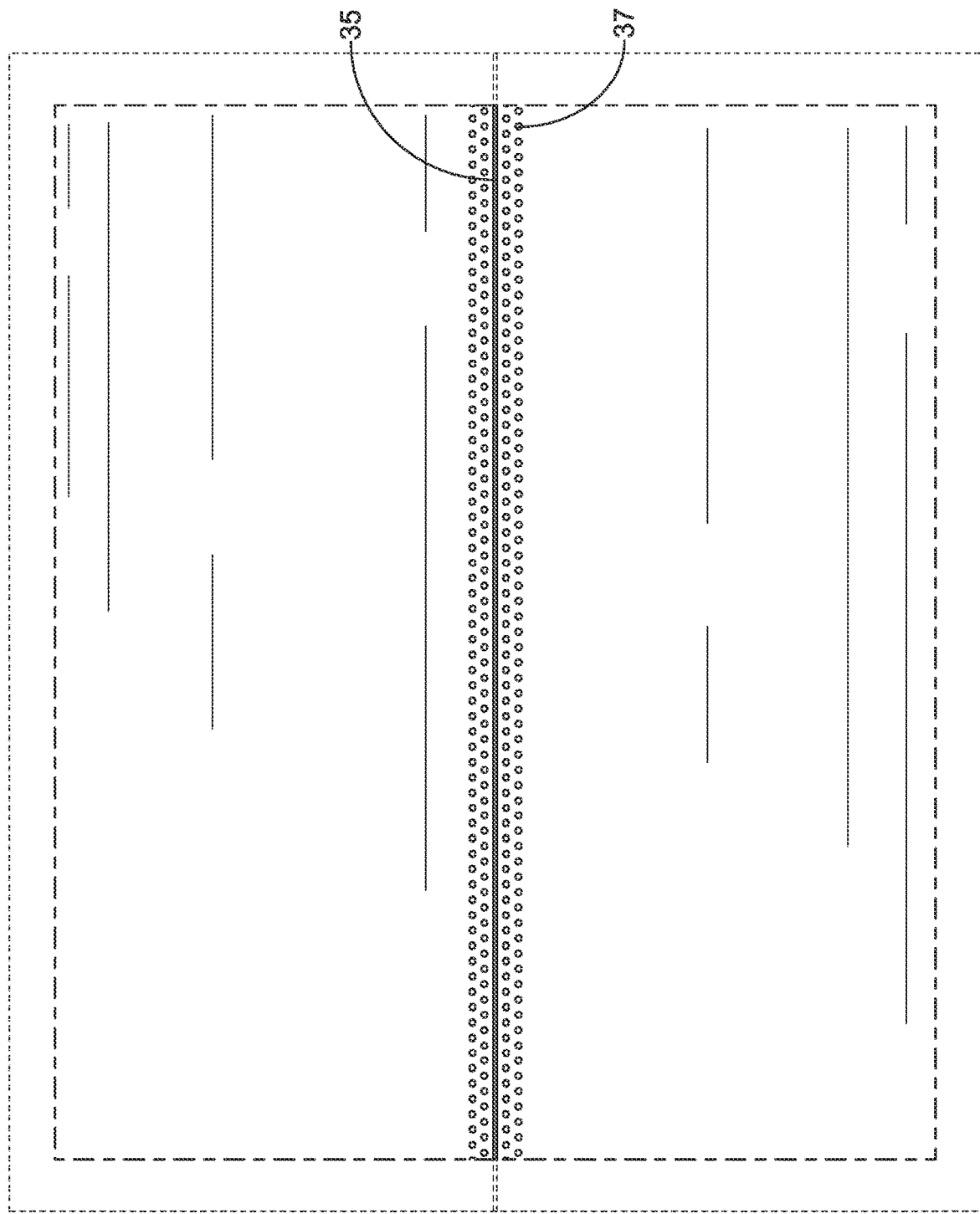
FIG. 46 depicts an alternative embodiment of the design shown in FIG. 36, with dot-dash broken lines for the border of the segment.
Figure 47:
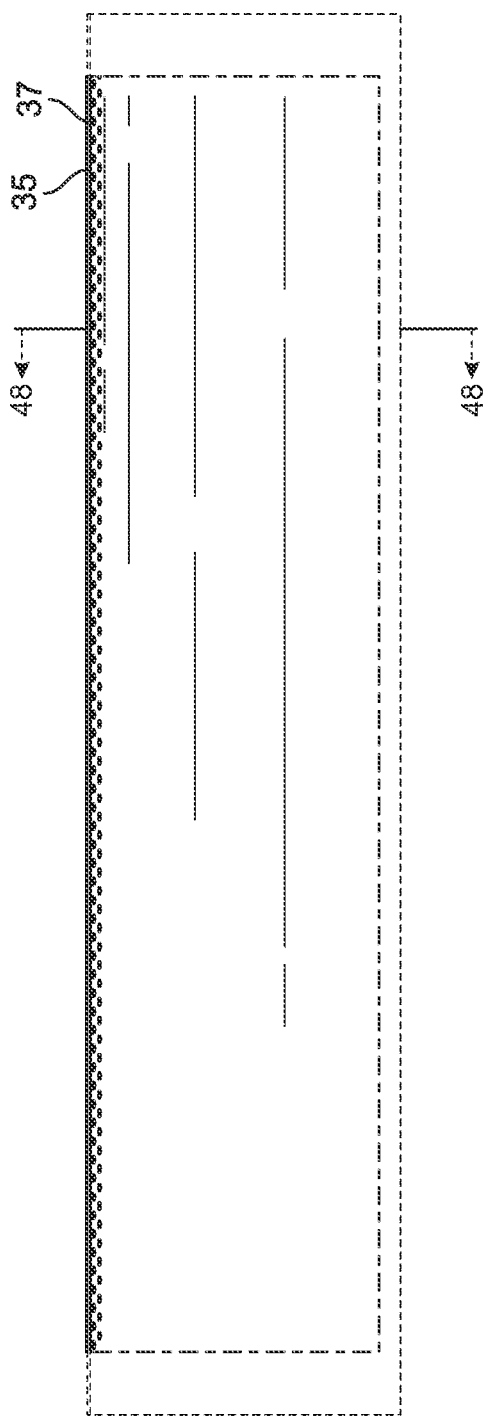
FIG. 47 depicts a side view of the segment in FIG. 46, viewed from the side of the aircraft of FIGS. 34 and 35.
Figure 48:
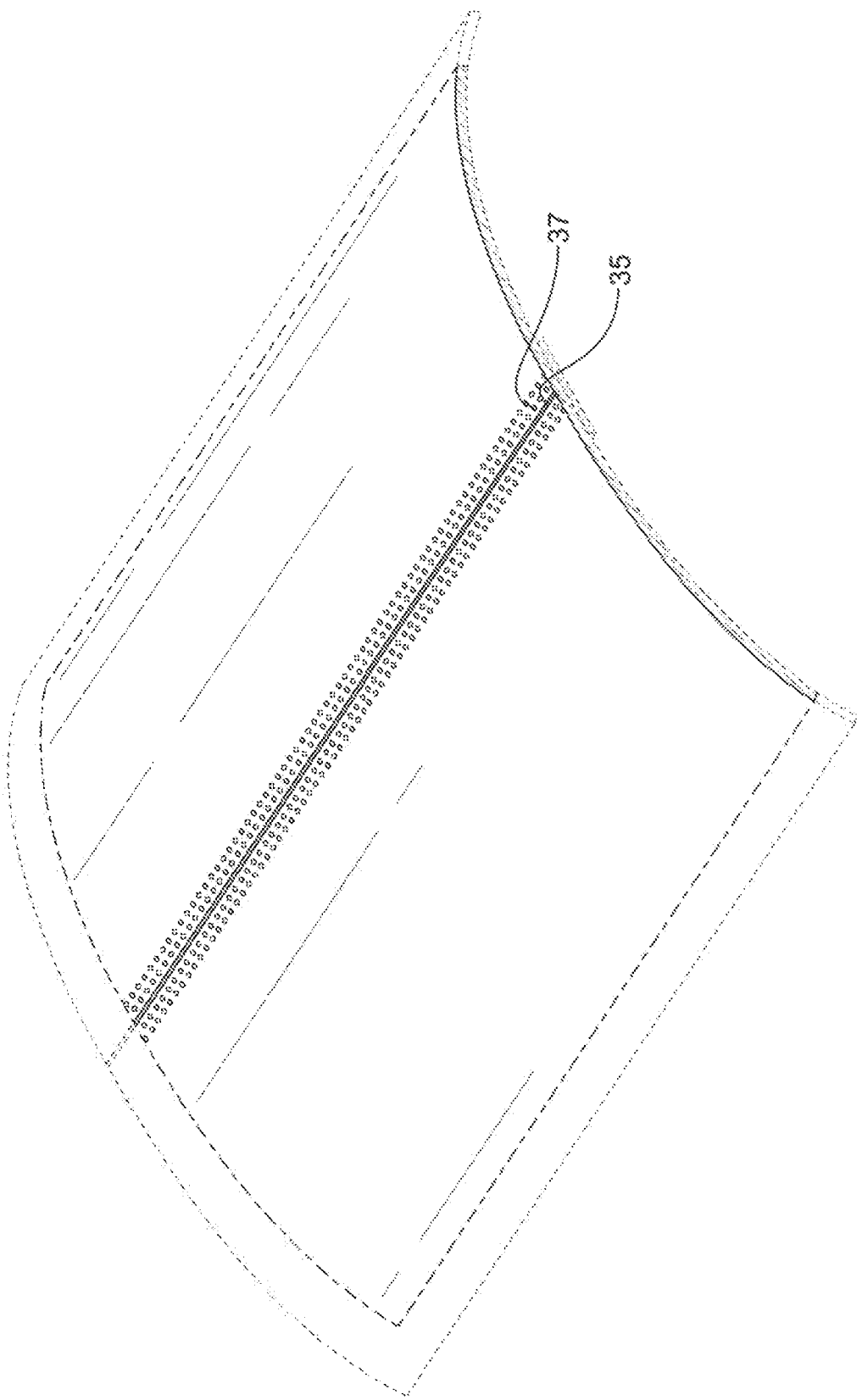
FIG. 48 depicts an elevated perspective view of the segment shown in FIG. 46, showing the outer surface design in solid lines, with broken lines representing a cross-sectional view of an embodiment having such a surface design.

A join station 342 unites the lower half barrel section 314-1 to an upper half barrel section 316-1 by installing fasteners at a butt splice 1201 (FIG. 12) having a splice plate 920 (FIG. 9) that overlaps the butted ends of an upper half barrel section and the lower half barrel section 314-1. Each frame 147-1, 912 is also butt spliced together with a splice plate (e.g., splice plate 920 of FIG. 9) dedicated to each frame 147-1, 398-2, 398-4, 912 in join station 342. This results in the upper half barrel section 316 and the lower half barrel section 314-1 being longitudinally spliced together, including splicing the skin 911 and the frames 912 together. This longitudinal splice of the half barrels may be constructed in a manner to provide a residual outer surface appearance of a longitudinal line along a major extent of a section of the fuselage, and may include the appearance of fasteners on each side of the longitudinal line, either as a single row of fastener heads on each side of the longitudinal line (such as is depicted in FIGS. 29, 36 and 44), or may have a pair of faster heads on each side of the longitudinal line (such as is depicted in FIG. 24, 27, 31, 39, 42 or 46). The splice plate 597, 920 (FIG. 9) can be installed onto either lower half barrel or upper half barrel section (or each side half barrel in such an alternate embodiment having right and left half barrels) or both before entering the join station 342 as part of assembly stage 320 and/or assembly stage 330. The splice plate 597, 920 may be installed entirely in the join station 342. In this embodiment, the join station 342 also performs installation of any electrical or plumbing in a splice zone 914. Installation of insulation and wall panels in the splice zone 914. The floor grid attach station 530, vertical inversion station 560, and join station 342 are separated along the process direction 501 traveled by the lower half barrel section 314-1.

Figure 6:
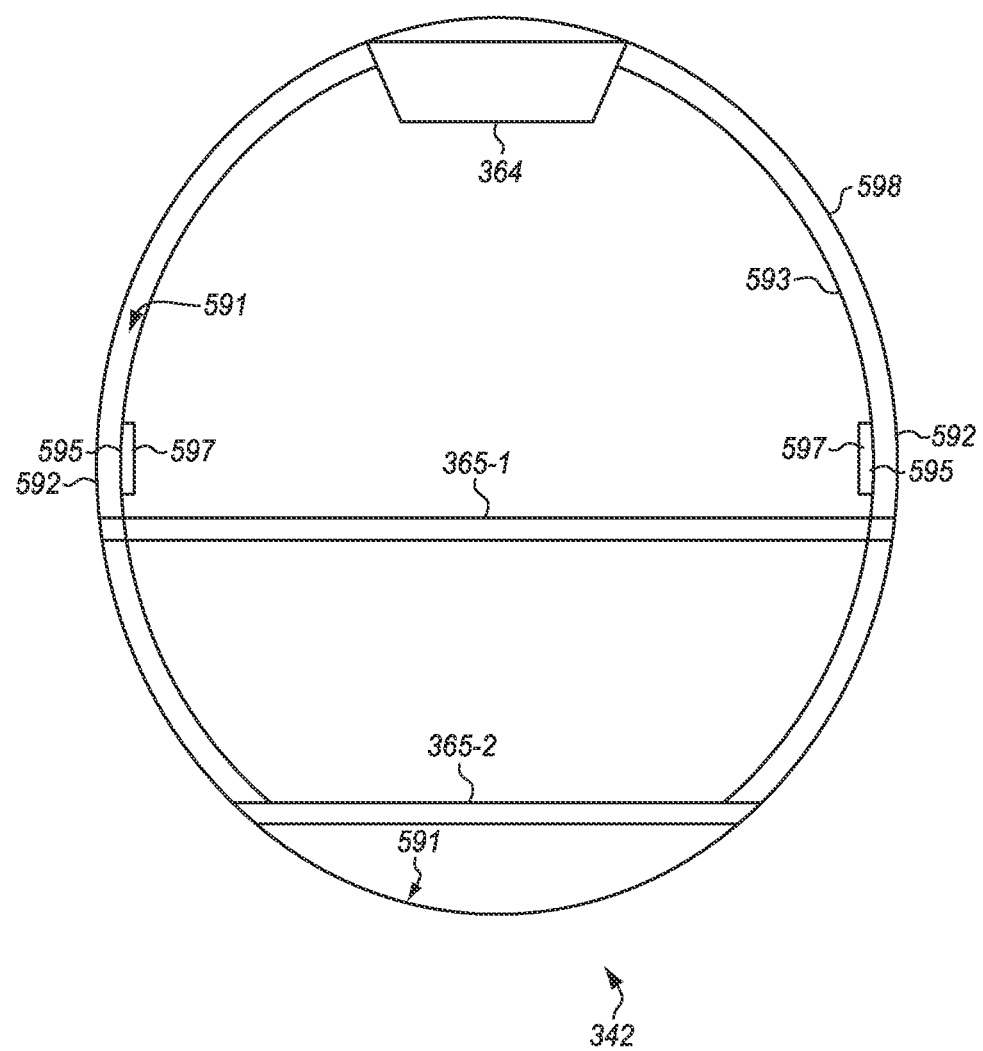
FIG. 6 depicts a cross section of a fuselage in an illustrative embodiment.

In FIG. 6, a cross-section of a fuselage 598 in join station 342 is depicted, which includes installed cargo floor 365-2 and passenger floor 365-1. FIG. 6 further illustrates that a crown module 364 and splice plate 597, 920 have been added in two places. In one embodiment, the crown module 364 includes stow bins and interior lighting, and these details are not shown in FIG. 6 for the sake of clarity. Insulation 591 and interior panels 593 are also shown as being installed. The crown module 364, splice plate 597, 920, insulation 591, interior panels 593, installed cargo floor 365-2 and passenger floor 365-1 are illustrated not to scale and in block format for clarity. As illustrated, the splice plate 597, 920 is installed onto an Inner Mold Line (IML) 595 of the half barrel section 24. In another embodiment not illustrated, the splice plate 597, 920 is installed onto an Outer Mold Line (IML) (592) of the half barrel section.

FIG. 7 is a flowchart depicting a method 600 for utilizing the floor grid assembly line 500, 500-1 of FIG. 5, 6, respectively, in an illustrative embodiment. According to method 600, step 602 includes receiving a lower half barrel section 314-1 in a keel up orientation 563-3), and step 604 comprises installing a cargo floor grid 365-2 and then passenger floor grid 365-1 into the lower half barrel section 314-1 while the lower half barrel section 314-1 is in a keel up orientation 563-3. In one embodiment, the lower half barrel section 314-1 is disposed in the assembly stage 330 for about twice as long as upper half barrel section 316-1 is within assembly stage 320. The lower half barrel section 314-1 takt time in one embodiment is fourteen hours after entering assembly stage 330. Plumbing and electrical systems along with insulation and wall panels not in the join region are added in assembly stage 330 (not illustrated) before the lower half barrel section 314-1 is inverted into a keel down orientation 563-1. Step 606 includes rotating the lower half barrel section 314-1 into a keel down orientation 563-1), and step 608 includes attaching the lower half barrel section 314-2 to an upper half barrel section 316-2 in order to form a full barrel section 148. Attaching the first half barrel section 314-2 to the second half barrel section 316-2 involves at least splicing the skin together with a splice plate 597, 920 and splicing each frame together. This operation may be performed, for example, during a full pulse 118-4.

In further embodiments, the lower half barrel section 314-1 is advanced in a process direction 199 before it receives what is produced by the floor grid assembly line 500, 500-1, and lower half barrel section 314-3 is advanced in the process direction 199 after installing the floor grid 506, and is further advanced as lower half barrel section 314-2 in the process direction 199 after being rotated.

Method 600 provides a technical benefit by enabling lower half barrel sections 314 to be processed and receive floor grids while they remain inverted, which eliminates the need for rotating the lower half barrel sections 314-1 until just before the lower half barrel sections 314-2 are joined to corresponding upper half barrel sections 316-2. This reduces the need for specialized equipment at the factory floor to perform work upon an inverted lower half barrel section 314-2 prior to joining. The specialized equipment includes flooring for technicians and/or robots that would be entirely or partially removed prior to joining the lower half barrel section 314-2 to the upper half barrel section 316-2. Therefore, prior to inverting, the technicians can work off of stands mounted to a shop floor or directly on the shop floor without the difficulties of installing a cargo or passenger floor instead of positioning technician and/or robot support areas in the same space as the floor install in a keel down orientation 563-1. This is another example of bringing the work to the tool, tooling and technicians. The keel up orientation 563-3 permits a more comfortable/ergonomic floor grid 365 installation position for the tool, tooling, robots and/or technicians.

FIG. 8 is a flowchart depicting a method 900 of installing splice plates 597, 920 for joining half barrel sections in an illustrative embodiment. The splice plates 597, 920, 920-1 or segments 1042 (FIG. 10A) may be composite, titanium or aluminum. If aluminum, the splice plates 597, 920, 920-1 are fastened and fay surface sealed and otherwise sealed to avoid galvanic issues when affixed to lower half barrel section 314 and upper half barrel section 316. If titanium, the splice plates 920, 920-1 and/or segments 1042 are fastened and fay surface sealed and otherwise sealed when affixed to lower half barrel section 314 and upper half barrel section 316. Composite splice plates 920, 920-1 and/or segments 1042 are bonded and/or fastened into place. If composite splice plates 920, 920-1 and/or segments 1042 are fastened, the fay surface is sealed when affixed to lower half barrel section 314 and upper half barrel section 316. Step 902 includes receiving upper half barrel section 116, 126, 316 or lower half barrel section 118, 128, 314-2 assembly line 110, 120, 310 at assembly stage 320, 330 or join station 342, 342-1. In one embodiment, this comprises receiving an upper half barrel section 116, 126, 316-2 in assembly line 110, 120, 310 that proceeds in process direction 199 through multiple work stations 114, 124, 312, respectively. In a further embodiment, step 902 comprises receiving a lower half barrel section 118, 128, 314 in an assembly line 110, 120, 310 in process direction 199 through multiple work stations 114, 124, 312, respectively. Each work station 114, 124, 312 in the assembly line 110, 120, 310 is capable of operating at the same time as other work stations 114, 124, 312 while performing work upon the same upper half barrel section 116, 126, 316 or lower half barrel section 118, 128, 314 at the same time. These work station 114, 124, 312 operations may be independent of, or coordinated with, other work stations 114, 124, 312 while performing work upon upper half barrel section 116, 126, 316 or lower half barrel section 118, 128, 314 at the same time. The splice plate 920 is installed upon either the upper half barrel section 116, 126, 316 or lower half barrel section 118, 128, 314 or one splice plate 920 on each as it progresses through work station 114, 124, 312. In an embodiment, splice plate 920 is installed in a dedicated work station 114, 124, 312. In another embodiment, the splice plate 920 is installed in assembly lines 110, 120, 310 using a flex track device 1024 that follow a track 1023 removably installed onto the upper half barrel section 116, 126, 316 or lower half barrel section 118, 128, 314. The flex track device 1024 and track 1023 are temporarily part of upper half barrel section 116, 126, 316 or lower half barrel section 118, 128, 314 as it progresses through work station 114, 124, 312. Work stations 114, 124, 312 perform work upon progresses through work station 114, 124, 312 while flex track device 1024 and track 1023 also performs work upon it. When the installation of splice plate 920 upon either upper half barrel section 116, 126, 316 or lower half barrel section 118, 128, 314 is completed, the flex track device 1024 and track 1023 are separated and then cycled back up the assembly line 110, 120, 310. The upper half barrel section 116, 126, 316 and/or the lower half barrel section 118, 128, 314 exit the assembly line 110, 120, 310 with a splice plate 920 installed on one longitudinal edge or on both and are each advanced to assembly stage 320, 330 where a crown module 364 and cargo floor grid 365-2 and passenger floor grid 365-1 are installed in whole or less than whole, respectively. The splice plate 920 installed upon one of lower half barrel section 118, 128, 314 and/or upper half barrel section 116, 126, 316 while the other edge of the splice plate 920 is fastened in the join station 342. Alternatively, splice plate 920 is installed onto lower half barrel section 118, 128, 314 and/or upper half barrel section 116, 126, 316 while in assembly stage 330, 320, respectively. Flex track device 1024 and track 1023 are used or some other means of installing the splice plate 920 upon one of lower half barrel section 118, 128, 314 and/or upper half barrel section 116, 126, 316 while the other edge of the splice plate 920 is fastened in the join station 342. In another embodiment, splice plate 920 is attached entirely within the join station 342. Flex track device 1024 and track 1023 are used or some other means of installing the splice plate 920 upon both lower half barrel section 118, 128, 314 and upper half barrel section 116, 126, 316 in the join station 342. Step 904 comprises installing a splice plate 920 at the upper half barrel section 116, 126, 316 and/or lower half barrel section 118, 128, 314. In one embodiment, this comprises installing the splice plate 920 at a boundary 1032 (FIG. 10) of the upper half barrel section 316 while the upper half barrel section 316 proceeds through the assembly line 110, 120, such that the splice plate 920 protrudes from the boundary 1032, 1132 (FIG. 11). In a further embodiment, step 904 comprises installing a splice plate 920 at boundary 1032 of a lower half barrel section 314 while the lower half barrel section 314 proceeds through the assembly line, such that the splice plate 920 protrudes from the upper boundary, such as boundary 1032 of FIG. 10. The splice plate 920 laps over the lower boundary (e.g., boundary 1032 of FIG. 10) with roughly its upper half barrel half attached to the upper half barrel section 316 via multiple rows of fasteners and fay surface sealing and/or bonding. This is the first part of establishing a butt splice 1201 join formed by the splice plate 920. The protruding portion of the splice plate 920 will lap over an upper boundary (e.g., boundary 1032 of FIG. 10) of the lower half barrel section 314 and be attached by multiple rows of fasteners with fay surface sealing and/or bonding. The protruding portion will be half of the width of the splice plate 920 divided along a longitudinal line. The longitudinal line is at roughly the half width point of the splice plate 920 and is located at roughly the butt point of the upper half barrel section 316 and the lower half barrel section 314. That is, a single splice plate 920 of a length commensurate with the half barrel section 314, 316, or a splice plate 920 comprising multiple splice segment 1042 (FIG. 10) arranged in serial or end-to-end and installed along a length of the upper half barrel section 316, may be placed into contact with an IML 1034 of upper half barrel section 316, such that the splice plate 920 protrudes beneath a lower boundary of the upper half barrel section 316. The splice plate 920 may be installed via co-bonding, via the installation of fasteners 1050 through the upper half barrel section 316 and the splice plate 920, etc. In a further embodiment, the splice plate 920 is installed via a combination of bonding and fasteners as a splice mounted upon the OML 1035 or a splice plate 920 placed upon the IML 1034 and the OML 1035. Similarly, the splice plate 920 is capable of installation upon the lower half barrel section 314 prior to process direction 199 advancing to join station 342.

Installing a splice plate 920 at a lower boundary (e.g., boundary 1032 of FIG. 10) may comprise installing the splice plate 920 such that the splice plate 920 protrudes beneath, or is otherwise placed proximate to the lower boundary (e.g., boundary 1032 of FIG. 10). In one embodiment, the splice plate 920 is installed during pauses between micro pulses 129, during micro pulses 129 or during both pauses between micro pulses 129 and during micro pulses 129 of the upper half barrel section 316 in the process direction 199 at the assembly line 110 (e.g., via a work station 114 at a micro pulse or full pulse line, to be installed in segments via micro pulse or as full splice plates via full pulse). In a further embodiment, the splice plate 920 is installed during continuous motion of the upper half barrel section 316 in the process direction 199. Thus, the splice plate 920 is installed at an assembly line that the upper half barrel section 316 travels through. In a still further embodiment, the splice plates 920 are installed after the relevant upper half barrel section 116, 126, 316 and/or lower half barrel section 118, 128, 314) has exited the assembly line 110, 120, 310 and entered an assembly stage 320 or assembly stage 330 wherein a cargo floor grid 365-2, passenger floor grid 365-1 or crown module 364 is installed). In a still further embodiment, installing the splice plate 920 is performed during installation of a crown module 364 or installation of a cargo floor grid 365-2 and passenger floor grid 365-1 into one or both of an upper half barrel section 316 and a lower half barrel section 314, respectively, at the same time.

In a further embodiment, the splice plate 920 is attached to an upper half barrel section 316-2 in assembly stage 320 (i.e. crown module grid station 730) for installing a crown module 364, 732. In a still further embodiment, the splice plate 920 is installed on a lower half barrel section 314-2 in the assembly stage 330, 330-1 for installing a cargo floor grid 365-2 and passenger floor grid 365-1, or is installed onto both upper half barrel section 316-2 and lower half barrel sections 314-2 at the same time within a join station 342. Thus, the vast majority to all splicing activity in such embodiments preferably occurs in the join station 342.

Depending on the embodiment, the splice plate 920 is dimensioned for IML 1034 (FIG. 10) or OML 1036 (FIG. 10) installation. The butt splice 1201 itself can include a splice plate 920 disposed at an IML 918, 1034 or OML 916, 1036 or both depending upon embodiment. That is, the splice plate 920 is installed onto an IML 918, 1034 or OML 916, 1036, or is installed onto one edge of upper half barrel section 316-2 and complementarily onto one edge of the lower half barrel section 314-2. The splice plates 920 can be as long as the half barrel sections 117, 117-1 discussed above, or some fraction thereof as splice segment 1042 (FIG. 10). Multiple splice segment 1042 that are longitudinally arranged serially and are disposed along an entirety of the full pulse 118-4 of the half barrel sections 117, 117-1 on both splices or a single splice as discussed above. Furthermore, a splice plate 920 can be longitudinally installed onto either an upper half barrel section 316 or lower half barrel section 314 before entering a join station 342, 342-1 as part of the assembly stage 320 or at attach stage 330. Still further, a splice plate 920 can be longitudinally installed to widthwise straddle splice zone 914 and onto both upper half barrel section 316-2 and lower half barrel section 314-2 as part of the work done in join station 342, 342-1. In still further embodiments, a splice plate 920 also operates as a longitudinally running stringer which straddles the splice zone 914 when coupled to the upper half barrel section 316-2 and the lower half barrel section 314-2.

The splice of the upper half barrel section 316-2 to the lower half barrel section 314-2 described above is a butt splice 1201 (FIG. 12). In yet even more embodiments, the upper half barrel section 316-2 are lap spliced to the lower half barrel section 314-2 with or without splice plate 920 as required. Thus, an overlap fastened together exists between the longitudinal edge of the lower half barrel section 314-2 and the longitudinal edge of the upper half barrel sections 316-2.

Step 906 comprises aligning the upper half barrel section 316-2 with the lower half barrel section 314-2 to form a splice zone 914 therebetween. In one embodiment, this comprises aligning the upper half barrel section 316-2 with a lower half barrel section 314-2, which is performed while the upper half barrel section 316-2 remains butted against the lower half barrel section 314-2 while it is supported by a cradle 1150 (FIG. 11) or other device. Thus, the lower half barrel section 314-2 may be placed in a cradle 1150 prior to aligning with the upper half barrel section 316-2. In embodiments where the lower half barrel section 314-2 is also processed via the assembly line 110, 120, 310, aligning the upper half barrel section 316-2 with the lower half barrel section 314-2 may include rotating the lower half barrel section 314-2 from a keel up orientation 563-3 to keel down orientation 563-1 via vertical inversion station 560 of FIG. 5.

In step 908, the upper half barrel section 316-2 or lower half barrel section 314-2 are joined by attaching the splice plate 920 within splice zone 914. In one embodiment, the upper half barrel section 316-2 is joined to the lower half barrel section 314-2 by attaching the splice plate straddling boundary 1032 and boundary 1132. The splice plate 920 is installed via co-bonding and/or via the installation of fasteners or both to the lower half barrel section 314-2 and the upper half barrel section 316-2, as described herein. In one embodiment, joining the first (such as an upper half barrel section 316-2) and a second half barrel section (such as a lower half barrel 314-2) comprises butt splicing the sections together as is described herein.

Additionally, to complete the butt splice 1201 the frames 912, 912-1 are spliced together within splice zone 914. Frames 912, 912-1 correspond to frame 147-1 and frame 912 frames 398-2, 398-4. Each upper half barrel section 316-2 and lower half barrel section 314-2 includes frames 912, 912-1 and frame splices 913, such as stub frames 913-1, joining frame 912 to 912-1, and to splice plate 920 and to skin 911. The frame splices 913 using stub frames 913-1 as part of butt splice 1201 to splice frame 912 to 912-1. Frame 912, 912-1 are located on upper half barrel section 316-2 and lower half barrel section 314-2, respectively. The use of stub frames 913-1 as part of a frame splice 913 enables the frames 912, 912-1 installed into the upper half barrel section 316-2 and lower half barrel section 314-2 to not extend all the way to boundary 1032 (FIGS. 10 and 11) and boundary 1132 (FIG. 11) facilitating clearance for placing splice plate 920 directly against skin 911 within splice zone 914. The stub frame 913-1 spans across splice plate 920 to join frame 912 to frame 912-1. The stub frame 913-1 is also fastened through skin 911 and splice plate 920.

Another configuration does not have the stub frame 913-1 fastened through skin 911 and splice plate 920.

The frames 912, 912-1 of the upper half barrel section 316-2 and lower half barrel section 314-2 end prior to the frame splices 913 to facilitate placement of splice plate 920 directly against skin 911 within splice zone 914. The frame splices 913 are installed on the IML 918 of the upper half barrel section 316 and lower section 314 and then the stub frames 913-1 are installed to connect the frames 912, 912-1 of the upper half barrel section 316-2 to the lower half barrel section 314-2 and span the frame splice 913. A further benefit is that frames 912, 912-1 do not extend all the way to boundary 1032 (FIG. 10) and boundary 1132 (FIG. 11) facilitates movement of the upper half barrel section 316-2 and the lower half barrel section 314-2 along track 112-1 prior to splicing and joining at the join station 342. The frames 912, 912-1 do not interfere with track 112-1. It also facilitates installation of splice plates 920. Splice plates 920 are installed in splice zones 914 to couple the skin 911, 911-1 of upper half barrel section 316-2 to lower half barrel section 314-2 together, respectively. Depending on the embodiment, the splice plates 920 are installed at IML 918 or OML 916 at frame splices 913. Furthermore, splice plates 920 are designed to occupy an entire length of upper half barrel section 316-2 and lower half barrel section 314-2, or some fraction thereof as splice segment 1042. A splice plate 920 can be installed onto either an upper half barrel section 316-2 or lower half barrel section 314-2 before either enters assembly stage 320, 330 for joining a crown module 364 or a floor grid 365, respectively.

FIG. 9 is a block diagram 990 depicting upper half barrel section 316-2 and lower half barrel section 314-2 coupled via splice plates 920 as part of a butt splice 1201 (FIG. 12) in an illustrative embodiment. Each upper half barrel section 316-2 and lower half barrel section 314-2 includes frames 912, 912-1, respectively, and frame splices 913, such as stub frames 913-1, joining frame 912 to 912-1, splice plate 920 and to skin 911. The frame splices 913 using stub frames 913-1 to butt splice 1201 frame 912, 912-1 from an upper half barrel section 316-2 to lower half barrel section 314-2, respectively. The use of stub frames 913-1 as part of a frame splice 913 enables the frames 912, 912-1 installed into the upper half barrel section 316-2 and lower half barrel section 314-2 to not extend all the way to boundary 1032 (FIG. 10) and boundary 1132 (FIG. 11) facilitating clearance for splice plate 920. The stub frame 913-1 bridges across splice plate 920 to join frame 912 to frame 912-1. Therefore, the order of assembly is install splice plate 920 before installing stub frame 913-1.

The frames 912, 912-1 of the upper half barrel section 316-2 and lower half barrel section 314-2 terminate in the splice zone 914 prior to the frame splices 913 to facilitate placement of splice plate 920. The frame splices 913 are installed on the IML 918 of the upper half barrel section 316-2 and lower section 314-2 and then the stub frames 913-1 are installed to connect/splice together the frames 912, 912-1 of the upper half barrel section 316-2 to the lower half barrel section 314-2 and span the splice zone 914. A further benefit of terminating the frames 912, 912-1 of the upper half barrel section 316-2 and lower half barrel section 314-2 prior to the frame splices 913 in the splice zone 914 facilitates movement of the half barrel sections along a track 112-1 prior to splicing and joining at the join station 342. Splice plates 597, 920, 920-1 are installed in splice zones 914 to couple the skin 911, 911-1 of upper half barrel section 316-2 to lower half barrel section 314-2 together, respectively. Furthermore, splice plates 597, 920, 920-1 are designed to occupy an entire length of upper half barrel section 316-2 and lower half barrel section 314-2, or some fraction thereof. A splice plate 597, 920, 920-1 can be installed onto either upper half barrel section 316-2 or lower half barrel section 314-2 before either enters assembly stage 320, 330 for joining, respectively.

In a further embodiment, a splice plate 597, 920, 920-1 at an IML 918 operates as a longitudinally running stringer (not shown) to couple to the skin 911 of upper half barrel section 316-2 to the skin 911 of the lower half barrel section 314-2. In such an embodiment, skin 911 of upper half barrel section 316-2 abuts the skin 911-1 of the lower half barrel section 314-2. In a further embodiment, the skin 911 of upper half barrel section 316-2 and the skin 911-1 of lower half barrel section 314-2 overlap as part of a lap splice. In one embodiment, the frame splices 913 are nested (not shown) in the frames 912, 912-1 or vice versa relative to flanges (not shown) and webs (not shown) of the frames 912, 912-1. Stated another way, each frame 912 will be spliced to a corresponding frame 912-1. In another embodiment, the upper half barrel section 316-2 and the lower half barrel section 314-2 comprise frames 912 and 912-1. Frames 912 and 912-1 are formed of multiple spliced together frame segments 912-5, 912-6 and frame segments 912-3, 912-4, respectively. Typically there are multiple frame segments 912-3, 912-4, 912-5, 912-6 that each form a ninety or sixty degree arc or some other arc length that when spliced together form a roughly 180 degree frame 912-1, 912 arc, respectively. In still further example, there are multiple frames 912, 912-1 that nest within a frame splice 913 that spans from the upper half barrel section 316-1 to the lower half barrel section 314-2.

In this example, other components such as electrical 930, insulation 950, and plumbing 960 are also found in upper half barrel section 316-2 and/or lower half barrel section 314-2 and/or even partially within splice zone 914. An upper door surround 940-1 is joined to lower door surround 940-2 by door surround splice 940 that spans or lies within the splice zones 914. An upper window surround 970-1 is joined to lower window surround 970-2 by window surround splice 970 that spans or lies within the splice zones 914. Window manufacturing excess 970-9 and door manufacturing excess 940-9 is trimmed off prior to or in the preferred alternative after window surround 970-1, 970-2 and door surround 940-1, 940-2 installation. An upper electrical 930-1 is joined to a lower electrical component 930-2 by electrical component splice 930 that spans or lies within the splice zones 914. An upper plumbing components 960-2 is joined to a lower plumbing component 960-2 by plumbing component 960 that spans or at least partially lies within the splice zones 914. The plumbing component can be hydraulic (water or hydraulic fluid) and/or pneumatic as a matter of design choice.

The various arrangements of splice components discussed herein may be utilized in a fixed cell at a full pulse 118-4 or may be part of a line advancing via micro pulse 129, 129-1, 129-2, 129-3, 129-4 or continuous line with stations performing work on the full barrel section 340 as the upper half barrel section 316-2 and lower half barrel section 314-2 is pulsed through it.

Figure 10A:
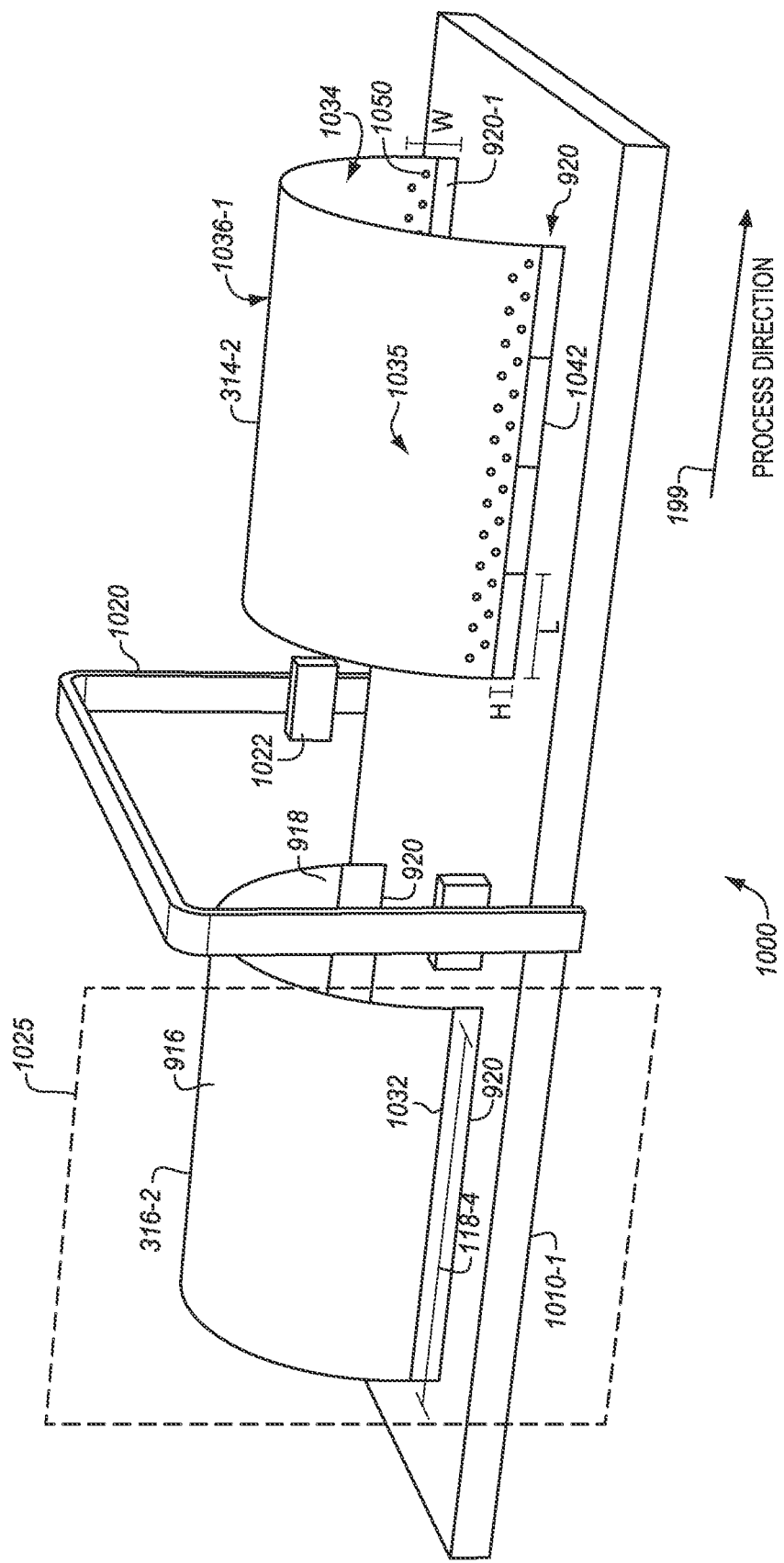
FIGS. 10A through 10C depict illustrative embodiment of assembly line processes for joining first and second half barrel sections with a splice plate.

FIGS. 10-12 illustrate installation of a splice plate 597, 920, 920-1 and joining of upper half barrel section 316 to lower half barrel section 314 in an illustrative embodiment of a splice installation system advancing in a micro pulse 129 or full pulse advancement. In FIG. 10A, an assembly line 1000 includes a track 1010 illustrated to transport the upper half barrel sections 316 and/or lower half barrel section 314 having lower boundary 1032 in a process direction 199. In this example, the assembly line 1000 maybe a standalone system or more likely is part of assembly line 110, 120, 310 and work station 1020 corresponding to work station 114, 124. A work station 1020 includes end effectors 1022 and/or tooling that align splice segment 1042 of a splice plate 597, 920, 920-1 with the lower boundary 1032. The work station 1020 installs fasteners 1050 through the splice plate 597, 920, 920-1 or splice segments 1042 along with the upper half barrel section 316 and/or the lower half barrel section 314 on which it is installed. Specifically, in an initial portion 1025 of this aspect of the assembly line 1000, the work station 1020 installs the splice plate 597, 920, 920-1 or splice segments 1042 on each IML 1034 at lower boundary 1032 defined by the upper half barrel section 316 and/or upper boundary of lower half barrel section 314. The segments 1042 have a length L. The splice plate 597, 920, 920-1 or segments 1042 have a height that protrudes by a distance H from the lower boundary 1032 of the upper half barrel sections 316 and/or lower half barrel section 314-2. The distance H is roughly equal to half a width W of the splice plate 597, 920, 920-1 or segments 1042. During installation, the splice plate 597, 920, 920-1 is held in contact with an IML 918 of the upper half barrel sections 316-2. After installation, a height of the track 1010 may be altered by the distance H, such that an uppermost point of the upper half barrel sections 316 or uppermost point of the lower half barrel sections 314 remains constant throughout the assembly line 1000. In a further example not illustrated, the splice plates 920-1 are on the OML 916 side only or on the IML 918 and the OML 916 side on opposite upper boundary 1132 or lower boundaries 1032. Any of these configurations are possible via operations of end effector 1022 of the work station 1020. Work station 1020 is capable installing the splice plate 920 or segments 1042 on the lower half barrel section 314 and upper half barrel sections 316 and in succession and in that order and then skipping a succeeding lower half barrel section 314 and upper half barrel sections 316 to which the proceeding corresponding section will be joined. Splice plate 920-1 is an OML 916 mounted version of the IML 918 mounted splice plate 920. Upper half barrel sections 316 or lower half barrel sections 314 have one of splice plate 920 or splice plate 920-1 or segments 1042 along each lower boundary 1032 or each upper boundary 1132. A non-illustrated example has upper half barrel section 316 or lower half barrel section 314 comprising splice plate 920 and splice plate 920-1 or segments 1042 or a combination of splice plate 920 or splice plate 920-1 and segments 1042 sandwiching each upper boundary 1132 or each lower boundary 1032.

Figure 10B:
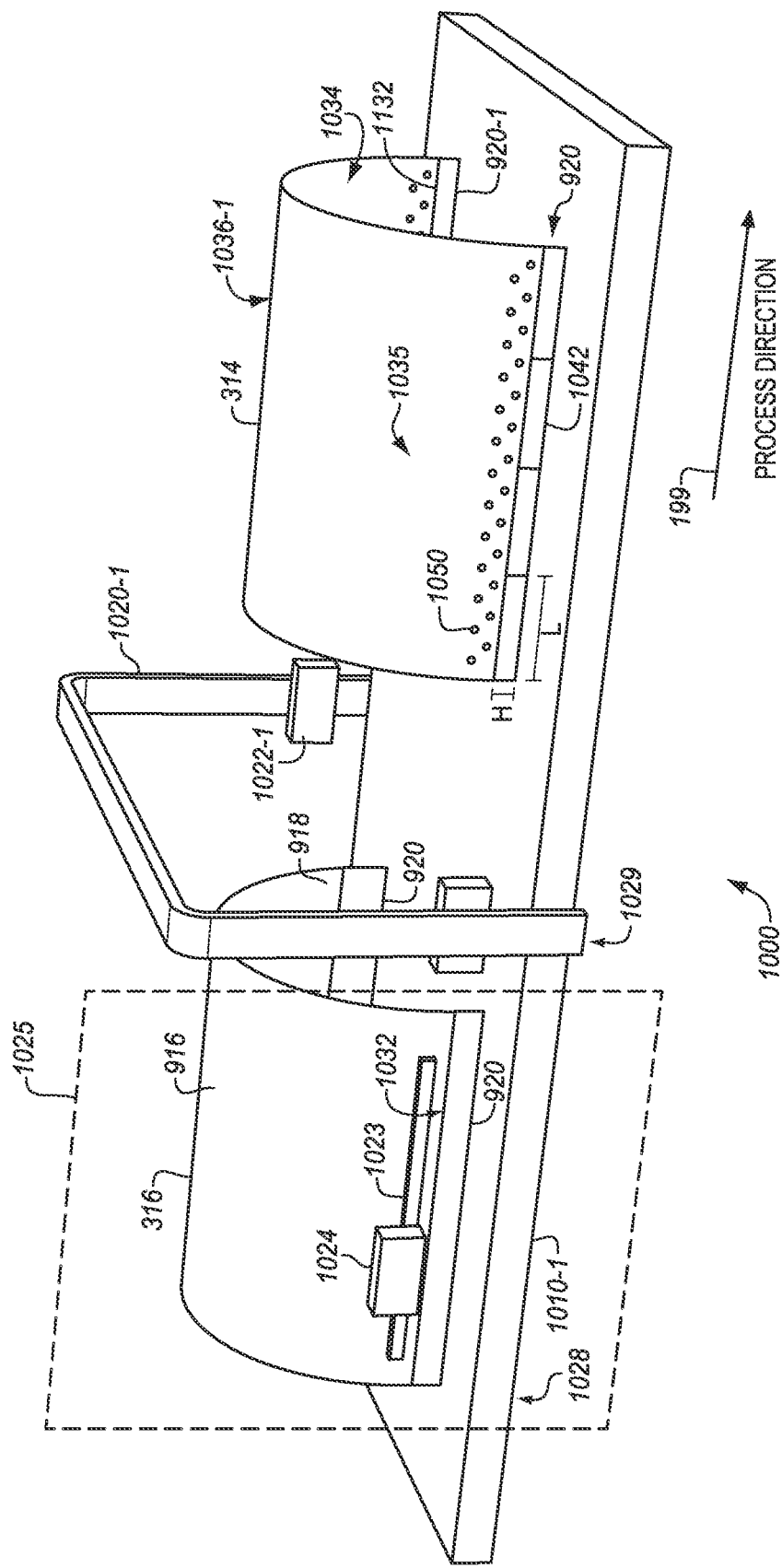

In another example in FIG. 10B, an assembly line 1000-1 includes a track 1010-1 illustrated to transport the upper half barrel sections 316 and/or lower half barrel section 314 having lower boundary 1032 and/or upper boundary 1132, respectively in a process direction 199. End effectors 1022 removably place flex track devices 1024 upon upper half barrel sections 316 and/or to lower half barrel section 314 at placement point 1028. The work station 1020 then locates for a pick up point 1029 and waits to remove the flex track device 1024 from the upper half barrel sections 316 and/or to lower half barrel section 314 after the splice plate 920 or segments 1042 are installed. The work station 1020-1 then carries the flex track devices 1024 to the placement point 1028 and awaits placement upon the next upper half barrel sections 316 and/or to lower half barrel section 314 needing splice plate 920, 920-1 or segments 1042 installation. The work station 1020-1 moves between placement point 1028 and pick up point 1029 along track 1010. In this example, the assembly line 1000-1 maybe a standalone system or more likely is part of assembly line 110, 120, 310 and work station 1020-1 corresponding to work station 114, 124. The flex track device 1024 follow a track 1023 removably installed onto the upper half barrel sections 316 or to lower half barrel section 314 and install splice plates 920 or segments 1042 while other work is being performed by work stations 114, 124 in either assembly line 110, 120, 310. Upper half barrel sections 316 or lower half barrel sections 314 have one of splice plate 920 or splice plate 920-1 or segments 1042 along each lower boundary 1032 or each upper boundary 1132. A non-illustrated example has upper half barrel section 316 or lower half barrel section 314 comprising splice plate 920 and splice plate 920-1 or segments 1042 or a combination of splice plate 920 or splice plate 920-1 and segments 1042 sandwiching each upper boundary 1132 or each lower boundary 1032. Another example has flex track 1024 placed and removed manually either with an assist from work station 1020-1 or fully manually without any mechanical assistance.

Figure 10C:
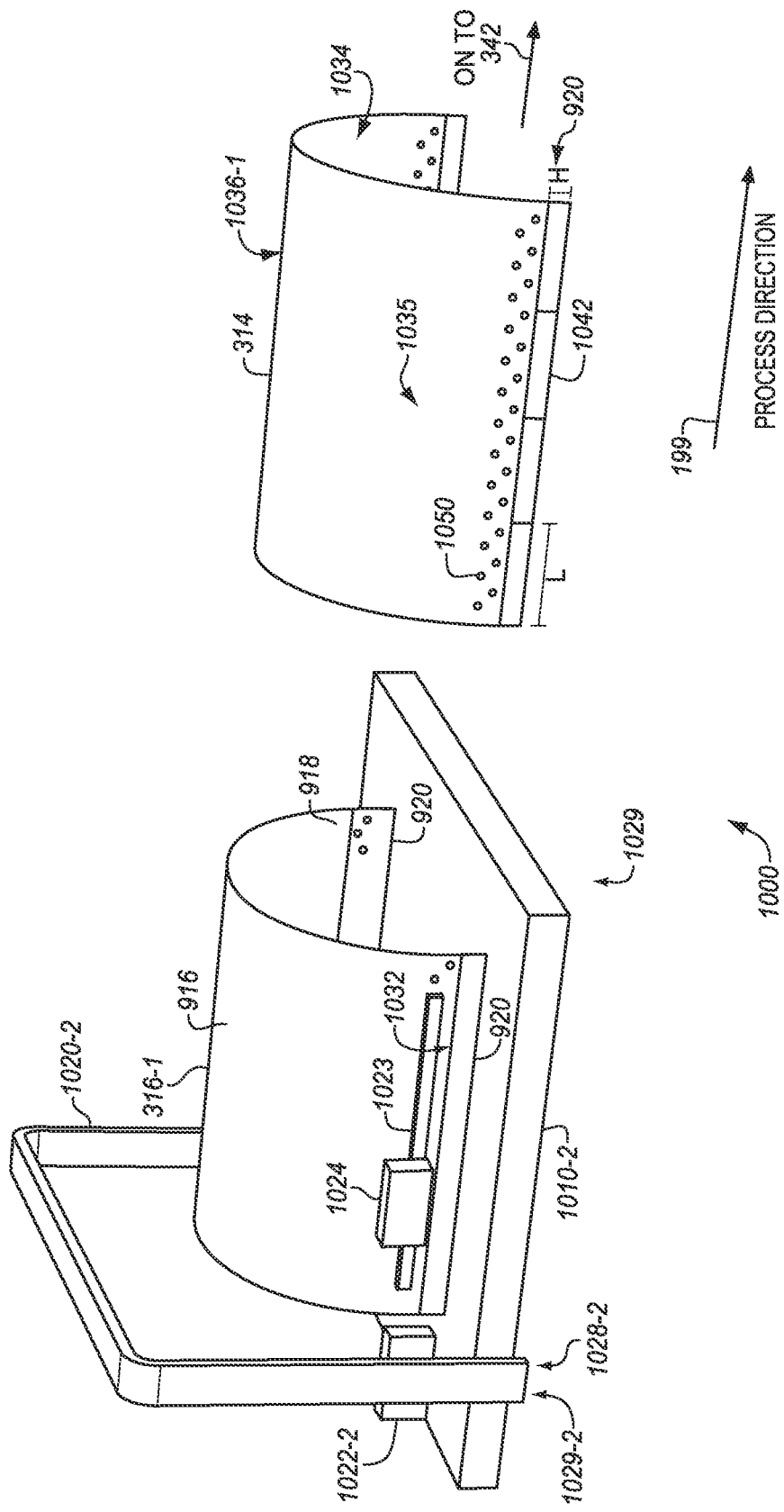

In a further example in FIG. 10C, an assembly line 1000-2 includes a track 1010-2 illustrated to hold the upper half barrel sections 316-1 and/or lower half barrel section 314-1 having lower boundary 1032 and/or upper boundary 1132, respectively prior to advancing in a process direction 199. End effectors 1022-2 removably place flex track devices 1024 upon upper half barrel sections 316 and/or to lower half barrel section 314-1. The work station 1020-2 is part of assembly stage 320 for upper half barrel section 316-1 and/or assembly stage 330 lower half barrel section 314-1 in a full pulse scenario. The work station 1020-2 does not advance after placement of flex track devices 1024. The pickup point 1029-2 coincides with placement point 1028-2. Work station 1020-2 waits to remove the flex track device 1024 from the upper half barrel sections 316-1 and/or lower half barrel section 314-1 of a non-illustrated example after the splice plate 920, 920-1 and/or segments 1042 are installed. The work station 1020-2 then retrieves and holds the flex track devices 1024 and awaits placement upon the next upper half barrel sections 316-1 and/or to lower half barrel section 314-1 needing splice plate 920 or segments 1042 installation. Splice plate 920-1 is an OML 916 mounted version of the IML 918 mounted splice plate 920. Splice plate 920, 920-1 and/or segments 1042 are capable of flex track device 1024 installation. The flex track device 1024 follow a track 1023 removably installed onto the upper half barrel sections 316-1 or to lower half barrel section 314-1 and install splice plates 920, 920-1 or segments 1042 while other work is being performed, such as in assembly stage 320 and/or assembly stage 330. The end effectors 1022-2 removably place flex track devices 1024 upon upper half barrel sections 316-1 and/or lower half barrel section 314-1 and then remove it when work is completed. The flex track devices 1024 are conveyed by the work station 1020-2 and placed onto the lower half barrel sections 314-1 and install splice plates 920, 920-1 or segments 1042 while a cargo floor grid 365-2 and passenger floor grid 365-1 is being installed in assembly stage 320. Likewise, in another example, the flex track devices 1024 are conveyed by the work station 1020-2 and placed onto the upper half barrel sections 316-1 and install splice plates 920, 920-1 or segments 1042 while a crown module 364-1 is being installed in assembly stage 330. An example has splice plate 920, 920-1 or segments 1042 on one boundary 1032 of lower half barrel section 314-1 and a corresponding splice plate 920 or segments 1042 on one boundary 1132 or upper half barrel section 316-1 or an opposite boundary 1132. Another example has flex track 1024-1 placed and removed manually either with an assist from work station 1020-2 or fully manually without any mechanical assistance.

FIG. 11A is an end view of an upper half barrel section 316-2 awaiting joining to a lower half barrel section 314-2, and corresponds with FIG. 12 prior to bringing upper half barrel section 316-2 and lower half barrel section 314-2 into a butt splice 1201. According to FIG. 11A, the splice plate 920 preferably includes a contour 1110 that contacts an IML 1034 of the upper half barrel section 314-2, and an IML 1134 of the lower section 1130. The splice plate 920 is not illustrated to scale relative to upper half barrel section 316-2 and has an exaggerated curvature and taper. The splice plate 920 is held in place at the upper half barrel section 1030 via fasteners 1050. An embodiment has the splice plate finally fastened to the upper half barrel section 316-2, but another embodiment has the splice plate 920 tack fastened into place. Yet another embodiment, similar to the upper half barrel section 316-2 but not illustrated, has the splice plate 920 finally fastened to the lower half barrel section 314-2. Yet another example has the splice plate 920 tack fastened into place on either the upper half barrel section 316-2 or the lower half barrel section 314-2. The lower half barrel section 314-2 is held in a cradle 1150. The finally fastened or tack fastened splice plate 920, 920-1 or segments 1042 also facilitates alignment to the upper half barrel section 314-2 with the lower half barrel section 316-2 is in a desired contour, at least at a butt point 1160. Therefore, relative to the upper half barrel section 316-2 and the lower half barrel section 314-2, the desired contour is carried through the butt point 1160 during splicing with the splice plate 920. Cradle 1150 mechanically supports the lower half barrel section 314-2.

Another example has the splice plate 920 or segments 1042 coupled to the upper half barrel section 316-2 and lower half barrel section 314-2 in join station 342 only as shown in FIG. 11B. FIG. 11B is an end view of an upper half barrel section 316-2 awaiting joining to a lower half barrel section 314-2, and corresponds with FIG. 12 view, but just prior to bringing upper half barrel section 316-2 and lower half barrel section 314-2 into a butt splice 1201. According to FIG. 11B, the splice plate 920 includes a contour 1110 that contacts an IML 1034 of the upper half barrel section 314-2, and an IML 1134 of the lower section 1130. In the illustrated example, the splice plate 920 splices the upper half barrel section 314-2 to the upper half barrel section 316-2. The splice plate 920 is not illustrated to scale relative to upper half barrel section 316-2. Another example has the splice plate 920 tack fastened into place when lower boundary and upper boundary are butted together. The splice plate is fully installed in join station 342. The lower half barrel section 314-2 is held in a cradle 1150. The splice plate 920 also facilitates alignment with upper half barrel section 314-2 while ensuring that the upper half barrel section 314-2 and upper half barrel section 316-2 is in desired contour through the butt point 1160 during splicing of the splice plate 920 into place, as a part of joining. Cradle 1150 mechanically supports the lower section 1130.

In further embodiments, an upper cradle (not shown) is used together with the cradle 1150. The cradle 1150 also facilitates longitudinal rotation of lower half barrel section 314-2 prior to join with upper half barrel section 316-2. The cradle 1150 is therefore used for both rotation and joining. The upper cradle (not shown) and cradle 1150 are indexed to each other via complementary cup and cone or similar systems mounted upon the cradles. That is, one cradle utilizes cups while the other uses complementary cones, at a plurality of locations. The cradles are dimensioned to provide enough clearance from the splice zone 914 to permit the butt splice 1201 to be fabricated. The clearance is located on the OML and the IML. The clearance therefore permits splice plate 920 install, frame splices 913, window/door surround splices 940, 970, and the other splices discussed above.

In FIG. 12, is a view taken from FIG. 1A. The upper section has been placed into a butt splice arrangement such that upper boundary 1032 of lower half barrel section 314-2 contacts a lower boundary 1132 of upper half barrel section 316-2. Fasteners 1210 have been installed to complete joining of the upper half barrel section 316-2 and the lower half barrel section 314-2, resulting in a full barrel section 1200 with a resulting outer aesthetic appearance formed as an arrangement of a joining longitudinal line in combination with an arrangement of fasteners on each side of the line. An embodiment has join station 342 attach the splice plate 920 by installing fasteners through the splice plate 920 while the splice plate 920 contacts an IML 1034 of the upper half barrel section 316-2 and an IML 1134 of the lower half barrel section 314-2. The splice plate 920 could be installed upon either the upper half barrel section 316-2 or the lower half barrel section 314-2 prior to the join station 342. Also the splice plate 920 could be installed upon either the OML 1035 or the IML 1034 or both after entering join station 342. An example has the splice plate 920 installed as part of the upper half barrel section 316-2 in assembly line 120 or alternatively installed upon the lower half barrel section 314-2. The splice plate 920 is shown with an exaggerated curved structure to match an exaggeratedly small radius of the full barrel section 1200.

FIG. 12 shows two examples of splice plate 920 installation apparatus. The flex track device 1024-2 follow two tracks 1023-2 with one removably installed onto the upper half barrel section 316-2 and the other onto lower half barrel section 314-2. Flex track 1024-2 install fasteners 1210 to complete installation of splice plates 920 or segments 1042 while other work is being performed by join station 342, 342-1. The flex track device 1024-2 follow two tracks 1023-2 using coupler 1033.

FIG. 12 also shows a second example of splice plate 920 installation apparatus. A fastener installation end effector 1224 is attached to a robot 1223. The robot 1223 is envisioned as a gantry style or a robot arm type or some other suitable device. The robot 1223 positions the end effector 1224 where needed to install all fasteners 1210 needed for installation of splice plate 920 and/or segments 1042 onto the upper half barrel section 316-2 and onto lower half barrel section 314-2. Fastener installation end effector 1224 installs fasteners 1210 to complete installation of splice plates 920 or segments 1042 while other work is being performed by join station 342, 342-1.

While both the flex track device 1024-2 and the fastener installation end effector 1224 are shown in FIG. 12 working in one join station 342, 342-1, it is likely that the join station 342, 342-1 would form both butt splice 1201 using one of the former on each butt splice 1201 or one of the later on each butt splice 1201. The advantage of using the flex track device 1024-2 is that it is a mature technology that often needs less station specific infrastructure to form butt splice 1201. Another example has flex track 1024-2 placed and removed manually either with an assist from a work station similar to 1020-1 or fully manually without any mechanical assistance.

Figure 13:
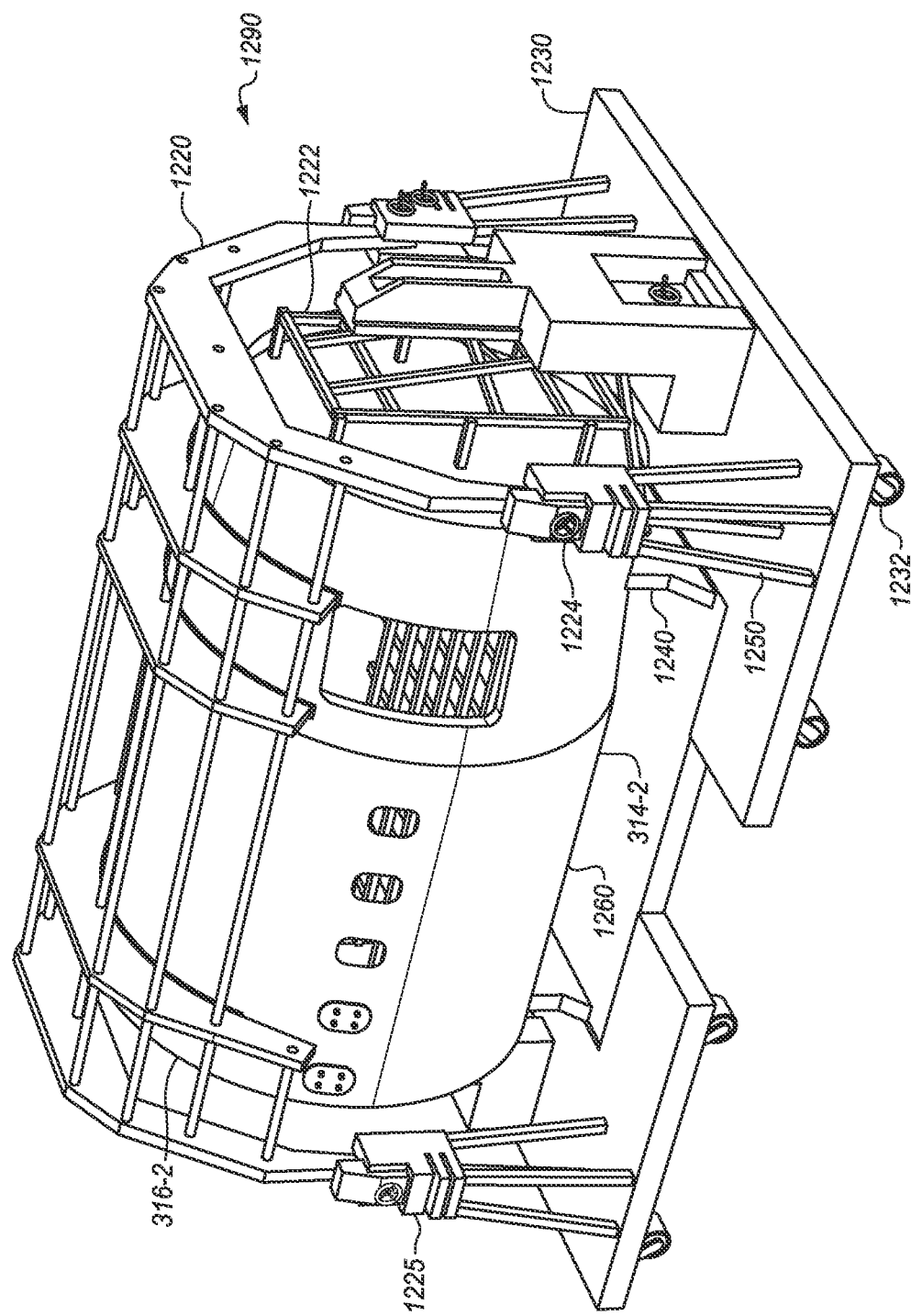
FIG. 13 illustrates a transport mechanism to carry a section of the fuselage formed as joined upper and lower half barrel sections.

FIG. 13 depicts a transport mechanism 1290 for a completed full barrel section 1260. According to FIG. 13, the transport mechanism 1290 includes an upper cradle 1220 including a frame 1222, and a lower cart 1230 that includes a cradle 1240 as well as supports 1250 which attach to the upper cradle 1220. Wheels 1232 facilitate movement of the transport mechanism 1290, and the transport mechanism 1290 may transport the full barrel section 1260 to any desired further assembly stations and/or cells. Transport of transport mechanism 1290 is also facilitated by a combination of crane type lifting devices and/or wheels 1232. Upper cradle 1220 is aligned with cradle 1240 with a type of indexing system like cup and cone. The cup or cone is coupled to the cradle 1220 and mate with a corresponding cone or cup 1225 coupled to cradle 1240.

Figure 14:
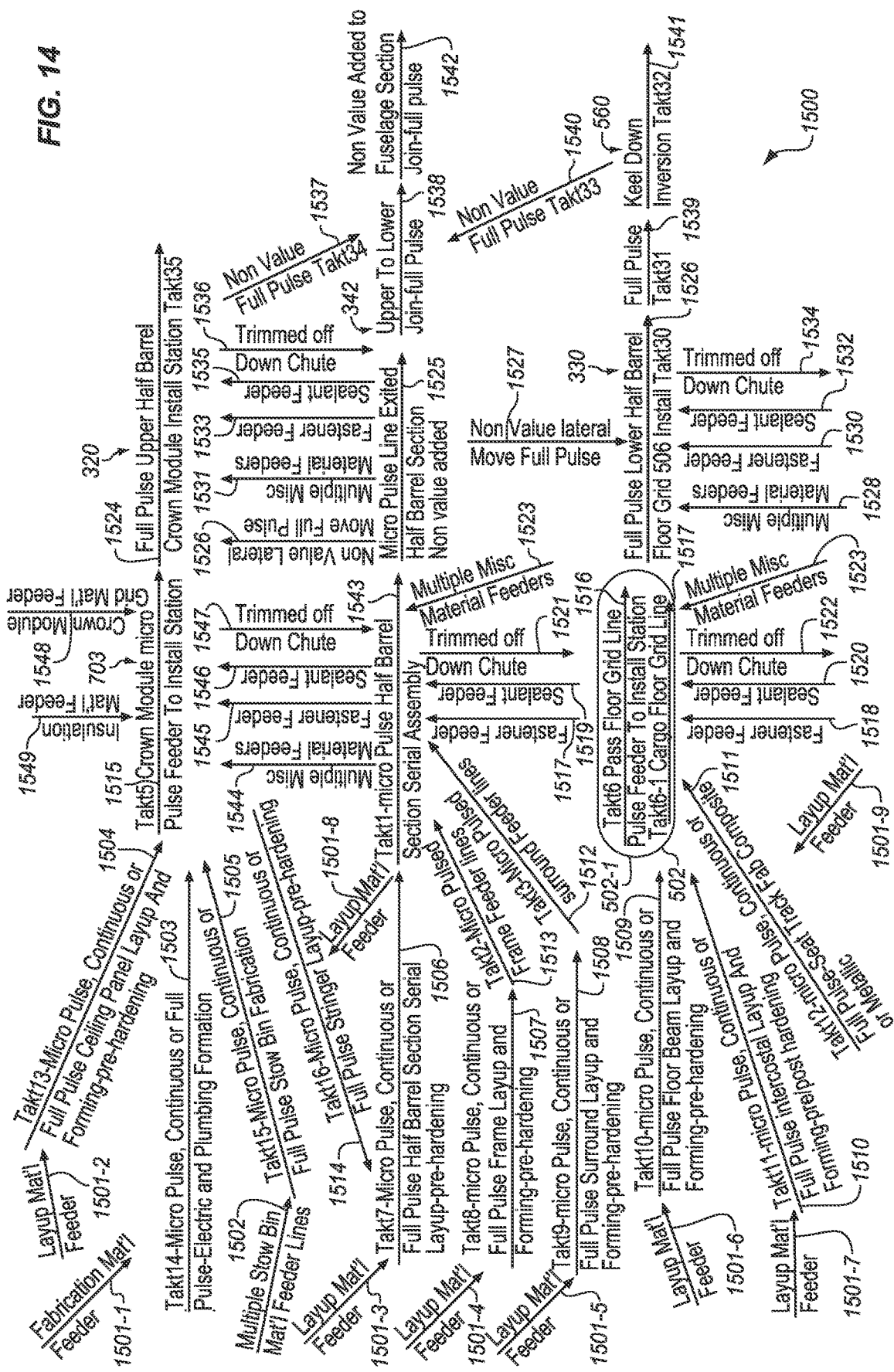
FIG. 14 is a flow diagram illustrating feeder lines in an illustrative embodiment.

FIG. 14 is a flow diagram illustrating a schema 1500 for feeder lines in an illustrative embodiment. FIG. 14 provides a detailed illustration of fuselage fabrication pertaining to feeder lines and takt times. All of the feeder lines from layup material feeder lines through fuselage join operations are depicted. In addition, each line referenced is performed according to a desired takt time related to the takt times of the components that it feeds into and into which it feeds. The arrow represents the feeder line process direction for each. The feeder lines can operate as micro pulse, full pulse, and/or continuous lines with the fabrication process proceeding from left to right with JIT delivery at the next line upstream with just the right part delivered to a work station. The takt for each of these feeder lines, operated in order to micro pulse or full pulse components 170, can be the same or different or a multiple of fraction of a takt time for the line feeding into it or into which it feeds. In one embodiment, the takt time is constant for each illustrated feeder line.

In a further embodiment, it is possible to skip or perform work at all work stations 114 for the line based upon a work statement and a desired takt time for the entire line and the lines into which it feeds. Takt time is considered to be a number of minutes per month, divided by a number of desired units (e.g., of aircraft, stringers, frames, etc.) per month. The sum of micro-pulse takt times equals a pulse of takt time as a micro pulse is a fraction of the length of component 170 while a pulse is the length of component 170. That is, a plurality of micro-pulses equal a full pulse as component 170 advances through assembly line 110, 120, 310.

As specifically depicted in FIG. 14, a feeder line 1501-1 feeds fabrication material to a feeder line 1503 for electrical and plumbing formation at a takt14 in a full pulse, continuous or micro pulse line. A feeder line 1501-2 feeds layup material to a feeder line 1504 for ceiling panel layup in a full pulse, continuous or micro pulse line at a takt13. A feeder line 1501-3 provides layup material to a feeder line 1506 for fabricating a half barrel section preform at takt7. The feeder line 1506 also receives stringer preforms fabricated via a feeder line 1514 at a takt16, which is itself fed layup materials by a feeder line 1501-8. A feeder line 1501-4 provides layup material to a feeder line 1507 for frame preform layup and forming at takt 8. The end of the frame feeder line 1507 is at a work station 114, 124, 312. The frame feeder line 1507 corresponds to 149, 149-1, 359. The feeder line 1507 has a takt8 that is sufficient to deliver two 90 degree frames to the work station 114, 124, 312 during a micro pulse 129 through those work stations. The number of frames needed per micro pulse 129 would establish relative takt times for the feeder line 1508 relative to assembly line 110, 120, 310. Breaking the assembly process into many assembly/feeder lines allows more parallel processing which makes the monitoring the pace of production of each line and therefore delivered part, easier to track. The frame feeder line 1507 feeding frames into work stations 114, 124, 312 is an example of how relative takt times for the many feeder and assembly lines are established. This system makes it easier to spot deficiencies within the manufacturing process in real time.

A feeder line 1501-5 provides layup material to a feeder line 1508 for window and door surround preforms at a takt9.

A feeder line 1501-6 provides layup material to a feeder line 1509 for floor beams preforms at a takt10. A feeder line 1501-7 provides layup material for a feeder line 1510 for intercostal preforms advancing at a takt11. A feeder line 1501-9 provides layup material for another feeder line 1511 for intercostals at a takt12. Another feeder line 1502 provides stow bin materials to a feeder line 1505 for fabricating stow bins at a takt15.

Ceiling panels are fed to feeder line 1515 via feeder lines 1504 at a takt13. Electric and plumbing system formation are fed to feeder line 1515 via feeder lines 1503 at takt14. Feeder line 1515 receives material from feeder line 1544, fasteners from feeder line 1545, sealant from feeder line 1546, and removes trimmed off material via outflow 1547, crown module grid material feeder 1548 and insulation material feeder 1549. Feeder line 1515 provides completed Crown modules 364 to feeder line 1524 which corresponds to assembly stage 320. Upper half barrel section 316-2 laterally proceeds along path 398-14, in a non-value added lateral move from feeder line 1526. Feeder line 1524 receives material from feeder line 1531, fasteners from feeder line 1533, and sealant from feeder line 1535, and removes trimmed off material via outflow 1536. This results in a crown module which is provided, via non-value added feeder line 1537, to a feeder line 1538 for joining station 342. Feeder line Frames are provided to a feeder line 1513 from feeder line 1507, and surrounds are provided from feeder line 1508 to a work station on feeder line 1512. Feeder lines 1513, 1512, and 1506 feed a feeder line 1543. Feeder line 1543 receives fasteners from feeder line 1517, and sealant from feeder line 1519, and removes trimmed off material via outflow 1521. Additional miscellaneous materials are provided via feeder line 1523. This results in sections of fuselage provided to feeder line 1525, which provides components to feeder line 1538 and feeder line 1527. Components at feeder line 1538 are provided to feeder line 1542.

Feeder lines 1509, 1510, and 1511 provide materials to feeder line 1516 for a floor grid. Feeder lines 1509 and 1510 correspond to on feeder lines 519-1, 519-2, 519-3, 519-11, 519-21, 519-31, respectively, delivering floor beams 511 and intercostals 513 for Just in Time (JIT) delivery of just the right part to work stations 504-11, 504-12, 504-13, 504-1, 504-2, 504-3 for assembly into cargo floor 365-2, 509, 509-1 passenger floor grid 365-1, 508, 508-1, respectively. The passenger floor grid 365-1, 508, 508-1 and cargo floor grid 356-2, 509, 509-1 are advanced by micro-pulse 129-1 at a takt6 and takt6-1 through assembly work stations 504-1 through 504-7 and 504-11 through 504-17, respectively. Feeder line 1516 receives material from feeder line 1523, fasteners from feeder line 1518, sealant from feeder line 1520, and removes trimmed off material via outflow 1522. The passenger floor grid 365-1, 508, 508-1 and cargo floor grid 356-2, 509, 509-1 are advanced to feeder line 1526. Feeder line 1526 receives material from feeder line 1528, fasteners from feeder line 1530, and sealant from feeder line 1532, and removes trimmed off material via outflow 1534. After installation of passenger floor grid 365-1, 508, 508-1 and cargo floor grid 356-2, 509, 509-1, lower half barrel section 314-1 advances in non-value added feeder line 1539 advances lower half barrel section 314-1 to inversion station 560 where inversion occurs at feeder line 1541. Feeder line 1541 corresponds to inversion station 560, which provides components to feeder line 1540 for use at feeder line 1538 which corresponds to join station 342. Takt30 plus takt31 plus takt32 plus takt33 of feeder line 1526, 1539, 1541, 1540 is equal to twice takt35 plus takt34 of feeder lines 1524 and 1537. This is reflective of the difference roughly twice as much time in assembly stage 330 compared to assembly stage 320.

Figure 15:
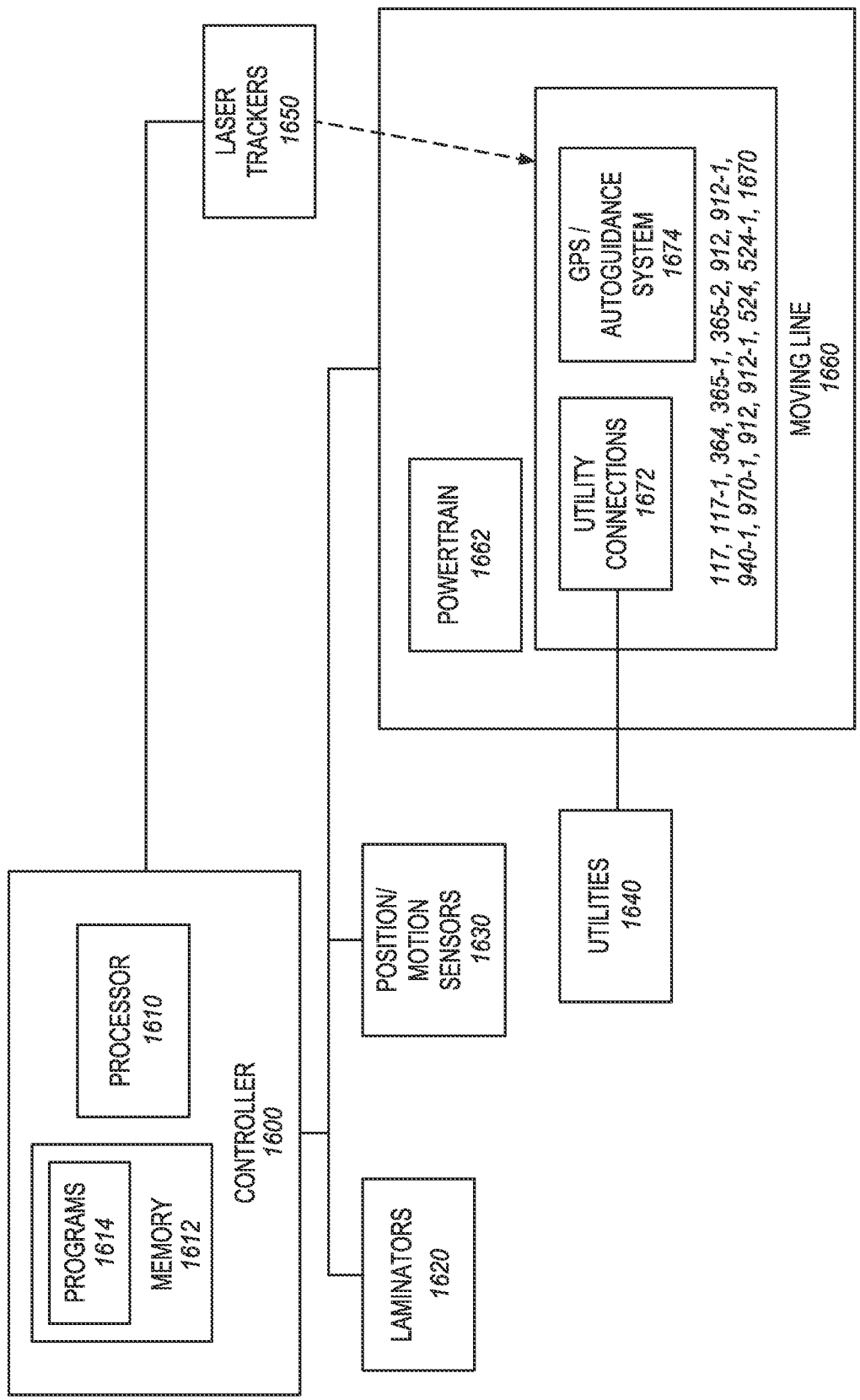
FIG. 15 illustrates control components of a production system in an illustrative embodiment.

Attention is now directed to FIG. 15, which broadly illustrates control components of a production system that performs continuous manufacturing. A controller 1600 coordinates and controls operation of work stations 1620 (corresponds to work stations 114, 124, 312, 504-1 through 504-7 and 504-11 through 504-17 and 704-1 through 704-7 and movement of one or more half barrel sections 117, 117-1, crown module 364, passenger floor grid 365-1 and cargo floor grid 365-2 or subcomponents like frames 912, 912-1, window surrounds 970-1, door surrounds 940-1, floor beams 502-7, intercostals 502-8 or mobile platforms 1670 carrying components 170-1, 170-2 or passenger floor grid 365-1 and cargo floor grid 365-2 or subcomponents like frames 912, 912-1, window surrounds 970-1, door surrounds 940-1, floor beams 502-7, intercostals 502-8) along a moving line 1660 having a powertrain 1662. The controller 1600 may comprise a processor 1610 which is coupled with a memory 1612 that stores programs 1614. In one example, the mobile platforms 1670 are driven along a moving line 1660 that is driven continuously by the powertrain 1662, which is controlled by the controller 1600. In this example, the mobile platform 1670 includes utility connections 1672 which may include electrical, pneumatic and/or hydraulic quick disconnects that couple the mobile platform 1670 with externally sourced utilities 1640. In other examples, as previously mentioned, the mobile platforms 1670 comprise Automated Guided Vehicles (AGVs) that include on board utilities, as well as a GPS/auto guidance system 1674. Mobile platforms 1670 also include some or all of the indexing systems, bar codes and RFID systems previously discussed. In still further examples, the movement of the mobile platforms 1670 is controlled using laser trackers 1650. Trackers 1650 use indexing units, bar code readers or RFID readers. Position and/or motion sensors 1630 coupled with the controller 1600 are used to determine the position of the mobile platforms 1670 as well as the powertrain 1662.

Figure 16:
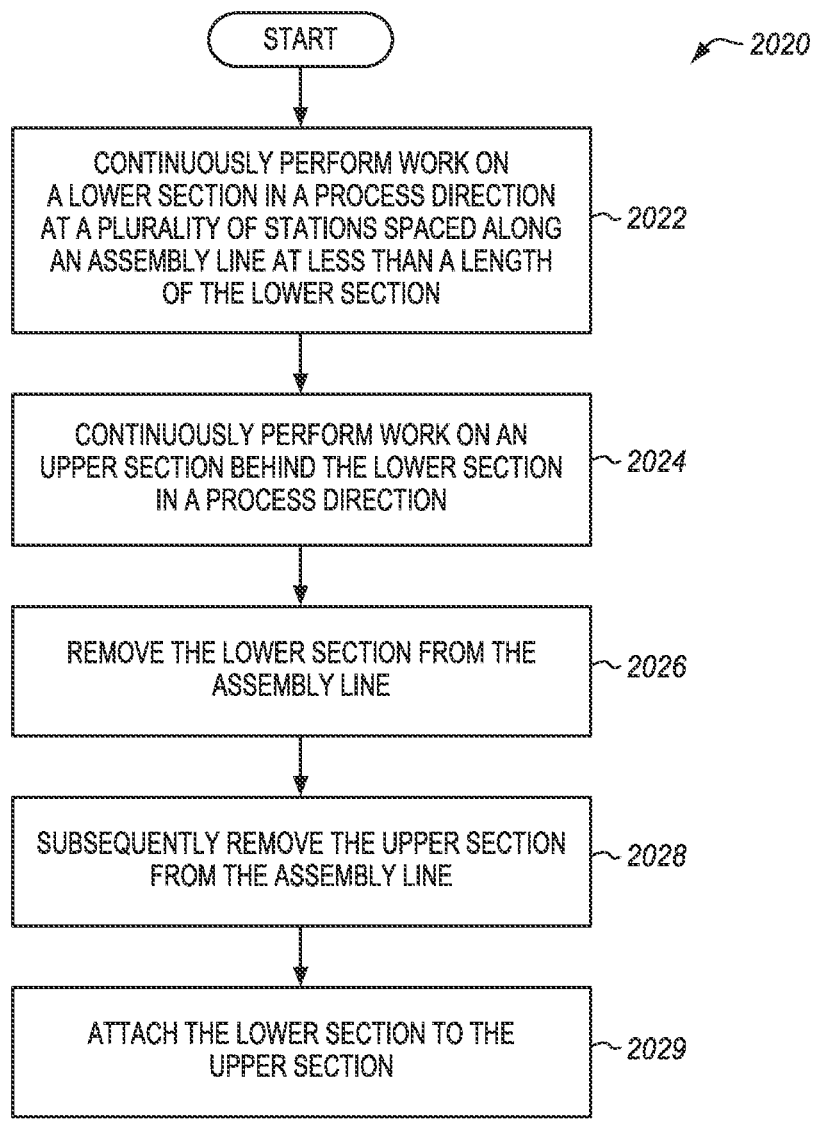
FIG. 16 is a flowchart illustrating methods of fabricating portions of an airframe in illustrative embodiments.

FIG. 16 is a flowchart illustrating methods of fabricating portions of an airframe (e.g., full barrel sections) in illustrative embodiments. Method 2020 of FIG. 16 includes continuously performing work on a lower half barrel section 118 in a process direction 199 at a plurality of work stations 114 spaced along an assembly line 110 at less than a length of the lower half barrel section 118 in step 2022. The method further comprises continuously performing work on an upper half barrel section 116 behind the lower half barrel section 118 in the process direction in step 2024. Step 2026 includes removing the lower half barrel section 118 from the assembly line 110. Step 2028 includes subsequently removing the upper half barrel section 116 from the assembly line 110. Step 2029 includes attaching the lower half barrel section 118 to the upper half barrel section 116.

Examples

Figure 17:
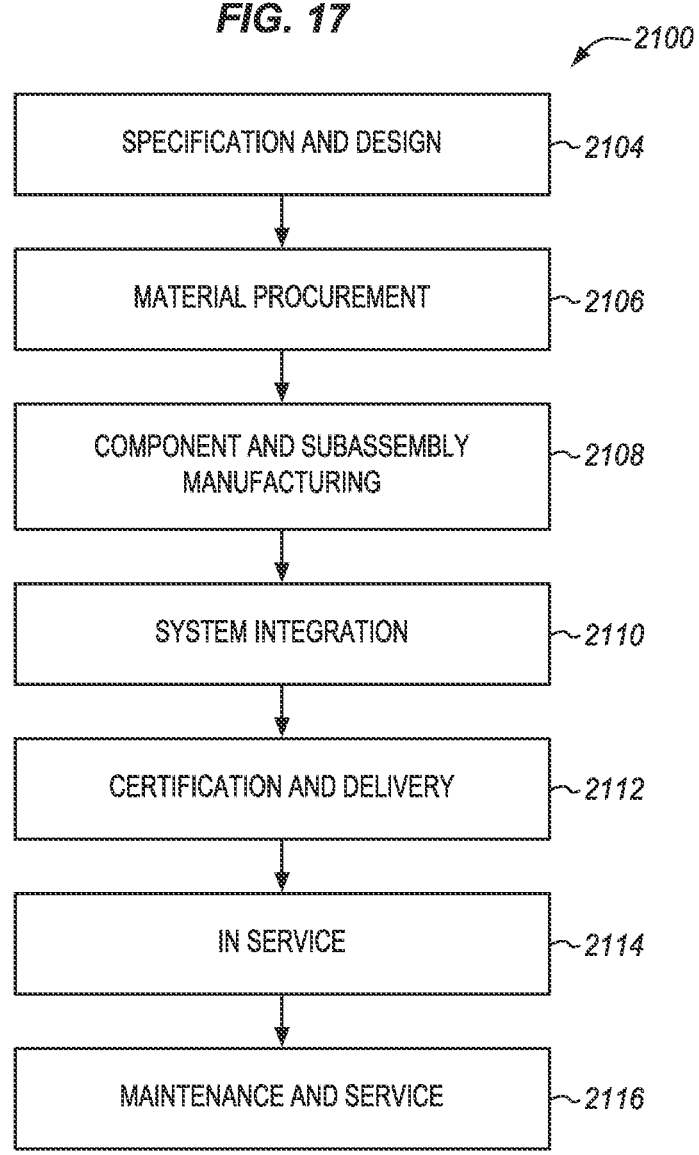
FIG. 17 is a flow diagram of aircraft production and service methodology in an illustrative embodiment.
Figure 18:
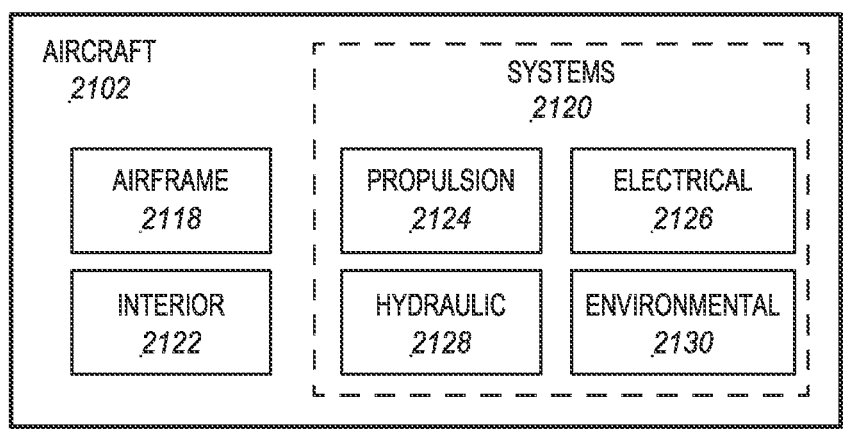
FIG. 18 is a block diagram of an aircraft in an illustrative embodiment.
Figure 19:
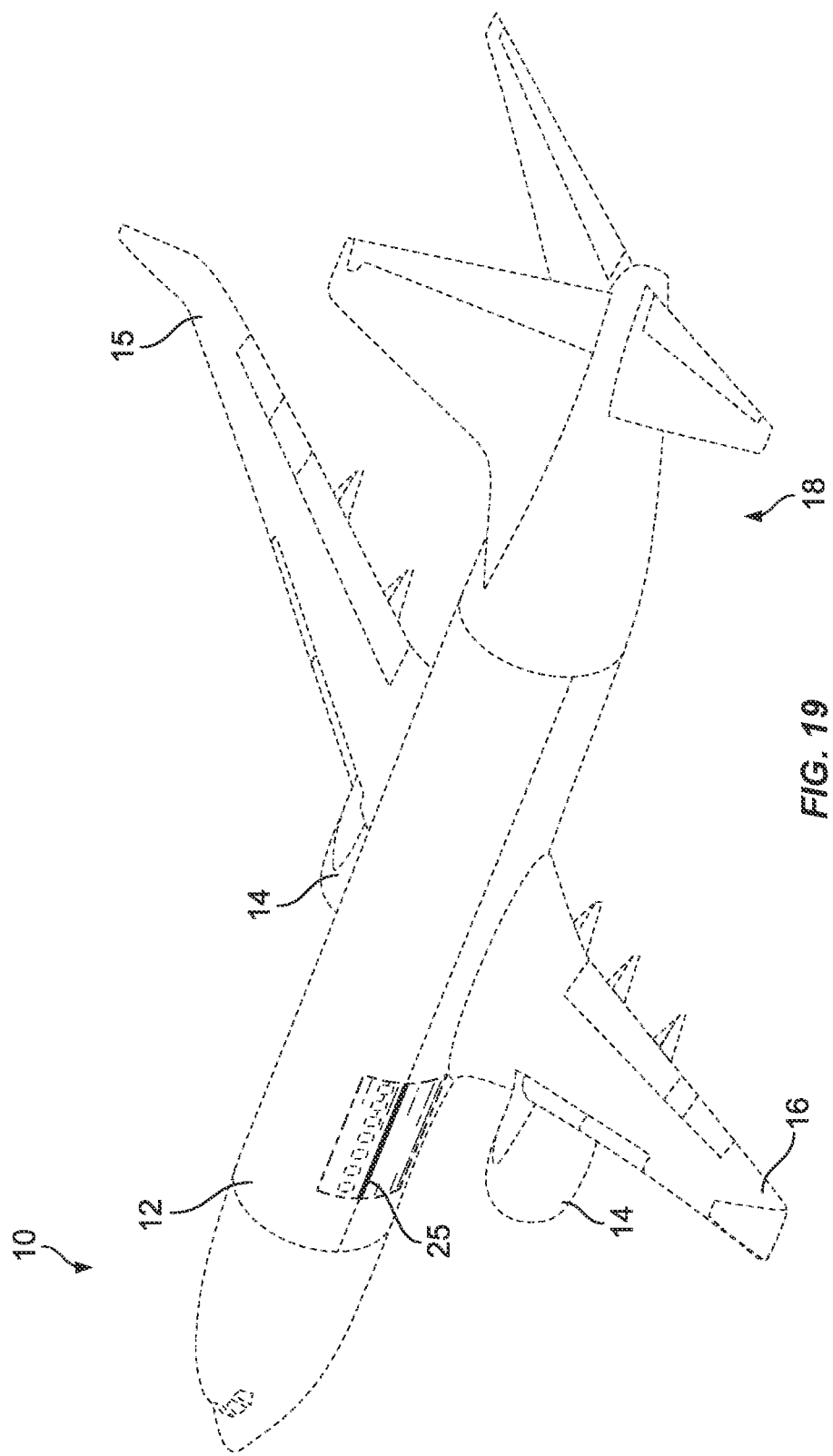
FIG. 19 depicts an assembled aircraft in an illustrative embodiment having an aesthetic design along a segment of the outer side surface of the aircraft, with broken lines depicting the environment and border of the segment.
Figure 20:
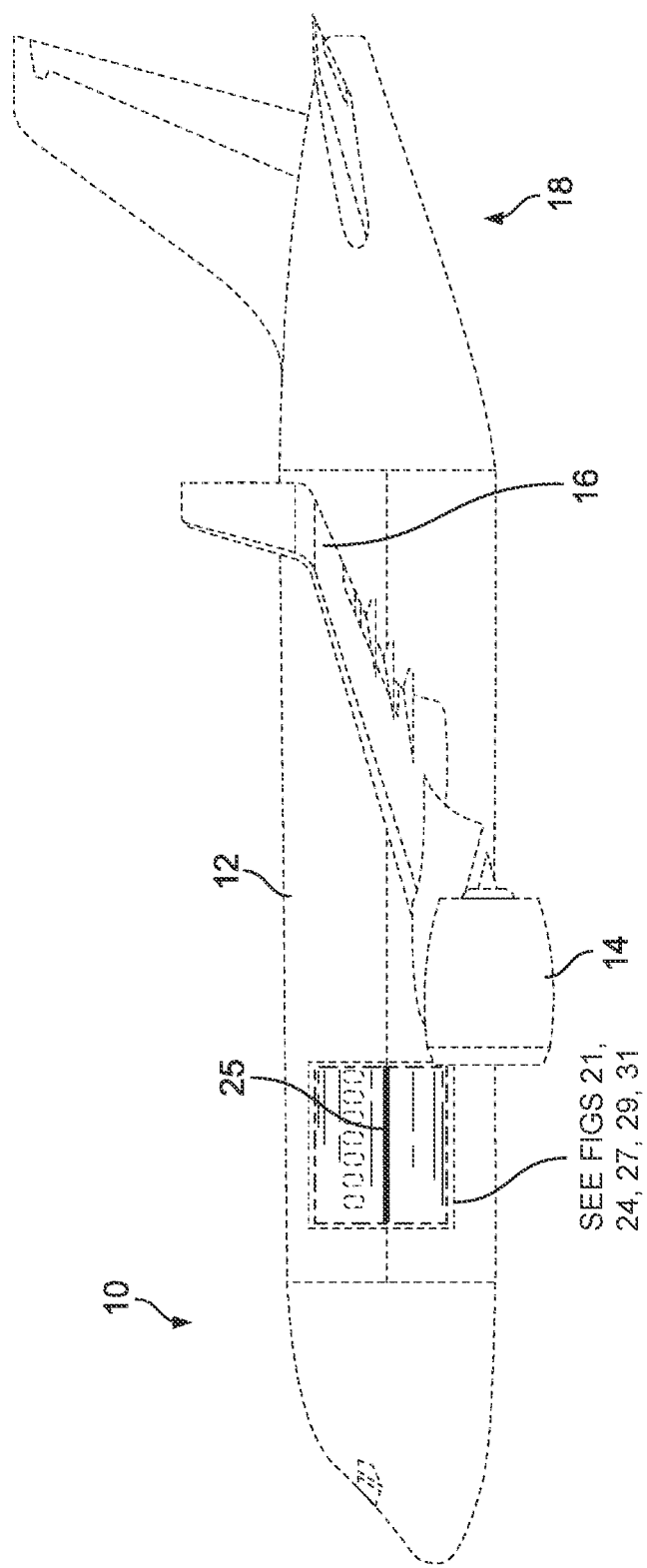
FIG. 20 depicts a side view of the embodiment shown in FIG. 19.
Figure 21:
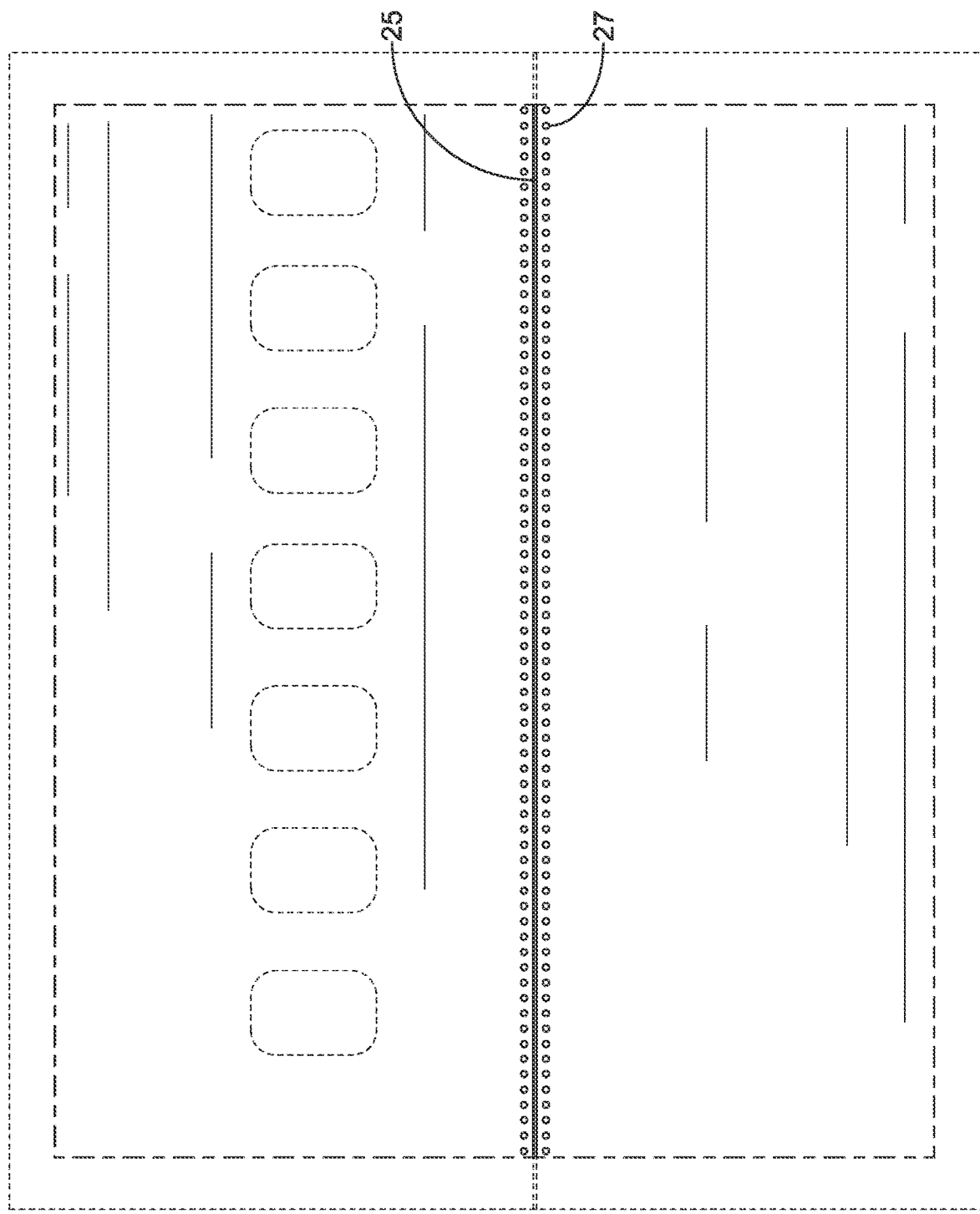
FIG. 21 depicts a magnified view of the segment of the aircraft shown in FIG. 20 (with specific reference in FIG. 20), having dot-dash broken lines depicting the border of the segment and dashed lines depicting environment of the segment, such as an indication of the position of windows.
Figure 22:
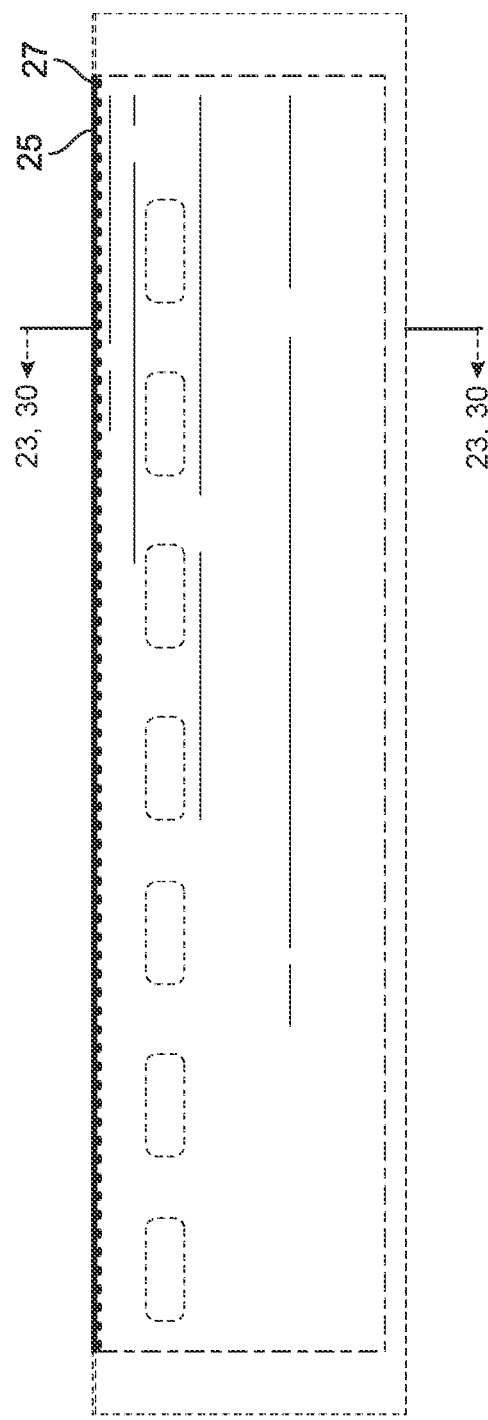
FIG. 22 depicts a side view of the segment in FIG. 21, viewed from the top of the aircraft of FIG. 20.
Figure 23:
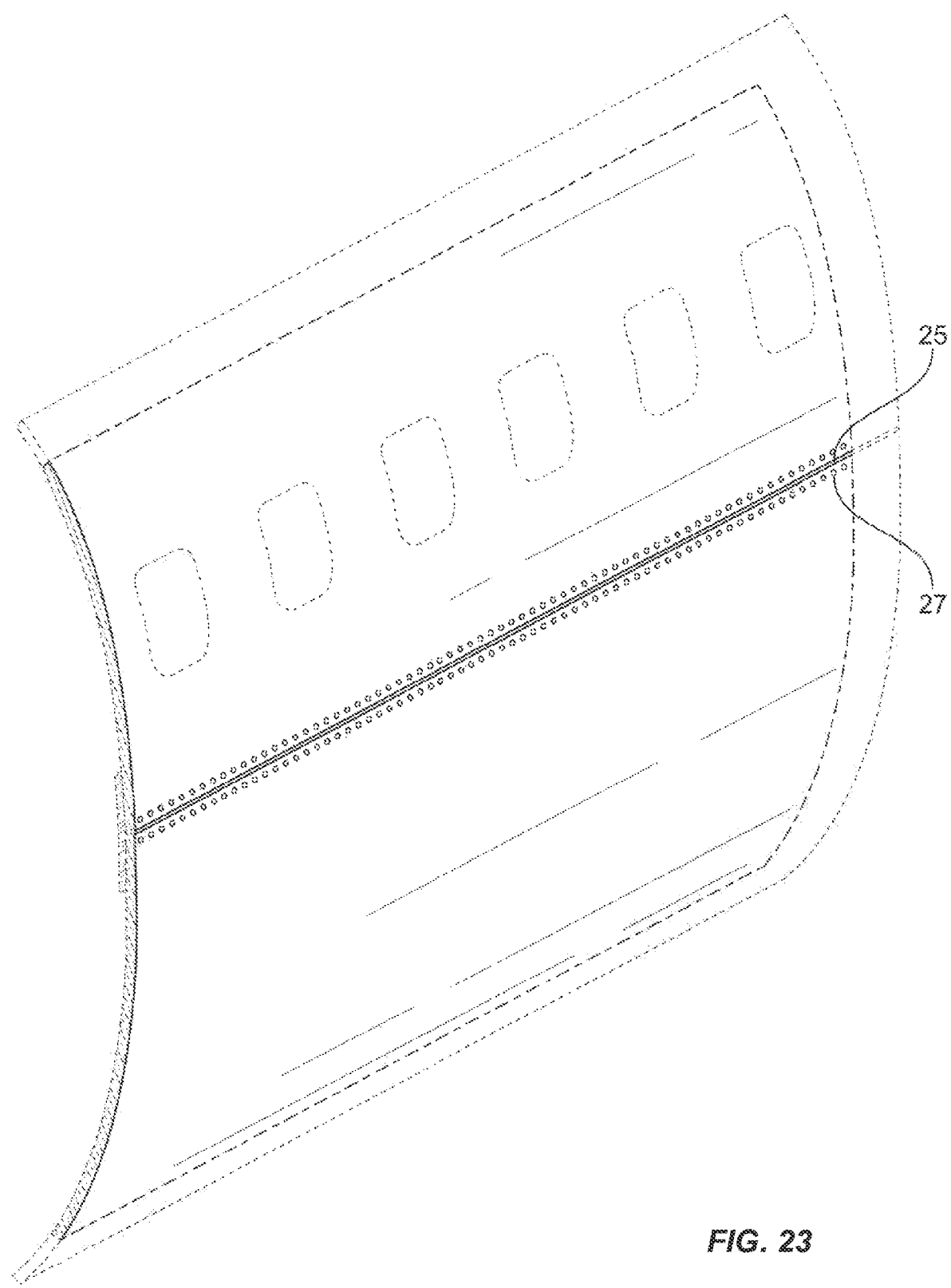
FIG. 23 depicts an elevated side view of the segment shown in FIG. 21, showing the outer surface design in solid lines, with broken lines representing a cross-sectional view of an embodiment having such a surface design.
Figure 24:
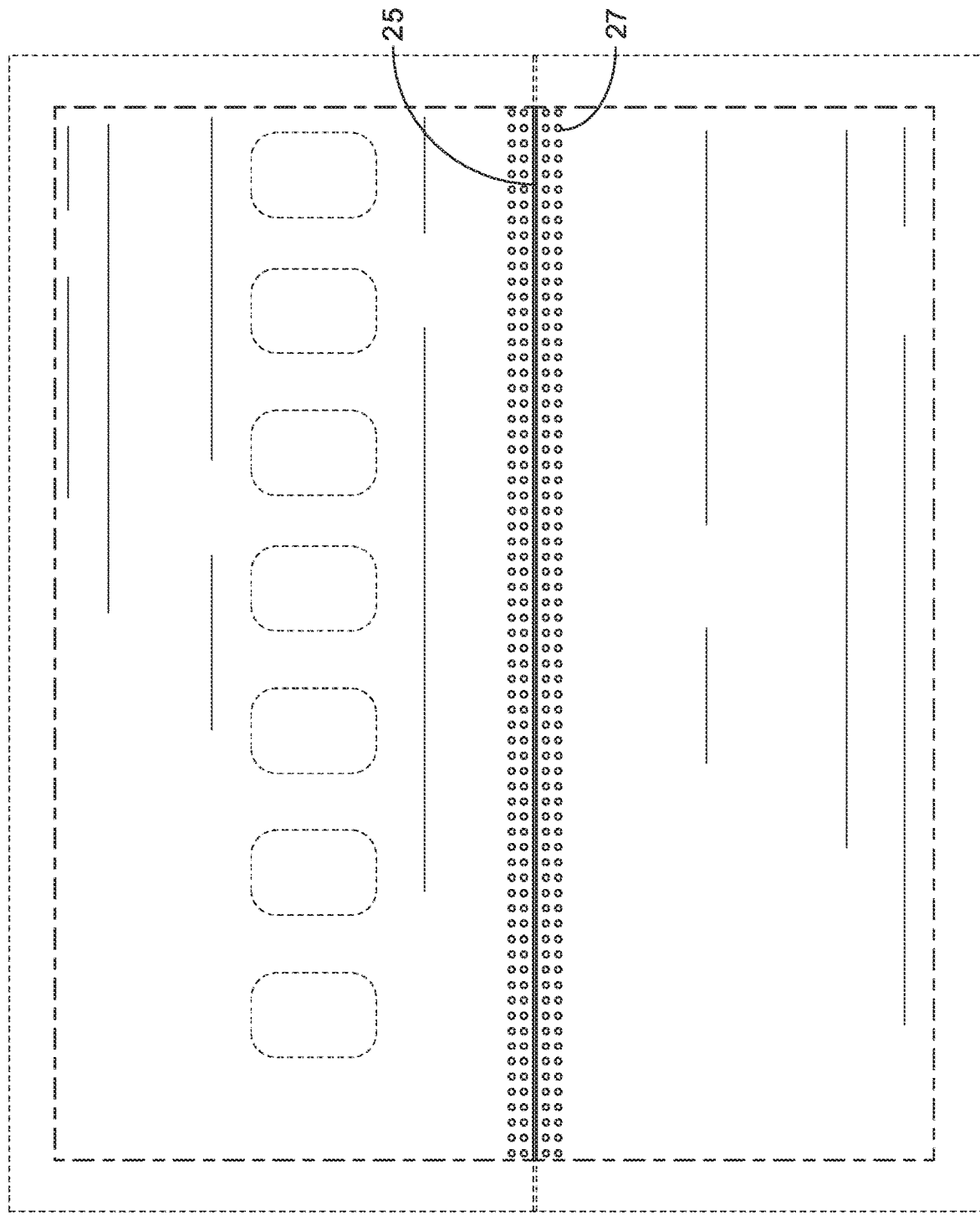
FIG. 24 depicts an alternative embodiment of the design shown in FIG. 21, with dot-dash broken lines for the border of the segment and dashed lines depicting environment of the segment such as an indication of the position of windows.
Figure 25:
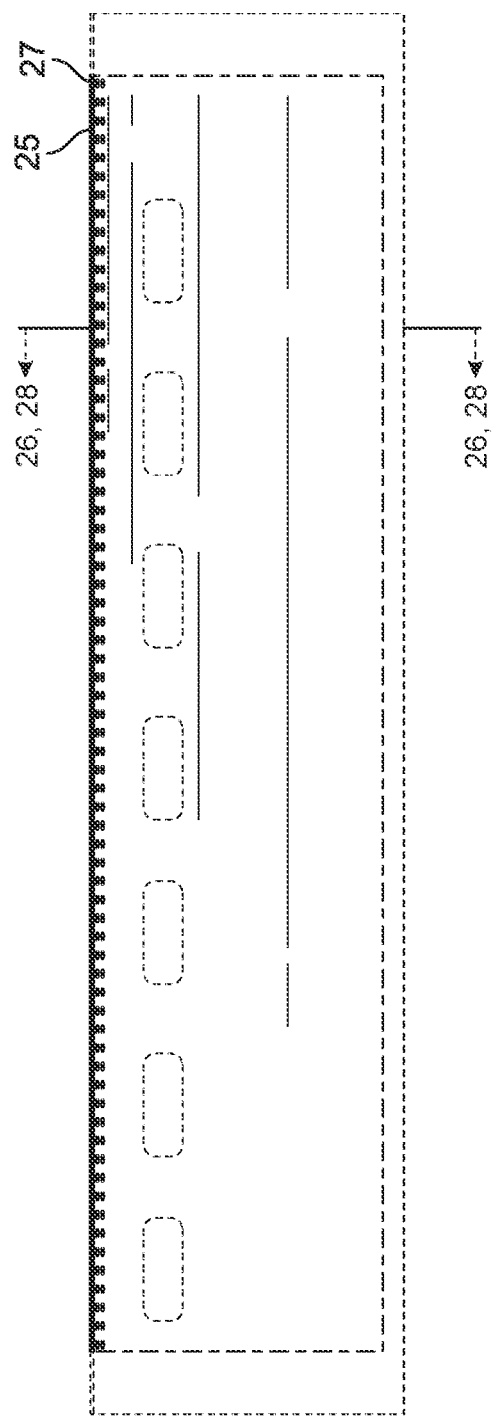
FIG. 25 depicts a side view of the segment in FIGS. 24 and 27, viewed from the top of the aircraft of FIG. 20.
Figure 26:
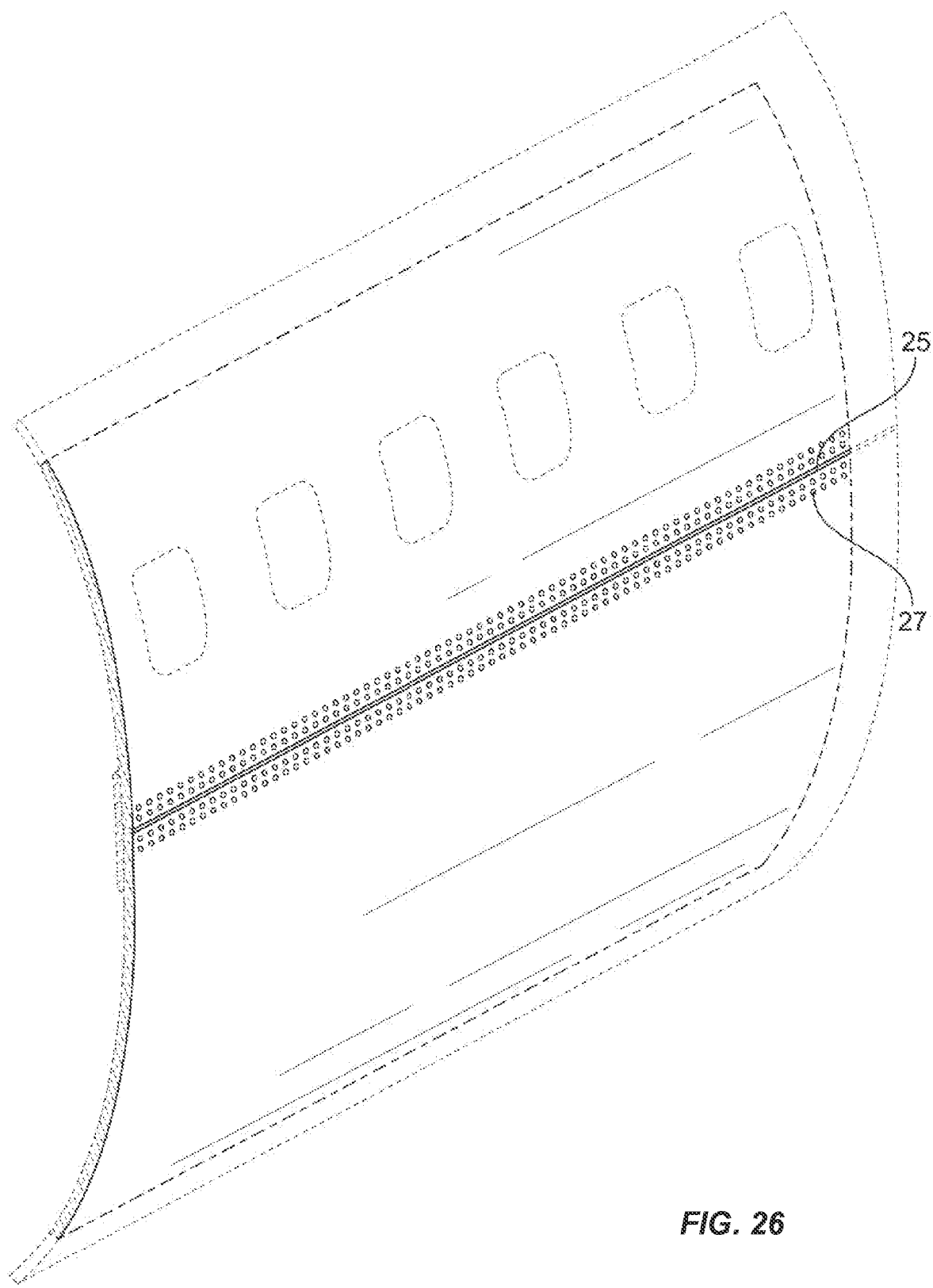
FIG. 26 depicts an elevated side view of the segment shown in FIG. 24, showing the outer surface design in solid lines, with broken lines representing a cross-sectional view of an embodiment having such a surface design.
Figure 27:
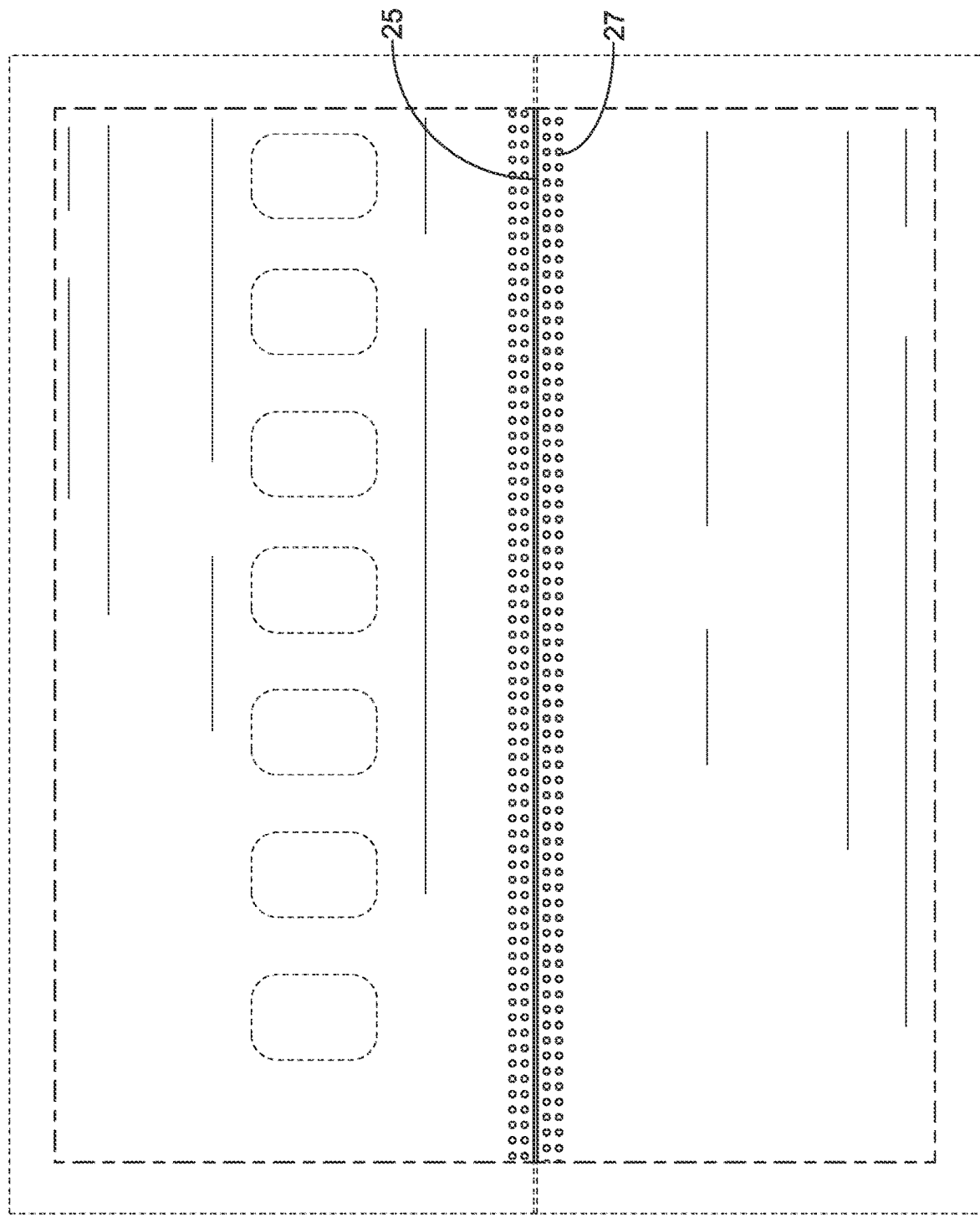
FIG. 27 depicts an alternative embodiment of the design shown in FIG. 21, with dot-dash broken lines for the border of the segment and dashed lines depicting environment of the segment such as an indication of the position of windows.
Figure 28:
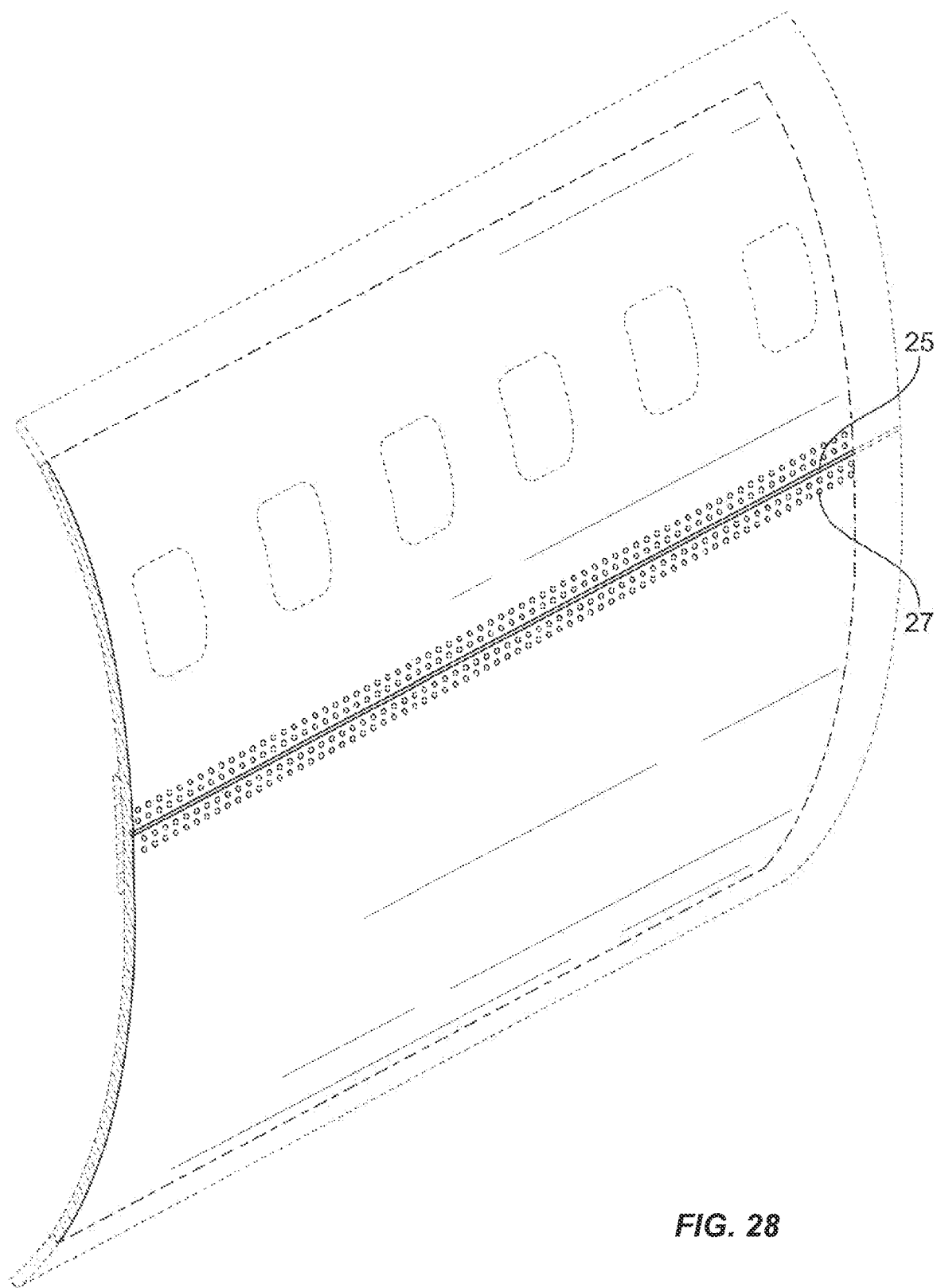
FIG. 28 depicts an elevated side view of the segment shown in FIGS. 25 and 27, showing the outer surface design in solid lines, with broken lines representing a cross-sectional view of an embodiment having such a surface design.

Referring more particularly to the drawings, embodiments of the disclosure may be described in the context of aircraft manufacturing and service in method 1700 as shown in FIG. 17 and an aircraft 1702 as shown in FIG. 18. During pre-production, method 1700 may include specification and design 174 of the aircraft 1702 and material procurement 176. During production, component and subassembly manufacturing 178 and system integration 1710 of the aircraft 1702 takes place. Thereafter, the aircraft 1702 may go through certification and delivery 1712 in order to be placed in service 1714. While in service by a customer, the aircraft 1702 is scheduled for routine work in maintenance and service 1716 (which may also include modification, reconfiguration, refurbishment, and so on). Apparatus and methods embodied herein may be employed during any one or more suitable stages of the production and service described in method 1700 (e.g., specification and design 174, material procurement 176, component and subassembly manufacturing 178, system integration 1710, certification and delivery 1712, service 1714, maintenance and service 1716) and/or any suitable component of aircraft 1702 (e.g., airframe 1718, systems 1720, interior 1722, propulsion system 1724, electrical system 1726, hydraulic system 1728, environmental 1730).

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 1702 produced by method 1700 may include an airframe 1718 with a plurality of systems 1720 and an interior 1722. Examples of systems 1720 include one or more of a propulsion system 1724, an electrical system 1726, a hydraulic system 1728, and an environmental system 1730. Any number of other systems may be included. Although an aerospace example is shown, the principles of the disclosure may be applied to other industries, such as the automotive industry.

As is shown in FIGS. 19 through 48, an ornamental outer appearance may be provided such as is depicted in the Figures, with a visible feature of the combination of a line 25 and an arrangement of the plurality of features 27, resulting in a visual appearance of joined half barrels and rivet heads. For example, as is shown in FIGS. 19 through 33, and in FIGS. 34 through 48, an elongated line 25, in the place of a seam joining half barrel constructions, with an arrangement of the plurality of features 27, in the positions of rivet fasteners on each side of the longitudinal line, provides an appearance of the outer surface as a precise, secure and solidly constructed assembly. In this arrangement, the longitudinal splice of the half barrels is configured to be apparent as outer surface ornamentation, as a line 25 along at least an extent of the fuselage, with the appearance of fasteners on each side of the longitudinal line. The appearance of the fasteners may be as a single row of the plurality of features 27, 37 on each side of the line 25, 35 (as in FIGS. 21, 29, 36 and 44) or as a pair of rows of the plurality of features 27, 37 on each side of the line 25, 35 (as in FIG. 24, 27, 31, 39, 42 or 46). The appearance of fasteners, such as flush countersunk fasteners which are in rows and generally equally spaced, may be arranged to be visible as a single row of fasteners along each side of the longitudinal line (as a visible remnant of the butt splice of mating half barrels) or as two rows of fasteners along each side of the longitudinal line. Such an arrangement of a line 25, 35 and the plurality of features 27, 37 may be positioned on the side(s) of the fuselage 12 as is sown in FIGS. 19 through 33, or along the top of the fuselage 12 such as is depicted in FIGS. 34 through 48.

As already mentioned above, apparatus and methods embodied herein may be employed during any one or more of the stages of the production and service described in method 1700. For example, components or subassemblies corresponding to component and subassembly manufacturing 178 may be fabricated or manufactured in a manner similar to components or subassemblies produced while the aircraft 1702 is in service. Also, one or more apparatus embodiments, method embodiments, or a combination thereof may be utilized during the subassembly manufacturing 178 and system integration 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation during the maintenance and service 1716. Thus, the embodiments may be used in any stages discussed herein, or any combination thereof, such as specification and design 174, material procurement 176, component and subassembly manufacturing 178, system integration 1710, certification and delivery 1712, service 1714, maintenance and service 1716) and/or any suitable component of aircraft 1702 (e.g., airframe 1718, systems 1720, interior 1722, propulsion system 1724, electrical system 1726, hydraulic system 1728, and/or environmental 1730.

In one embodiment, a part comprises a portion, or segment described herein, of airframe 1718, and is manufactured during component and subassembly manufacturing 178. The part may then be assembled into an aircraft in system integration 1710, and then be utilized in service 1714 until wear renders the part unusable. Then, in maintenance and service 1716, the part may be discarded and replaced with a newly manufactured part. Inventive components and methods may be utilized throughout component and subassembly manufacturing 178 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

What is claimed is:

1. A method for assembling an airframe of an aircraft, the method comprising:
receiving a first set of lower half barrel sections and a second set of upper half barrel sections of fuselage;
advancing the first set of lower half barrel sections and the second set of upper half barrel sections in a process direction across multiple work stations at once; and
performing work on at least one of the first set of lower half barrel sections and at least one of the second set of upper half barrel sections via the multiple work stations simultaneously,
wherein the at least one of the first set of lower half barrel sections and the at least one of the second set of upper half barrel sections are fabricated in alternating fashion comprising adjacent serial placement on an assembly line, such that the at least one of the first set of lower half barrel sections and the at least one of the second set of upper half barrel sections are paired for joining into the same full barrel section of a fuselage.

2. The method of claim 1 wherein:
advancing the first set of lower half barrel sections and the second set of upper half barrel sections is performed via an assembly line.

3. The method of claim 1 wherein:
the multiple work stations perform work on the first set of lower half barrel sections and the second set of upper half barrel sections during a same pause between micro pulses of the half barrel section in the process direction.

4. The method of claim 1 further comprising:
micro pulsing the first set of lower half barrel sections and the second set of upper half barrel sections through the multiple work stations according to a common takt time, wherein the common takt time is based on producing a number of desired half barrel sections per month.

5. The method of claim 1 further comprising:
indexing the at least one of the first set of lower half barrel sections and the at least one of the second set of upper half barrel sections to at least one work station during a pause between micro pulses.

6. The method of claim 1 further comprising:
performing work on the at least one of the first set of lower half barrel sections and the at least one of the second set of upper half barrel sections during a pause between micro pulses of the half barrel section in the process direction.

7. The method of claim 1 further comprising:
performing work on the at least one of the first set of lower half barrel sections and the at least one of the second set of upper half barrel sections during micro pulses of the half barrel section in the process direction between pauses.

8. The method of claim 1 further comprising:
delivering components to one of the work stations as the first set of lower half barrel sections and the second set of upper half barrel sections advances to the work station; and
joining the components to the at least one of the first set of lower half barrel sections or the at least one of the second set of upper half barrel sections at the work station.

9. The method of claim 8 wherein:
delivering the components is performed Just In Time (JIT) to the work station in an order of usage by the work station.

10. The method of claim 8 further comprising:
joining the components to the at least one of the first set of lower half barrel sections or the at least one of the second set of upper half barrel sections during a pause between micro pulses.

11. The method of claim 1 wherein:
advancing the first set of lower half barrel sections and the second set of upper half barrel sections comprises moving the at least one of the first set of lower half barrel sections and the at least one of the second set of upper half barrel sections through the multiple work stations, which are separated from each other by a distance less than a length of the at least one of the first set of lower half barrel sections or the at least one of the second set of upper half barrel sections.

12. The method of claim 1 wherein:
the work stations are separated by a distance equal to a multiple of a frame pitch for the at least one of the first set of lower half barrel sections or the at least one of the second set of upper half barrel sections.

13. The method of claim 1 wherein:
performing the work comprises operating the multiple work stations independently of each other.

14. The method of claim 1 wherein:
a plurality of the multiple work stations remove material from the at least one of the first set of lower half barrel sections or the at least one of the second set of upper half barrel sections.

15. The method of claim 1 wherein:
a plurality of the multiple work stations add material to the at least one of the first set of lower half barrel sections or the at least one of the second set of upper half barrel sections.

16. The method of claim 1 wherein:
the work is selected from the group consisting of frame installation, window surround installation, door surround installation, door manufacturing excess trim and removal, window manufacturing excess trim and removal, trimming manufacturing excess from bearing edge, sealing, Non-Destructive Inspection (NDI) of the at least one of the first set of lower half barrel sections or the at least one of the second set of upper half barrel sections, Non-Destructive Inspection (NDI) of an edge after separating manufacturing excess or window manufacturing excess or door manufacturing excess, and cleaning.

17. The method of claim 1 further comprising:
joining the at least one of the first set of lower half barrel sections or the at least one of the second set of upper half barrel sections to another half barrel section.

18. The method of claim 1 further comprising:
operating feeder lines for the multiple work stations according to a takt time for the at least one of the first set of lower half barrel sections or the at least one of the second set of upper half barrel sections.

19. The method of claim 18 wherein:
each feeder line has a common takt time equal to or a fraction of a fuselage takt time.

20. The method of claim 1 further comprising:
joining the at least one of the first set of lower half barrel sections or the at least one of the second set of upper half barrel sections to another half barrel section; and
operating feeder lines for the multiple work stations according to a takt time for the at least one of the first set of lower half barrel sections or the at least one of the second set of upper half barrel sections.

* * * * *